(12) United States Patent
Jung et al.

(10) Patent No.: US 7,168,135 B2
(45) Date of Patent: Jan. 30, 2007

(54) ROTARY HINGE MECHANISM OF PORTABLE PHONE

(75) Inventors: Bo-Seung Jung, Inchon (KR); Si-Wan Kim, Chungcheongnam-do (KR)

(73) Assignee: M2SYS Co., Ltd, Anyang-si (KR)

( * ) Notice: Subject to any disclaimer, the term of this patent is extended or adjusted under 35 U.S.C. 154(b) by 0 days.

(21) Appl. No.: 10/506,865

(22) PCT Filed: Mar. 3, 2003

(86) PCT No.: PCT/KR03/00410

§ 371 (c)(1),
(2), (4) Date: May 5, 2005

(87) PCT Pub. No.: WO03/075475

PCT Pub. Date: Sep. 12, 2003

(65) Prior Publication Data

US 2005/0198779 A1    Sep. 15, 2005

(30) Foreign Application Priority Data

| Mar. 2, 2002 | (KR) | ............... | 10-2002-0011156 |
| Apr. 1, 2002 | (KR) | ............... | 10-2002-0017842 |
| Jun. 17, 2002 | (KR) | ............... | 10-2002-0033787 |
| Jun. 24, 2002 | (KR) | ............... | 10-2002-0035249 |
| Oct. 30, 2002 | (KR) | ............... | 10-2002-0066579 |
| Nov. 2, 2002 | (KR) | ............... | 10-2002-0006731 |
| Jan. 13, 2003 | (KR) | ............... | 10-2003-0002120 |

(51) Int. Cl.
*H04B 1/38* (2006.01)

(52) U.S. Cl. ............... 16/367; 16/330; 455/575.3

(58) Field of Classification Search ............... 16/367, 16/303, 330; 455/575.1, 575.3; 379/433.13, 379/434; 361/683, 803
See application file for complete search history.

(56) References Cited

U.S. PATENT DOCUMENTS

| 6,088,240 A | * | 7/2000 | Steinhoff et al. ............ 361/814 |
| 6,292,980 B1 | | 9/2001 | Yi et al. |
| 6,470,175 B1 | | 10/2002 | Park et al. |
| 6,549,789 B1 | * | 4/2003 | Kfoury ............... 455/550.1 |
| 6,633,643 B1 | | 10/2003 | Ona |
| 6,678,539 B1 | | 1/2004 | Lu |

(Continued)

FOREIGN PATENT DOCUMENTS

JP    2001319833 A    * 11/2001

(Continued)

*Primary Examiner*—Robert J. Sandy
*Assistant Examiner*—Michael J. Kyle
(74) *Attorney, Agent, or Firm*—RatnerPrestia

(57) ABSTRACT

Disclosed is a hinge mechanism of portable phone having an advanced configuration, which can perform the opening operation and the rotating operation of a phone cover. The hinge mechanism comprises a housing to connect a phone body and a phone cover, which has a rotary chamber and a hinge chamber, a hinge part to open and to close he phone cover, which is disposed in the hinge chamber, and a rotary part to rotate the phone cover, which is disposed in the rotary chamber. A user can play a game or watch a motion picture using the portable phone while looking at the liquid crystal display of the phone cover, because the phone cover can be rotated.

15 Claims, 45 Drawing Sheets

U.S. PATENT DOCUMENTS

| | | |
|---|---|---|
| 6,766,181 B1 | 7/2004 | Newman et al. |
| 6,785,935 B2 | 9/2004 | Ahn et al. |
| 6,817,061 B2 | 11/2004 | Wu et al. |
| 2003/0040288 A1* | 2/2003 | Kang et al. .................... 455/90 |
| 2003/0162569 A1* | 8/2003 | Arakawa et al. ............ 455/566 |
| 2004/0020013 A1 | 2/2004 | Wu et al. |
| 2004/0098833 A1 | 5/2004 | Lu et al. |
| 2004/0098834 A1 | 5/2004 | Lu et al. |
| 2004/0141287 A1* | 7/2004 | Kim et al. ................... 361/683 |
| 2005/0032559 A1* | 2/2005 | Sudo et al. ............... 455/575.3 |

FOREIGN PATENT DOCUMENTS

| | | | |
|---|---|---|---|
| KR | 20010051282 | * | 8/2001 |

* cited by examiner

ROTARY HINGE MECHANISM OF PORTABLE PHONE

TECHNICAL FIELD

This invention relates to a hinge mechanism of portable phone, and more particularly to a hinge mechanism of portable phone capable of opening and closing a cover of a portable phone while can rotate the cover about a certain axis so that a front surface and back surfaces can be converted.

BACKGROUND ART

Korea Patent Application No. 10-1998-0046799 discloses a hinge mechanism of a portable phone as an example of a cover hinge mechanism of a portable phone.

The hinge mechanism of the portable phone including the hinge mechanism according to the above-mentioned application is used for rotating a cover against a body.

Such hinge mechanism can hold the cover in open or closure elastically.

Meanwhile, the cover typically has a liquid crystal display at a side thereof contacting with a face of the body. In the state of closing the cover, the liquid crystal display comes in close contact with the face of the body, resulting in that a user can watch a screen of the liquid crystal display. Thus, the liquid crystal display of the cover always is set in order to automatically turn off when the user do not put in call to someone, while only turning on when the cover opens.

Since the hinge mechanism of the general portable phone performs such that the cover is opened and closed against the body of portable phone, however, there is a problem in that the user can watch the liquid crystal display when the cover is closed.

On the other hand, the liquid crystal display can be installed on both sides of the cover, but it causes a cost of manufactusealing the portable phone to increase. Furthermore, since the liquid crystal display on an outer side of the cover is always exposed to an outer environment, there is another problem in that the liquid crystal display can be easily destroyed.

Recently, a portable phone having a camera for image communication has been developed as the portable phone including lots of additional functions has been demanded. In such portable phone, the camera is embedded in the body or one of both sides of the cover, or detachably mountained at the hinge mechanism of the portable phone.

With the above-described portable phone, the camera is always directed to the user to take a picture of user's face and then transmits the picture to someone.

Accordingly, where the user wish take a picture of the body but the his/her face, the body of portable phone or the cover which is rotatably installed to the body of the portable phone must be directed to the user's body to take the picture of the his/her body. As the result, since the user cannot watch the liquid crystal display anymore, there is another problem in that the user cannot identify whether the camera normally takes the picture of his/her body.

DISCLOSUR OF INVENTION

The present invention is contrived to overcome above-described problems. It is an object of the present invention to provide a hinge mechanism of portable phone which can help to open and close the cover of the portable phone, while makes the cover turn reversely, resulting in that a user can watch a liquid crystal display of the cover in the state of turning off the portable phone.

To achieve the object of the present invention, there is provided a hinge mechanism of a portable phone which comprises: a first hinge housing including a first rotating chamber having an upper portion opened and a first hinge chamber formed at a side of the first rotating chamber, for mechanically connecting a cover to a body; a first hinge part which is installed to the first hinge chamber, for opening and closing the cover; and a first rotary part which is installed to the first rotating chamber, for rotating the cover.

The first rotary part includes: a first cylinder which has a first cylinder chamber formed at a lower surface with opening, a first cylinder aperture formed at an upper surface, and a first arm projected from upper portion to be combined with the cover; a first compressed spring installed to the first cylinder chamber; a first slip member which has a first slip opening at a center thereof and which is installed under the first compressed spring to the first cylinder chamber; and a first center shaft which is formed at a bottom surface of the first rotating chamber so as to sequentially extend through the first slip opening, the first compressed spring, the first cylinder chamber and the first cylinder aperture.

A pair of leaf spring inserting holes is formed on an outer peripheral surface of the first cylinder, and a pair of leaf spring installing holes is formed on an outer peripheral surface of the first slip member, in which a pair of leaf springs is respectively installed in the leaf spring inserting holes such that a center portion of the leaf spring is inserted in the leaf spring inserting hole.

A first center projection is formed on a peripheral surface of the first center shaft, and a first slip groove is formed on an inner surface of the first slip member, in which the first center projection is inserted.

A first cylinder projection is formed on the an outer peripheral surface of the first cylinder, and a pair of first stoppers is formed on an inner surface of the first cylinder opposite to the first rotating chamber, to which the first cylinder projection is latched.

The first housing has a first cutoff portion through which a wire enters the first rotating chamber to electrically connect the cover to the body.

A first annular groove is formed at an end of the first center shaft, in which a first sealing is fixedly inserted so as to fix the first cylinder to the first center shaft.

The first hinge chamber has an end opened and includes a first guide recess formed from an opening end to an interior thereof, wherein the first hinge part includes a first hinge spring which is installed in the first hinge chamber; a first rotary hinge part which is inserted in the first hinge chamber at an outside of the first hinge spring, which has a first rotary hinge aperture formed at a center thereof, of which a first rotary hinge projection is formed on an outer surface, and which has a first rotary hinge surface continuously extending to the first rotary hinge aperture while having two-wave type of bending when rotating each time; a first rotary fixing part which has a first fixing hinge hole formed opposite corresponding to the firs rotary hinge aperture so as to enclose the first fixing hinge part and which has a first fixing hinge surface corresponding to the first hinge surface at a side thereof and a first fixing hinge projection formed on the other side to be fixed to the body; and a first hinge shaft extending through the first fixing hinge hole, the first rotary hinge aperture and the first hinge spring to be fixed to the first hinge chamber.

The first hinge chamber opens at a top portion thereof, which has a first hinge chamber hole formed at a side surface thereof, and the first hinge part includes: a first rotary hinge part which is fixedly installed in the first hinge chamber, which has a first rotary hinge hole formed at a center thereof and which has a first rotary hinge surface continuously extending toward the first rotary hinge hole while having two-wave type of bending when rotating each time; a first fixing hinge part which is rotatably installed in the first hinge chamber, which has a first fixed hinge surface corresponding to the first rotary hinge surface at a side thereof, which has a first hinge shaft formed on the first fixed hinge surface to be inserted in the first rotary hinge hole and which a first fixed hinge projection formed at the other side thereof to be inserted in the first hinge chamber hole; and a first hinge spring which is installed in the first hinge chamber, for elastically urging the first rotary hinge part to the first fixed hinge part.

Furthermore, the first hinge chamber opens at a side thereof, which has a first guide recess formed from an open end to an interior, and the first hinge part includes a first hinge spring which is installed in the first hinge chamber; a first rotary hinge part which is inserted in the first hinge chamber to enclose the first hinge spring, which has a first rotary hinge hole formed at a center thereof, which has a first rotary hinge projection formed on an outer surface to be combined with the first guide recess and which has a first plain rotary hinge surface; a first fixed hinge part which enclose the first fixed hinge part, which has a first fixed hinge hole corresponding to the first rotary hinge hole, which has a first fixed hinge surface formed at a side thereof to face the first rotary hinge surface, and which a first fixed hinge projection formed at the other side to be fixed to the body; and a first hinge shaft which extends the first hinge hole, the first rotary hinge hole and the first hinge spring to be fixed to the first hinge chamber.

On the other hand, the hinge mechanism of portable phone according to the present invention comprises: a second housing which includes a second rotary chamber having a top portion opened and a hinge chamber formed at a side, for mechanically connecting a cover to a body; a second hinge part which is installed I the second hinge chamber, for opening and closing the cover; and a second rotary part which is installed in the first rotary chamber, for rotating the cover, wherein the second rotary part includes: a second cylinder which has a second cylinder chamber opened at a bottom thereof, which has a second cylinder hole formed at an upper surface thereof, and which has a second arm formed at a top portion to be combined with the cover and a second cylinder groove formed along a length of the second rotary part in an inner surface thereof; a second compressed spring which is installed in the second cylinder chamber; a second rotary slip part which has a second rotary slip hole formed at a center thereof, which has a second rotary slip projection formed at an outer peripheral surface thereof to be combined with the second cylinder groove, and which has a second slip surface continuously and horizontally extending to the second rotary slip hole while having two wave type of bending when rotating each time; a second slip fixing portion which has a second polygonal hole formed at a center thereof and which has a second fixed slip surface corresponding to the second rotary slip waving surface; and a second center shaft which has a second polygonal projection to be combined with the second polygonal hole and which is installed at a bottom surface of the second rotary chamber to sequentially extend through the second polygonal hole, the second rotary slip hole, the second compressed spring and the second cylinder hole.

A second cylinder projection is formed on an outer peripheral surface of the second cylinder, and a second stopper is formed on an inner surface in the second rotary chamber to allow the second cylinder projection to be latched thereon.

A second cylinder projection is formed at a bottom surface of the second cylinder, and a second stopping groove is formed at a bottom of the second rotary chamber so that the second cylinder projection is inserted in the second stopping groove to stop the second cylinder at an initial position or at a position of being turned at 180 degree.

A second arm projection is formed at a bottom surface of the second arm, and a second housing stopping groove is formed on an upper surface of the second housing so that the second arm projection is inserted in the second housing stopping groove to stop the second cylinder at an initial position or at a position of being turned at 180 degree.

The second housing has a second cutoff portion through which a wire enters the second rotary chamber to electrically connect the cover to the body.

A second annular groove is formed at an end of the second center shaft, to which a second sealing is combined to fix the second cylinder to the second center shaft.

The second hinge chamber opens at an end thereof, which includes a first guide recess formed from the opened end to an interior of the second hinge chamber, and the second hinge part includes: a second hinge spring which is installed in the second hinge chamber; a second rotary hinge part which is inserted in the second hinge chamber to enclose the second hinge spring, which has a second rotary hinge hole formed at a center portion thereof and a second rotary hinge projection formed thereon to be combined with the second guide recess, and which has a second rotary hinge surface continuously and horizontally extending to the second rotary hinge hole while having two-wave type of bending when rotating each time; a second fixed hinge part which encloses the second fixed hinge part, which has a second fixed hinge hole corresponding to the second rotary hinge hole formed therein, and which has a second fixed hinge surface formed on a surface to be corresponding to the second rotary hinge hole and a second fixed hinge projection formed on the other surface to be fixed to the body; and a second hinge shaft extending through the second hinge hole, the second rotary hinge hole and the second hinge spring to be fixed to the second hinge chamber.

The second hinge chamber opens at a top portion thereof, which has a second hinge chamber hole formed at a side thereof, and the second hinge part includes: a second rotary hinge part which is fixedly installed in the second hinge chamber, which has a second rotary hinge hole formed at a center portion thereof, and which has a second rotary hinge surface continuously and horizontally extending to the second rotary hinge hole while having two-wave type of bending when rotating each time; a second fixed hinge part which is rotatably installed in the second hinge chamber, which has a second fixed hinge surface formed at a surface to be corresponding to the second rotary hinge surface, and which has a second hinge shaft formed on the second fixed hinge surface to be inserted in the second rotary hinge hole and a second fixed hinge projection formed on the other surface to be inserted in the second hinge chamber hole; and a second hinge spring which is installed in the second hinge chamber to elastically urge the second rotary hinge part to the second fixed hinge part.

The second hinge chamber opens at a side thereof, which has a second guide recess formed from an opened end to an interior thereof, and the second hinge part includes: a second hinge spring which is installed in the second hinge chamber; a second rotary hinge part which is inserted in the second hinge chamber to enclose the second hinge spring, which has a second rotary hinge hole formed at a center portion thereof, and which has a second rotary hinge projection formed on an outer surface thereof to be combined to the second guide recess, and a second rotary hinge surface; a second fixed hinge part which encloses the second fixed hinge part, which has a second fixed hinge hole corresponding to the second rotary hinge hole, and which has a second fixed hinge surface formed on a side thereof to be corresponding to the second rotary hinge surface and a second fixed hinge projection formed on the other side thereof to be fixed to the body; and a second hinge shaft extending through the second fixed hinge hole, the second rotary hinge hole and the second hinge spring to be fixed to the second hinge chamber.

The second hinge part includes: a second hinge housing which has a second hinge housing chamber formed with an opened top portion and a second guide recess formed lengthwise on a side thereof, which has a second hinge housing hole formed at a side thereof and a second hinge housing projection formed on the other side thereof; a second rotary hinge part which is installed to the second hinge housing, which has a second rotary hinge projection formed on an outer surface thereof to be inserted in the second guide recess and a second rotary hinge hole formed at a center portion thereof, and which has a second rotary hinge surface continuously and horizontally extending to the second rotary hinge hole while having two-wave type of bending when rotating each time; a second fixed hinge part which is rotatably installed to the second hinge housing, which has a second hinge surface formed at a surface thereof to be corresponding to the second rotary hinge surface, which has a second hinge shaft formed on the second fixed hinge surface to be inserted in the second rotary hinge hole, and which has a second fixed hinge projection formed on the other surface to be inserted in the second hinge housing hole; and a second hinge spring installed to the second hinge housing in order that one end of the second hinge spring is combined to the second hinge housing projection and that the other end elastically supports the second rotary hinge part.

Meanwhile, the hinge mechanism of portable phone according to the present invention comprises: a third housing having a third rotary chamber with an opened top portion and a third hinge chamber formed at a side of the third rotary chamber, for mechanically connecting a cover to a body; a third hinge part which is installed to the third hinge chamber, for opening and closing the cover; and a third rotary part which is installed to the third rotary chamber, for rotating the cover, wherein the third rotary part includes a third cylinder which opens at a lower portion and has a third cylinder chamber, which has a third cylinder hole formed in an upper portion thereof and a third arm projected from the upper portion thereof to be combined with the cover, and which has a third cylinder groove formed lengthwise thereon; a third compressed spring which is installed in the third cylinder chamber; a third rotary slip part which has a third rotary slip hole formed at a center portion thereof, which has a third cylinder hole formed on an upper surface thereon and a third arm projected from an upper portion to be combined with the cover, and which a third cylinder groove formed lengthwise on an inner surface thereof; a third fixed slip part which has a third polygonal hole formed at a center portion thereof and which has a third fixed slip surface on an upper portion; and a third center shaft which has a third polygonal projection to be combined with the third polygonal hole, and which is installed at a bottom surface of the third rotary chamber to sequentially extend the third polygonal hole, the third rotary slip hole, the third compressed spring and the third cylinder hole.

A pair of third balls is installed on the third rotary slip surface to be opposite to each other about the third rotary slip hole while a pair of third hemispheric groove is formed on the third fixed slip surface to face the pair of the third balls, and third guide recess is formed to communicate the third hemispheric grooves.

A pair of third balls is installed on the third fixed slip surface to be opposite to each other about the third fixed slip hole while a pair of third hemispheric groove is formed on the third rotary slip surface to face the pair of the third balls, and third guide recess is formed to communicate the third hemispheric grooves.

A pair of third projections may be installed on the third rotary slip surface to be opposite to each other about the third rotary slip hole while a pair of third hemispheric groove is formed on the third fixed slip surface to face the pair of the third projections, and third guide recess is formed to communicate the third hemispheric grooves.

Further, a third cylinder projection is formed on an outer peripheral surface of the third cylinder, and a pair of third stoppers is formed on opposite inner surfaces of the third rotary chamber, to which the third cylinder projection is latched.

The third housing has a third cutoff portion through which a wire enters the third rotary chamber to electrically connect the cover to the body.

A third annular groove is formed at an end of the third center shaft, to which a third sealing is combined to fix the third cylinder to the third center shaft.

The third hinge chamber opens at aside thereof, which includes a third guide recess formed from the opened end to an interior thereof, and the third hinge part includes: a third hinge spring which is installed in the third hinge chamber; a third rotary hinge part which is inserted in the third hinge chamber to enclose the third hinge spring, which has a third rotary hinge hole formed at a center portion thereof, which has a third rotary hinge projection formed on an outer surface thereof to be combined with the third guide recess, and which has a third rotary hinge surface continuously and horizontally extending to the third rotary hinge hole while having two-wave type of bending when rotating each time; a third fixed hinge part which encloses the third hinge spring, which has a third fixed hinge hole corresponding to the third rotary hinge hole, and which has a third fixed hinge surface formed on a side thereof to be corresponding to the third rotary hinge surface and a third fixed hinge projection formed on the other side thereof to be fixed to the body; and a third hinge shaft extending through the third fixed hinge hole, the third rotary hinge hole and the third hinge spring to be fixed to the third hinge chamber.

Furthermore, the third hinge chamber opens at a side thereof, which includes a third guide recess formed from an opened end to an interior thereof, and the third hinge part includes: a third hinge spring which is installed to the third hinge chamber; a third rotary hinge part which is inserted in the third hinge chamber to enclose the third hinge spring, which has a third rotary hinge hole formed at a center portion thereof, and which has a third rotary hinge projection formed on an outer surface to be combined to the third guide recess and a third plain rotary hinge surface; a third fixed hinge part which encloses the third fixed hinge part, which has a third fixed hinge hole corresponding to the third rotary hinge hole, and which has a third fixed hinge surface formed on a side thereof to be corresponding to the third rotary hinge surface and a third fixed hinge projection formed on the other side to be fixed to the body; and a third hinge shaft extending through the third fixed hinge hole, the third rotary hinge hole and the third hinge spring to be fixed to the third hinge chamber.

The third hinge chamber opens at a top portion thereof, which has a third hinge chamber hole formed at a side thereof and a third guide recess formed lengthwise on an inner surface, and the third hinge part includes: a third hinge spring which is installed in the third hinge chamber; a third rotary hinge part which is inserted in the third hinge chamber to enclose the third hinge spring, which has a third hinge spring hole formed at a center portion thereof, and which a third rotary hinge projection formed on an outer surface thereof to be combined with the third guide recess and a third rotary hinge surface formed at a side thereof; a third fixed hinge part which encloses the third fixed hinge part, which has a third fixed hinge hole corresponding to the third rotary hinge hole, and which has a third fixed hinge surface formed at a side thereof to be corresponding to the third rotary hinge surface and a third fixed hinge projection formed on the other side thereof to be fixed to the body; and a third hinge shaft extending through the third fixed hinge hole, the third rotary hinge hole and the third hinge spring to be fixed to the third hinge chamber.

The third hinge chamber opens at a top portion thereof, which has a third hinge chamber hole formed at a side thereof and which has a third guide recess including a horizontal groove formed lengthwise on an inner surface thereof and a vertical groove being normal to the horizontal groove to be connected to the opening, and the third hinge part includes: a third hinge spring which is installed to the third hinge chamber; a third hinge part which is inserted in the third hinge chamber to enclose the third hinge spring, which has a third rotary hinge hole formed at a center portion thereof, and which has a third rotary hinge projection formed on an outer surface thereof to be combined to the third guide groove and which has a third rotary hinge surface formed at a surface; a third fixed hinge part which encloses the third fixed hinge part, which has a third fixed hinge hole corresponding to the third rotary hinge hole, and which has a third fixed hinge surface formed on a side thereof to be corresponding to the third rotary hinge surface and a third fixed hinge projection formed on the other side to be fixed to the body; and a third hinge shaft extending through the third fixed hinge hole, the third rotary hinge hole and the third hinge sealing to be fixed to the third hinge chamber.

Further, the third hinge part includes: a third hinge housing which has a third hinge housing chamber with an opened top portion, which has a third guide groove formed lengthwise on a side wall thereof, and which has a third hinge housing formed at a side thereof and a third hinge sealing projection formed at the other side thereof; a third rotary hinge part which is installed to the third hinge housing, which has a third rotary hinge projection formed on an outer surface to be inserted in the third guide recess and a third hinge hole formed at a center portion thereof, and which has a third rotary hinge surface continuously and horizontally extending to the third hinge hole while having two-wave type of bending when rotating each time; a third fixed hinge part which is rotatably installed to the third hinge housing, which has a third fixed hinge surface formed at a side thereof to be corresponding to the third rotary hinge surface, which has a third hinge shaft formed on the third fixed hinge surface to be inserted in the third rotary hinge hole, and which has a third fixed hinge projection formed at the other side thereof to be inserted in the third hinge housing hole; and a third hinge sealing which is installed to the third hinge housing so that an end of the third hinge sealing is combined to the third hinge sealing projection and the other end elastically supports the second rotary hinge part.

Meanwhile, the hinge mechanism of portable phone according to the present invention comprises: a fourth housing which includes a fourth rotary chamber with an opened top portion, for mechanically connecting a cover to a body; a fourth hinge part which is installed to the fourth hinge chamber, for opening and closing the cover; and a fourth rotary part which is installed to the fourth rotary chamber, for rotating the cover, wherein the fourth rotary part includes: a fourth cylinder which has a fourth cylinder chamber with an opened bottom and a fourth cylinder hole formed in an upper surface thereof, which has a fourth arm projected from an upper portion thereof to be combined with the cover, and which has a fourth cylinder groove formed lengthwise on an outer surface thereof; a fourth compressed sealing which is installed to the fourth cylinder chamber; a fourth rotary slip part which has a fourth rotary slip hole formed at a center portion thereof, which has a fourth rotary slip projection formed on an outer peripheral surface thereof to be combined to the fourth cylinder groove and a pair of fourth rotary slip surface projected from a bottom surface thereof to be opposite to each other around the fourth rotary slip hole, and which has a fourth rotary plain surface formed at the upper portion thereof; a fourth fixed slip part which has a fourth polygonal hole at a center portion thereof, and which has a fourth fixed slip surface corresponding to the fourth rotary slip surface and a fourth fixed plain surface corresponding to the fourth rotary plain surface; a fourth center shaft which has a fourth polygonal projection formed at a lower portion thereof to be combined to the fourth polygonal hole, and which is vertically installed to a bottom surface of the fourth rotary chamber to sequentially extend the fourth polygonal hole, the fourth rotary slip hole, the fourth compressed spring and the fourth cylinder hole.

A fourth cylinder projection is formed at a bottom surface of the fourth cylinder, and a fourth stopping groove is formed at a bottom of the fourth rotary chamber, in which the fourth cylinder projection is inserted to stop the fourth cylinder at an initial position or at a position of being turned at 180 degree.

The fourth arm projection is formed at a bottom surface of the fourth arm, and a fourth housing stopping groove is formed on an upper surface of the fourth housing, in which the fourth arm projection is inserted to stop the fourth cylinder at an initial position or at a position of being turned at 180 degree.

A fourth screw part is formed at an end of the fourth center shaft, with which a fourth nut is associated to fix the fourth center shaft to the fourth cylinder.

The fourth hinge part includes: a fourth hinge housing which has a fourth hinge housing chamber with an opened upper portion, which has a fourth guide groove formed lengthwise on an inner surface thereof, and which has a fourth hinge housing hole formed at a side thereof and a fourth hinge sealing projection formed at the other side thereof; a fourth rotary hinge part which is installed to the fourth hinge housing, which has a fourth rotary hinge projection formed on an outer surface to be inserted in the fourth guide groove and a fourth rotary hinge hole formed at a center thereof, and which has a fourth rotary hinge surface continuously and horizontally extending to the fourth rotary hinge hole while having two-wave type of bending when rotating each time; a fourth fixed hinge part which is rotatably installed to the fourth hinge housing, which has the fourth rotary hinge surface formed at a side thereof to be corresponding to the fourth rotary hinge surface, which has a fourth hinge shaft formed on the fourth fixed hinge surface to be inserted in the fourth rotary hinge hole, and which has a fourth fixed hinge projection formed on the other surface thereof to be inserted in the fourth hinge housing hole; and which has a fourth hinge spring installed to the fourth hinge housing so that one end of the fourth hinge spring is combined to the fourth hinge spring and the other end elastically supports the fourth rotary hinge part.

The hinge mechanism of portable phone according to the present invention comprises: a fifth housing which includes a fifth rotary chamber with an opened upper portion, which has a fifth screw hole formed at a bottom surface thereof and fifth polygonal projections formed around the fifth screw hole, and a fifth hinge chamber formed at a side thereof, for mechanically connecting a cover to a body; a fifth hinge part which is installed to the fifth hinge chamber, for opening and closing the cover; and a fifth rotary part which is installed to the fifth rotary chamber, for rotating the cover, wherein the fifth rotary part includes: a fifth cylinder which has a fifth cylinder chamber with an opened lower portion, which has a fifth cylinder hole formed on an upper surface thereof and a fifth arm projected from an upper portion to be combined with the cover, and which has a fifth cylinder hole formed longwise on an outer surface; a fifth compressed spring which is installed in the fifth cylinder chamber; a fifth slip member which has a fifth rotary slip projection formed on an outer peripheral surface thereof to be inserted in the fifth cylinder hole, and which is installed to the fifth cylinder chamber and supported by means of the fifth compressed spring to rotate the fifth cylinder by sliding action; and a fifth center shaft which has a fifth head portion formed at an upper portion and a fifth screw portion formed at a lower portion, and which sequentially extends the fifth cylinder hole, the fifth compressed spring and the fifth slip member to be combined to the fifth screw hole.

The fifth slip member includes: a fifth slip part which has a fifth rotary slip hole formed at a center portion thereof and also a fifth rotary slip projection formed on an outer peripheral surface thereof to be combined to the fifth cylinder groove, and which continuously and horizontally extends to the fifth rotary slip hole while having two-wave type of bending when rotating each time; and a fifth fixed slip part which has a fifth polygonal hole, in which the fifth polygonal projection is inserted, formed at a center portion thereof and which has a fifth fixed slip surface formed on an upper surface to be corresponding to the fifth rotary slip surface.

The fifth slip member includes: a fifth rotary slip part which has a fifth rotary slip hole formed at a center portion thereof and a fifth rotary slip projection formed on an outer peripheral surface thereof to be combined to the fifth cylinder hole, and which has a fifth plain rotary slip surface formed at a bottom surface thereof; and a fifth fixed slip part which has a fifth polygonal hole, in which the fifth polygonal projection is inserted, formed at a center portion thereof and which has a fifth fixed slip surface formed on an upper portion to be corresponding to the fifth rotary slip surface.

The fifth slip member includes: a fifth rotary slip part which has a fifth rotary slip hole formed at a center portion thereof, which has a fifth rotary slip projection formed on an outer peripheral surface thereof to be combined to the fifth cylinder hole and a pair of fifth rotary slip surfaces formed at a bottom surface thereof to be opposite to each other about the fifth rotary slip hole, and which has a fifth rotary plain surface formed at an upper portion of the fifth rotary slip surface; and a fifth fixed slip part which has a fifth polygonal hole, in which a fifth polygonal projection is inserted, formed at a center portion thereof and which has a fifth fixed slip surface corresponding to the fifth rotary slip surface and a fifth fixed plain surface corresponding to the fifth rotary plain surface.

A fifth head portion of the fifth center shaft has a fifth instrument hole, in which an instrument is inserted, formed on an upper surface thereof and a fifth washer formed at a lower surface thereof.

The fifth hinge part includes: a fifth hinge housing which has a fifth hinge housing chamber with an opened upper portion, which has a fifth guide groove formed lengthwise in an inner surface, and which has a fifth hinge housing hole formed at a side thereof and a fifth hinge projection formed on the other side thereof; a fifth rotary hinge part which is installed at the fifth hinge housing, which has a fifth rotary hinge projection formed on an outer surface to be inserted in the fifth guide recess, which has a fifth hinge hole formed at a center portion thereof, and which has a fifth rotary hinge surface continuously and horizontally extending to the fifth rotary hinge hole while having two-wave type of bending when rotating each time; a fifth fixed hinge part which is rotatably installed to the fifth hinge housing, which has a fifth fixed hinge surface formed at a side thereof to be corresponding to the fifth rotary hinge surface and a fifth hinge shaft formed on the fifth fixed hinge surface to be inserted in the fifth hinge housing hole; and a fifth hinge spring which is installed to the fifth hinge housing so that one end of the fifth hinge spring is combined to the fifth hinge spring projection and the other end is inserted in the fifth hinge housing to elastically support the fifth rotary hinge part.

The hinge mechanism of portable phone according to the present invention comprises: a sixth housing including a sixth rotary chamber with an opened upper portion, and a sixth fixing groove which is formed at a bottom surface and in which a sixth housing polygonal hole is formed, which has a sixth hinge part is installed at a side thereof to open and close a cover, for mechanically connecting the cover to a body; a sixth cylinder which has a sixth cylinder chamber with an opened lower portion, which has a sixth cylinder hole formed on an upper surface and a sixth arm projected form an upper portion to be combined with the cover, and which has a sixth cylinder groove formed lengthwise in an inner surface thereof; a sixth compressed spring which is installed in the sixth cylinder chamber; a sixth slip member which has a sixth rotary slip projection formed on an outer peripheral surface thereof to be inserted in the sixth cylinder groove, and which is installed in the sixth cylinder chamber to be supported by means of the sixth compressed spring so as to rotate the sixth cylinder by sliding action; and a sixth center shaft which has a sixth polygonal projection formed at an upper portion thereof to be inserted in the sixth housing polygonal hole, which has a sixth head portion formed at the sixth polygonal projection, and which sequentially extends through the sixth housing polygonal hole, the sixth slip member and the sixth cylinder hole to be fixed to the sixth fixed groove.

The sixth slip member includes: a sixth rotary slip part which has a sixth rotary slip hole formed at a center portion thereof and a sixth rotary slip projection formed on an outer peripheral surface thereof to be combined to the sixth cylinder groove, and which has a sixth rotary slip surface continuously and horizontally extending to the sixth rotary slip hole while having two-wave type of bending when rotating each time; and a sixth fixed slip part which has a sixth polygonal hole, in which the sixth polygonal projection is inserted, formed at a center portion thereof and which has a sixth fixed slip surface corresponding to the sixth rotary slip wave surface.

The sixth slip member includes: a sixth rotary slip part which has a sixth rotary slip hole formed at a center portion thereof, which has a sixth rotary slip projection formed on an outer peripheral surface thereof to be combined to the sixth cylinder groove and a sixth plain rotary slip surface at a bottom portion thereof, and which has a pair of sixth rotary hemispheric groove formed on the sixth rotary slip surface; a sixth fixed slip part which has a sixth polygonal hole, in which the sixth polygonal projection is inserted, formed at a center portion thereof, which has a sixth fixed slip surface formed on an upper surface to be corresponding to the sixth rotary slip surface, and which has a sixth fixed hemispheric groove formed on the sixth fixed slip surface to be corresponding to the sixth rotary hemispheric groove; and a sixth ball which is inserted in the sixth rotary hemispheric groove and the sixth fixed hemispheric groove.

The sixth slip member includes: a sixth rotary slip part which has a sixth rotary slip hole formed at a center portion thereof, which has a sixth rotary slip projection formed on an outer peripheral surface to be combined to the sixth cylinder groove and a pair of sixth rotary slip surfaces formed on a bottom surface thereof to be opposite to each other about the sixth rotary slip hole, and a sixth rotary slip part which has a rotary plain surface formed at an upper portion of the sixth rotary slip surface; and a sixth fixed slip part which has a sixth polygonal hole, in which the sixth polygonal projection is inserted, formed at a center portion thereof, and which has a sixth fixed slip surface corresponding to the sixth rotary slip surface and a sixth fixed plain surface corresponding to the sixth rotary plain surface.

A sixth cutoff portion is formed on an upper surface of the sixth housing, through which a wire enters the sixth rotary chamber to electrically connect the cover to the body.

A sixth circuit pathway extends through the sixth housing from the sixth rotary chamber laterally.

A sixth screw hole is formed at a lower portion of the sixth center shaft, to which a sixth screw is combined to fix the sixth cylinder to the sixth center shaft.

A sixth instrument recess is formed on an upper surface of the sixth screw, to which a rotary instrument is combined, and a sixth washer is disposed between the sixth cylinder and the sixth screw.

A sixth pin hole is formed on an outer peripheral surface of an upper region of the sixth center shaft, to which a sixth pin is joined to fix the sixth cylinder to the sixth center shaft.

A sixth position fixing hole is formed in the sixth fixing groove, and a sixth position fixing projection is formed at the sixth head portion to be inserted in the sixth position fixing hole.

The sixth hinge part includes: a sixth hinge housing which has a sixth hinge housing chamber with an opened upper portion, which has a sixth guide recess formed longwise on an inner surface thereof, and which has a sixth hinge housing hole formed at a side thereof and a sixth hinge spring projection formed at the other side thereof; a sixth rotary hinge part which is installed to the sixth hinge housing, which has a sixth rotary hinge projection formed on an outer surface to be inserted in the sixth guide recess, which has a sixth rotary hinge hole formed at a center portion thereof, and which has a sixth rotary hinge surface continuously and horizontally extending to the sixth rotary hinge hole while having two-wave type of bending when rotating each time; a sixth fixed hinge part which is rotatably installed to the sixth hinge housing, which has a sixth fixed hinge surface corresponding to the sixth rotary hinge surface, which has a sixth fixed hinge surface formed on a side thereof to be corresponding to the sixth rotary hinge surface, which has a sixth hinge shaft formed on the sixth fixed hinge surface to be inserted in the sixth rotary hinge hole, and which a sixth fixed hinge projection formed on the other side thereof to be inserted in the sixth hinge housing hole; and a sixth hinge spring which is installed to the sixth hinge housing so that one end of the sixth hinge spring is combined to the sixth hinge spring and the other end elastically supports the sixth rotary hinge part.

The hinge mechanism of portable phone according to the present invention comprises: a seventh housing which is installed at a side thereof to open and close a cover so as to mechanically connect the cover to a body; a seventh fixed cylindrical part which is projected from an upper surface of the seventh housing, which has a pair of seventh grooves formed at a position opposite thereto on an outer peripheral surface thereof, and which has a seventh guide groove connecting the seventh grooves to each other; a seventh rotary cylindrical part which is rotatably combined to the seventh fixed cylindrical part, which has a seventh center hole in which the seventh fixed cylindrical part, which has a pair of seventh arms formed at a position opposite thereto on an outer peripheral surface thereof, which has a seventh spring chamber formed lengthwise on the seventh arm, and which has a seventh connecting hole to connect the seventh spring chamber to the seventh center hole; a seventh moving member which is movably inserted in the seventh spring chamber, and which has a seventh projection extending through the seventh connecting hole so as to be inserted in the seventh groove; and a seventh compressed spring which is inserted in the seventh spring chamber to elastically urge the seventh moving member to the seventh center hole.

Preferably, the seventh groove and seventh projection have a hemispheric shape.

A seventh annular groove is formed on an outer peripheral surface of an upper portion of the seventh fixed cylindrical part, and a seventh sealing is seated in the seventh annular groove to fix the seventh rotary cylindrical part to the seventh fixed cylindrical part.

A seven washer is disposed between the seventh rotary cylindrical part and the seventh sealing.

A seventh circuit pathway is formed at a side of the seventh housing to be communicated with the seventh cylindrical part.

The seventh hinge part includes: a seventh hinge housing which has a seventh hinge housing chamber with an opened upper portion, which has the seventh guide recess formed lengthwise on an inner surface thereof, which has a seventh hinge housing formed at a side thereof, and which has a seventh hinge spring projection formed on the other side thereof; a seventh rotary hinge part which is installed to the seventh hinge housing, which has a seventh rotary hinge projection formed on an outer peripheral surface thereof to be inserted in the seventh guide recess, which has a seventh rotary hinge hole formed at a center portion thereof, and which has a seventh rotary hinge surface continuously and horizontally extending to the seventh rotary hinge hole while having two-wave type of bending when rotating each time; a seventh fixed hinge part which is rotatably installed to the seventh hinge housing, which has a seventh fixed hinge surface formed at a side thereof to be corresponding to the seventh rotary hinge surface, which has a seventh hinge shaft formed on the seventh fixed hinge surface to be inserted in the seventh rotary hinge hole, and which has a seventh fixed hinge projection formed on the other side thereof to be inserted in the seventh hinge housing hole; and a seventh hinge spring which is installed to the seventh hinge housing so that one end of the seventh hinge spring is combined to the seventh hinge spring and the other end elastically supports the seventh rotary hinge part.

The hinge mechanism of portable phone according to the present invention comprises: a housing which has an eighth rotary chamber of which an eighth hinge part is installed at a side to open and close a cover, with an opened upper portion, for mechanically connecting the cover to a body; an eighth center shaft which has an eighth peripheral groove formed on an outer peripheral surface thereof, which has an eighth moving member installed in the eighth peripheral groove so as to be elastically supported, and which is fixed to a bottom surface of the eighth rotary chamber; an eighth cylinder which has an eighth cylinder chamber with an opened lower portion, which has an eighth cylinder hole formed on an upper surface thereof, which has an eighth cylinder groove formed on an inner peripheral surface thereof in which the eighth moving member is inserted, and which is rotatably installed to the eighth center shaft; and an eighth arm which is joined to an upper end of the eighth cylinder to be connected to the cover.

An eighth spring hole is formed in the eighth peripheral groove of the eighth center shaft, in which an eighth center shaft spring is installed in the eighth spring hole to elastically support the eighth moving member.

A bending portion is formed at a surface of the eighth moving member, and an eighth spring projection is formed at the other surface of the eighth moving member in which the eighth center shaft spring is inserted.

The eighth cylinder groove is formed in a concave shape along a length of the eighth cylinder, and an eighth bending portion is formed on a surface of the eighth moving member to be corresponding to the eighth cylinder groove while an eighth spring projection is formed at the other surface of the eighth moving member, in which the eighth center shaft spring is inserted.

The hinge mechanism of portable phone according to the present invention further comprises an eighth compressed spring installed in an upper end surface of the eighth center shaft and an inner surface of the eighth cylinder.

An eighth post is projected from an upper end of the eighth center shaft in which an eighth pin hole is perforated, and wherein an eighth pin is inserted in the eighth pin hole so that the eight cylinder is fixed to the eighth center shaft.

The eighth hinge part includes: an eighth hinge housing which has an eighth hinge housing chamber with an opened upper portion, which has an eighth guide groove formed lengthwise in a surface thereof, and which has an eighth hinge housing hole formed at a side thereof and an eighth hinge spring projection formed on the other surface thereof; an eighth rotary hinge part which is installed to the eighth hinge housing, which has an eighth rotary hinge projection formed on an outer surface to be inserted in the eighth guide recess and an eighth rotary hinge hole formed at a center portion thereof, and which has an eighth rotary hinge surface continuously and horizontally extending to the eighth rotary hinge hole while having two-wave type of bending when rotating each time; an eighth fixed hinge part which is rotatably installed to the eighth hinge housing, which has an eighth fixed hinge surface formed at a surface thereof to be corresponding to the eighth rotary hinge surface, which has an eighth hinge shaft formed on the eighth fixed hinge surface to be inserted in the eighth rotary hinge hole, and which has an eighth fixed hinge projection formed at the other surface thereof to be inserted in the eighth hinge housing hole; and an eighth hinge spring which is installed to the eighth hinge housing so that the one end of the eighth hinge spring is combined to the eighth hinge spring projection and the other end elastically supports the eighth rotary hinge part.

A camera lens is attached to an inner surface or outer surface of the cover to take a picture, and wherein a control switch is installed to a side of the body to control an operation of the camera lens.

BRIEF DESCRIPTION OF DRAWINGS

Other features and advantages of the present invention will become more apparent from the following description taken in connection with the accompanying drawings, wherein.

BEST MODE FOR CARRYING OUT THE INVENTION

Figure 1:
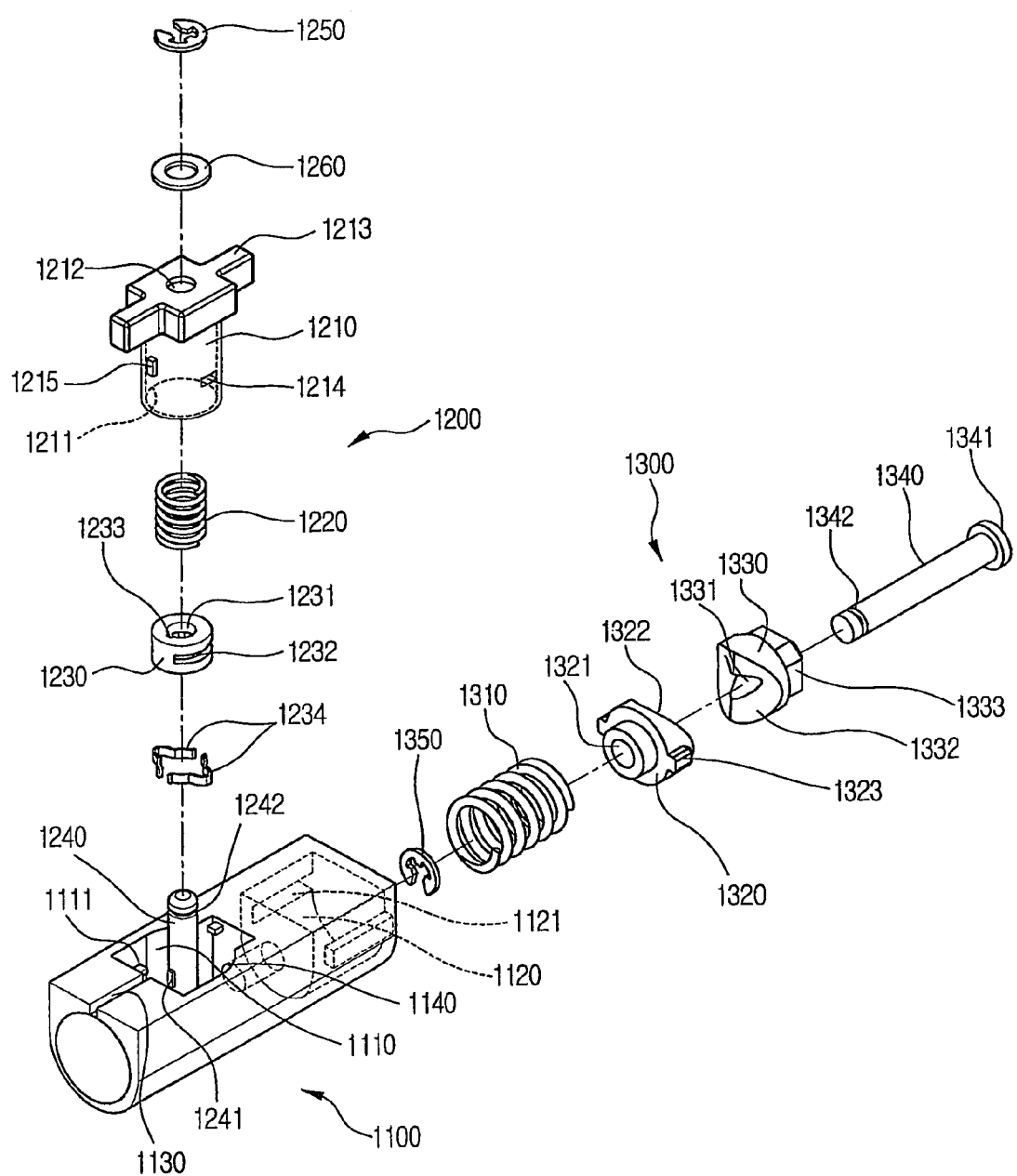
FIG. 1 is an exploded perspective view of a hinge mechanism of a portable phone according to a first embodiment of the present invention.

Hereinafter, a hinge mechanism of a portable phone according to the embodiments of the present invention will be described with reference to the accompanying drawings.

Like reference numerals indicate the same structural element. A description regarding the same operation of the element in the hinge mechanism will be omitted.

The First Embodiment

Hereinafter, a hinge mechanism of a portable phone according to a first embodiment of the present invention will be described.

Figure 2:
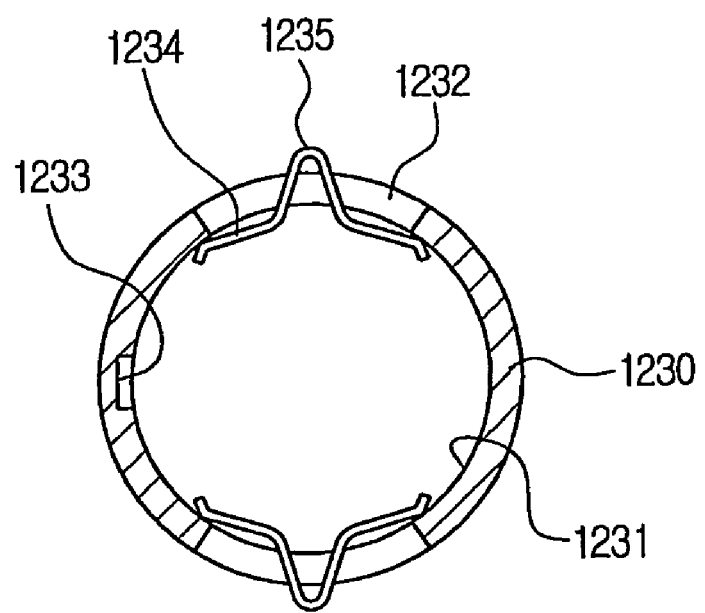
FIG. 2 is a sectional view of the hinge mechanism of the portable phone according to the first embodiment of the present invention as shown in FIG. 1, in which a first slip member is shown.
Figure 3:
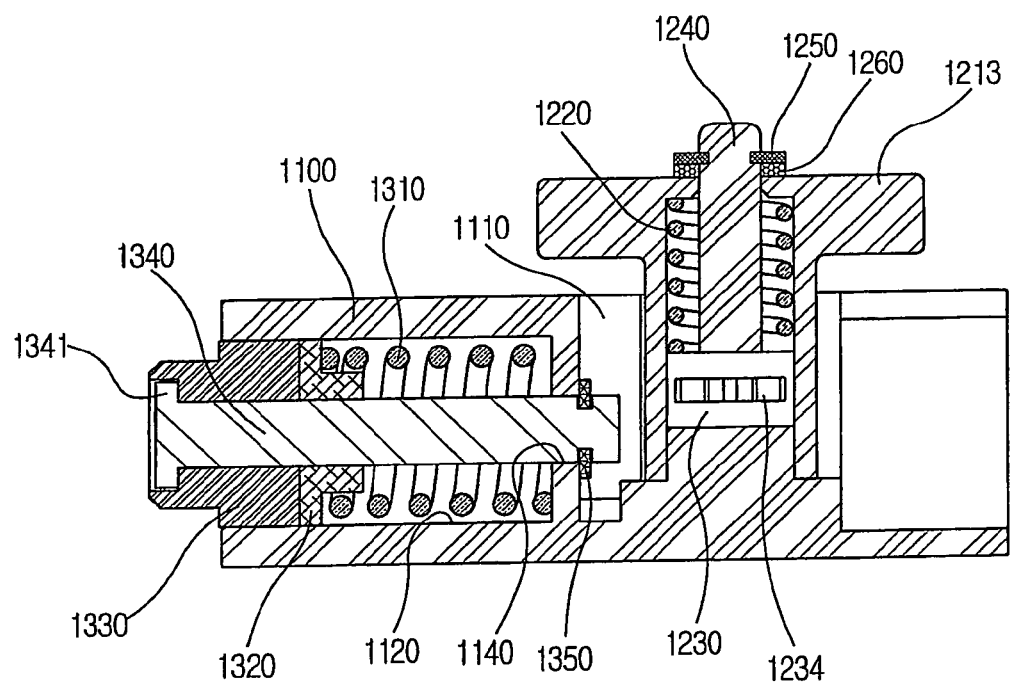
FIG. 3 is a sectional view of the hinge mechanism of the portable phone according to the first embodiment of the present invention as shown in FIG. 1, which shows the combination of the hinge mechanism.

FIG. 1 is an exploded perspective view of the hinge mechanism of the portable phone according to the first embodiment of the present invention, FIG. 2 is a sectional view of a first slip member of the hinge mechanism shown in FIG. 1, and FIG. 3 is a sectional view of the combination of the hinge mechanism shown in FIG. 1.

The hinge mechanism includes a first housing 1100 for mechanically connecting a cover 200 to a body 100 of the portable phone, a first rotary part 1200 which is installed to a first rotary chamber 1110 formed in the first housing 1100, for turning the cover 200 reversely, and a first hinge part 1300 which is installed in the first hinge chamber 1120, for opening and closing the cover 200.

A first cutoff 1130 is formed in the first housing 1100, through which a wire enters the first rotary chamber 1110 to electrically connect the cover 200 to the body 100 of the portable phone. A pair of first stoppers 1111 is formed at an angle of about 180 degree on an inner surface of the first rotary chamber 1110.

The first hinge chamber 1120 opens at a side thereof, in which a pair of first guide grooves 1121 is formed in parallel in a sidewall. Further, a first connecting hole 1140 is formed in an inner sidewall of the first hinge chamber 1120 to be communicated with the first hinge chamber 1120.

The first rotary part 1200 includes a first cylinder 1210 fixed to the cover 200, a first compressed spring 1220 which is inserted in the first cylinder 1210, a first slip member 1230 which is inserted in the first cylinder 1210 while compressing the first compressed spring, a first center shaft 1240 for supporting the first cylinder 1210, and a first sealing 1250 for fixing the first cylinder 1210 to the first center shaft 1240.

A first cylinder chamber 1211 is formed in the first cylinder 1210, which has an opened lower portion. Further, a cylinder hole 1212 is formed on an upper surface of the first cylinder 1210, through which the first center shaft 1240 extends. A first arm 1214 is projected from an upper portion of the first cylinder 1210 to be joined to the cover 200. The first arm 1213 is joined to the cover 200 by means of a joint member such as a screw and the like. Furthermore, a pair of leaf spring inserting holes 1214 is formed at both sides of the first cylinder 1210. Also, a first cylinder projection is formed on an outer peripheral surface of the first cylinder 1210 to restrict a rotation of the cover 200. The first stopper 1111 is latched by means of the first cylinder projection to prevent the rotation thereof. Thus, the first cylinder 1210 can be rotated about the first center shaft 1240 within a range of an angle of about 180 degree, repeatedly. As the rotation of the first cylinder 1210 is limited at the angle of about 180 degree, the wire connecting the cover 100 to the body 100 can be prevented from being twisted. Meanwhile, in order to prevent the wire from being twisted, a pair of first cylinder projections 1215 can be projected from both sides of the first cylinder 1210, while one first stopper 1111 may be formed in the inner surface of the first rotary chamber 1110.

In addition, in order to prevent the wire from being twisted, the first cylinder 1210 is preferably designed to be at a desired distance apart from the inner surface of the first rotary chamber 1110 when the first cylinder 1210 is assembled with the first rotary chamber 1110.

As shown in FIG. 2, a pair of leaf spring installing holes 1232 is formed on both sides of the first slip member 1230, in which a pair of leaf springs 1234 is fixedly inserted. A leaf spring projection 1235 is formed at an intermediate portion of the leaf spring 1234 which is inserted in the leaf spring installing hole 1232. Further, a first slip hole 1231 is formed at a center portion of the first slip member 1230, in which the first center shaft 1240 is inserted. A first slip groove 1233 is formed at a side of the first slip hole 1231. The leaf spring 1234 may be substituted with a linear spring or a projection having an elastic body.

The first center shaft 1240 is projected upwardly from a bottom surface of the first rotary chamber 1110. The first center shaft 1240 may be integrated with the first rotary chamber 1110 or it may be formed separately from the first rotary chamber 1110. A first annular groove 1242 is formed at an end of the first center shaft 1240 of which on an outer peripheral surface formed is a first center shaft projection 1241 which is inserted in the first slip groove 1233. Thus, the first slip part 1230 is fixed to the first center shaft 1240, which is prevented from rotating in the first rotary chamber 1110 by means of the first center shaft projection 1241.

The first sealing 1250 is seated in the first annular groove at an upper portion of the first cylinder 1210. Meanwhile, a first washer 1260 is disposed between the first cylinder 1210 and the first sealing 1250.

Furthermore, the first hinge part 1300 includes a first hinge spring 1310, a first rotary hinge part 1320, a first fixed hinge part 1330, a first hinge shaft 1340 and a first fixing ring 1350.

The first hinge spring 1310 is inserted in the first hinge chamber 1120.

The first rotary hinge part 1390 is inserted in the first hinge chamber 1120 from the outside of the first hinge spring 1310. A first rotary hinge hole 1321 is formed at a center portion of the first rotary hinge part 1320. A pair of first rotary hinge projection 1323 is formed on an outer peripheral surface of the first rotary hinge part 1320 to be combined with a first guide recess 1121 which is formed in the first hinge chamber 1120. Furthermore, a first rotary hinge surface 1322 is formed on a surface of the first rotary hinge part 1320 to continuously and horizontally extend to the first rotary hinge hole 1321 while having two-wave type of bending when rotating each time.

The first fixed hinge part 1330 is disposed outside of the first rotary hinge part 1320. A first fixed hinge hole 1331 is formed at a center portion of the first fixed hinge part 1330 to be corresponding to the first rotary hinge hole 1321. Further, a first fixed hinge surface 1332 is formed at the first fixed hinge part 1330 to face the first rotary hinge surface 1322. A first fixed hinge projection 1333 is formed on a surface of the first fixed hinge part 1330 to be fixed to the body 100.

The first hinge shaft 1340 extends through the first fixed hinge hole 1331, the first rotary hinge hole 1321, the first hinge spring 1310 and the first connecting hole 1140 so as to be installed in the first hinge chamber 1120. A first fixing groove 1342 is formed at a leading end of the first hinge shaft 1340, and a head portion of the first hinge shaft 1340 is formed at an opposite end. The first head portion 1341 prevents the first fixed hinge part 1330 from being released from the second hinge chamber 2120.

The first fixing ring 1350 is combined with the first fixing groove 1342 in the first rotary chamber 1110 to fix the first hinge shaft 1340 to the first hinge chamber 1120.

In the conventional portable phone, a liquid crystal display 210 turns off when the cover 200 is closed to the body 100. To the contrary, the portable phone of the present invention has a sensor and a controller turning on the liquid crystal display 210 even if the cover 200 is closed to the body 100 in the state of turning the cover 200 reversely in order for the liquid crystal display to be exposed outside.

On the other hand, the first hinge part and the first housing are not limited to the structure described above, which can be modified in variety.

Hereinafter, another example of the first hinge part and the first housing will be described.

Figure 4:
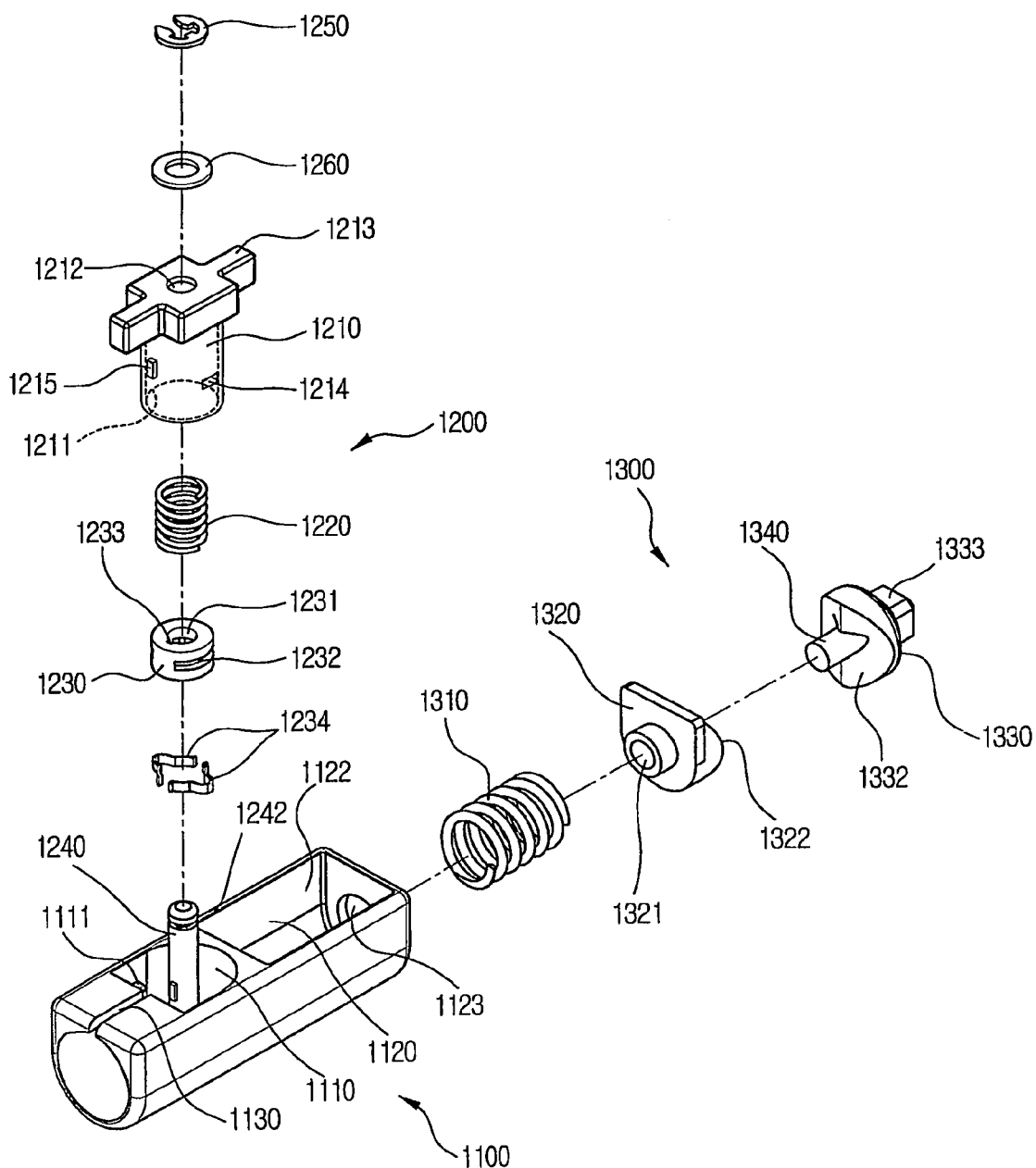
FIG. 4 is an exploded perspective view of an example of a first hinge part in the hinge mechanism of the portable phone according to the first embodiment of the present invention as shown in FIG. 1.
Figure 5:
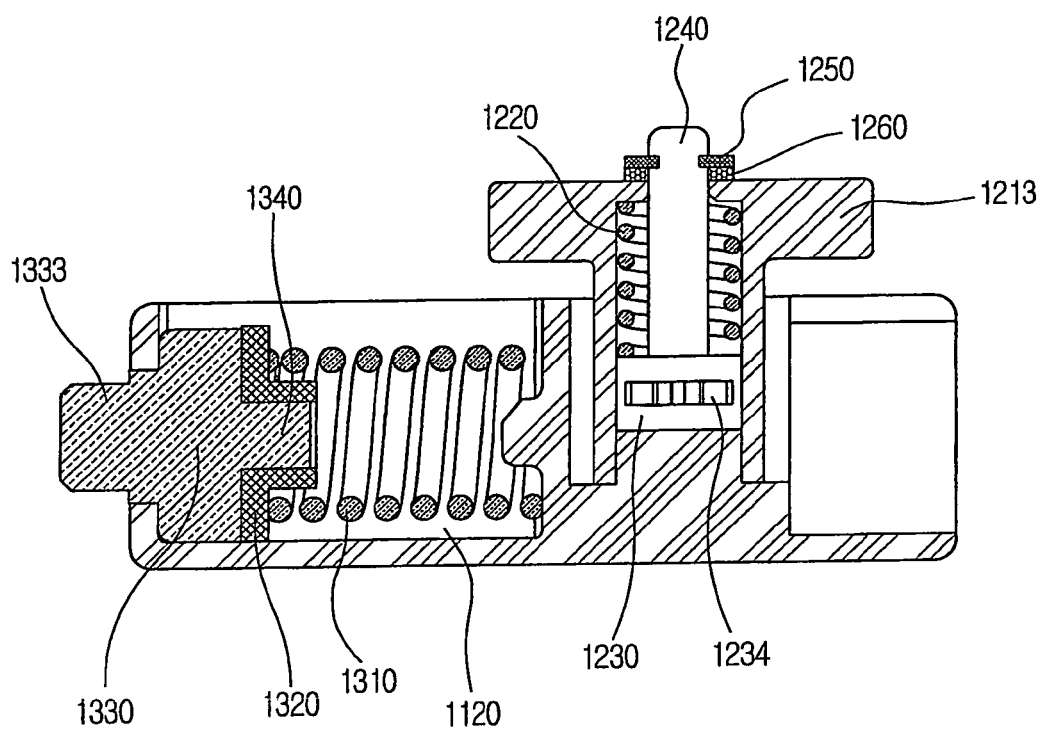
FIG. 5 is a sectional view of the hinge mechanism of the portable phone according to the first embodiment of the present invention as shown in FIG. 4, which shows the combination of the hinge mechanism.

FIG. 4 is an exploded perspective view of another example of the first hinge part in the hinge mechanism shown in FIG. 1, and FIG. 5 is a sectional view of the hinge mechanism shown in FIG. 4, which shows the combination of the hinge mechanism.

As shown in FIG. 4, the first cutoff portion 1130 is formed in the first housing 1100, through which a wire enters the first rotary chamber 1110 to electrically connect the cover 200 to the body 100. The pair of the first stopper 1111 is formed at an angle of about 180 degree in the first rotary chamber 1110. Further, a first hinge chamber hole 1123 is formed at an end surface of the first hinge chamber 1120 which has an opened upper portion (a first opening portion 1122).

The first hinge part 1300 includes a first hinge spring 1310, a first rotary hinge part 1320 and a first fixed hinge part 1330.

The first hinge spring 1310 provides elasticity to the first rotary hinge part 1320 and the second fixed hinge part 2330, which is inserted in the first hinge chamber 1120 through the first opening portion 1122 of the first housing 1100.

The first hinge part 1320 is cooperated with the first fixed hinge part 1330 to perform opening and closing of the cover 200.

The first rotary hinge part 1320 is designed not to rotate in the first hinge chamber 1120. Further, a first rotary hinge hole 1321 is formed at a center portion of the first rotary hinge part 1320. A first rotary hinge surface 1322 is formed on a side of the first hinge chamber 1120 to continuously and horizontally extends to the firs rotary hinge hole 1321 while having two-wave type of bending when rotating each time. Such first rotary hinge part 1320 is installed outside of the first hinge spring 1310.

The first fixed hinge part 1330 is not restricted when the first hinge chamber 1120 rotates. Furthermore, a first hinge shaft 1340 is formed on a side of the first fixed hinge part 1330, which is inserted in the first rotary hinge hole 1321 and the first hinge spring 1310 and in which a first fixed hinge surface 1332 is formed to be corresponding to the first rotary hinge surface 1322. Further, a first fixed hinge projection 1333 is formed on the other side of the first fixed hinge part 1330, which extends through the first hinge chamber hole 1123 formed in the first hinge chamber 1120 to be fixed to the body 100. Such first fixed hinge part 1330 is installed outside of the first rotary hinge part 1320 to the first hinge chamber 1120.

The first hinge spring 1310, the first rotary hinge part 1320 and the first fixed hinge part 1330 are inserted through the first opening portion 1122 of the first housing 1100 in and assembled with the first hinge chamber 1120.

The first rotary hinge part 1320 reciprocates slidably in the first hinge chamber 1120, which rotates along with the first housing 1100.

Since the first hinge shaft 1340 of the first fixed hinge part 1330 is inserted in the first rotary hinge hole 1321 of the first rotary hinge part 1320, the first rotary hinge surface 1322 can be stably combined with the first fixed hinge surface 1332. Further, as the first fixed hinge projection 1333 is fixed to the body 100, the first fixed hinge part 1330 do not rotate.

Hereinafter, another example of the first hinge part and the first housing will be described in detail.

Figure 6:
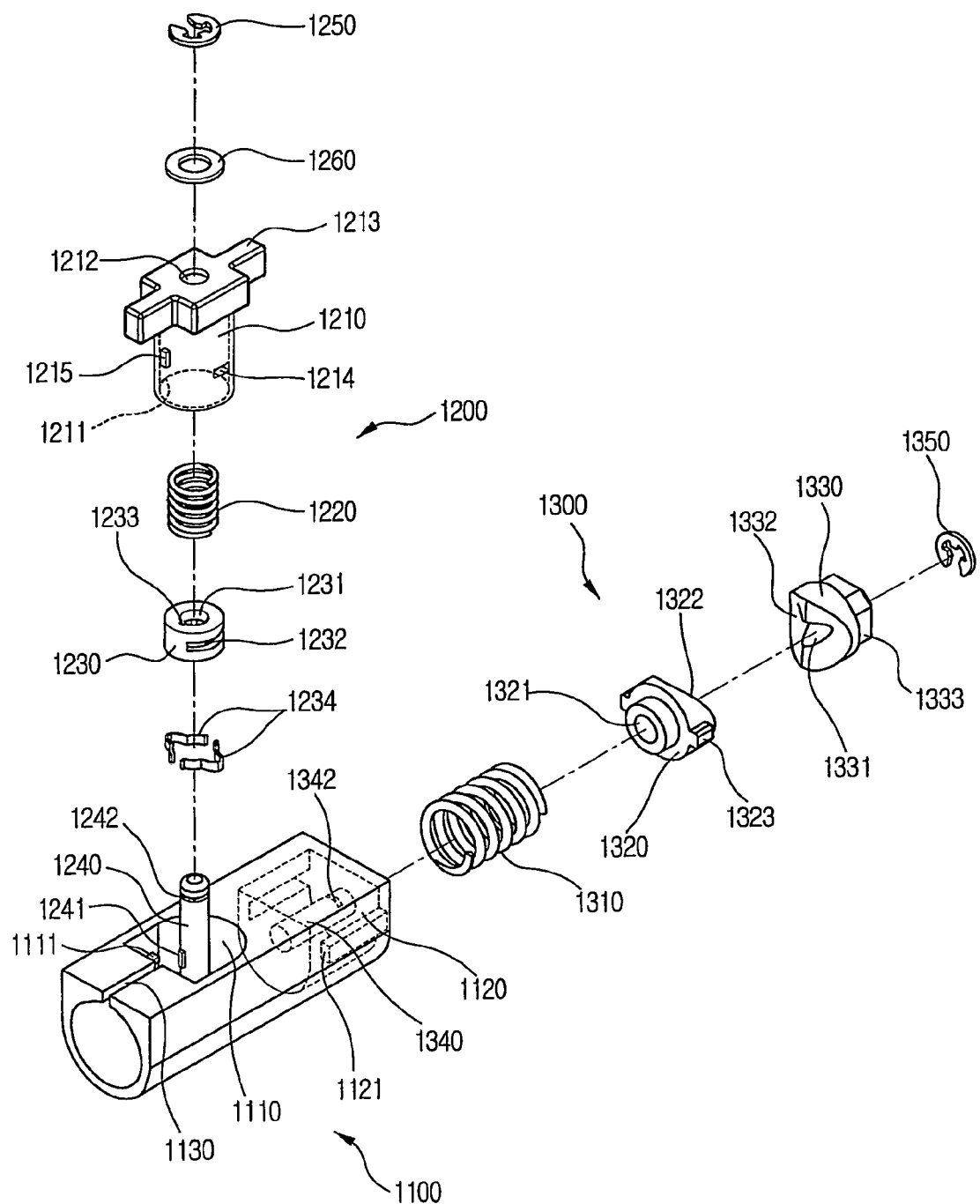
FIG. 6 is an exploded perspective view of another example of the first hinge part in the hinge mechanism of the portable phone according to the first embodiment of the present invention as shown in FIG. 1.
Figure 7:
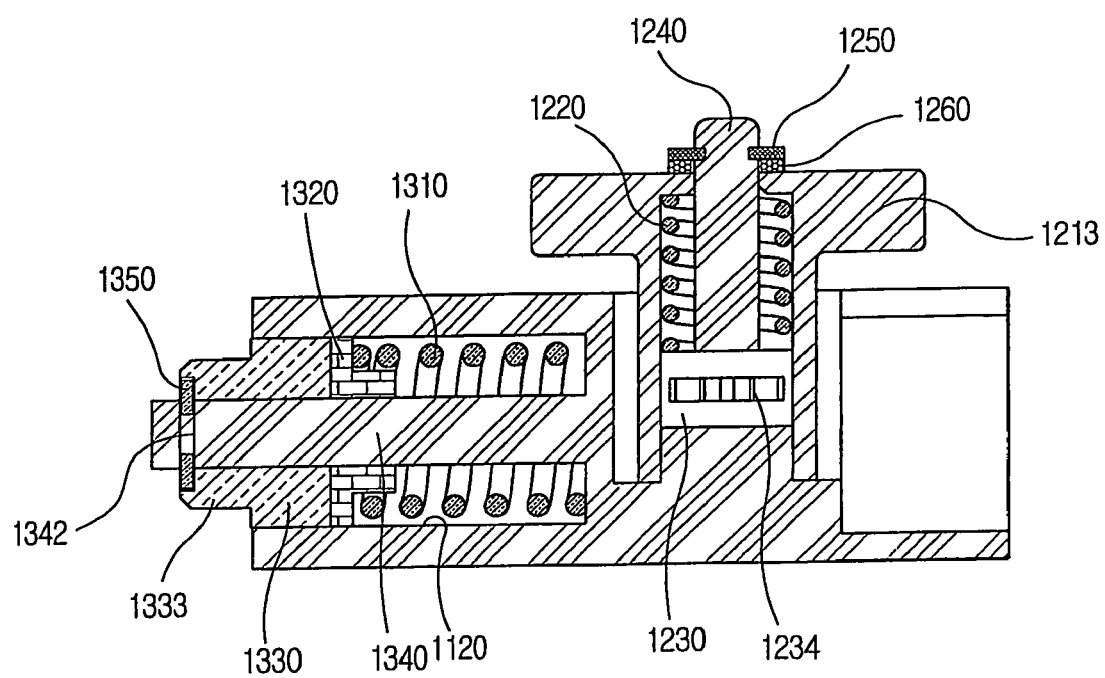
FIG. 7 is a sectional view of the hinge mechanism of the portable phone according to the first embodiment of the present invention as shown in FIG. 6, which shows the combination of the hinge mechanism.

FIG. 6 is an exploded perspective view of another example of the first hinge part in the hinge mechanism shown in FIG. 1, and FIG. 7 is a sectional view of the hinge mechanism shown in FIG. 6, which shows the combination of the hinge mechanism.

As shown in FIG. 6, the first cutoff portion 1130 is formed in the first housing 1100, through which a wire enters the first rotary chamber 1110 to electrically connect the cover 200 to the body 100. The pair of the first stopper 1111 is formed at an angle of about 180 degree in the first rotary chamber 1110. Further, the first hinge chamber 1120 has an opened side, of which on an inner surface a pair of first guide recess 1121 is formed in parallel.

The first hinge part 1300 includes a first hinge shaft 1340, a first hinge spring 1310, a first rotary hinge part 1320, a first fixed hinge part 1330 and a first fixing ring 1350.

The first hinge shaft 1340 is an element to support the hinge spring 1310, the first rotary hinge part 1320 and the first fixed hinge part 1330, which is projected outwardly form the inner surface of the first hinge chamber 1120. Further, a first fixing groove 1342 is formed at a leading end of the first hinge shaft 1340.

The first hinge spring 1310 is an element to provide elasticity to the first rotary hinge part 1320 and the second fixed hinge part 2330, which is inserted through the first hinge shaft 1340 in the first hinge chamber 1120.

The first rotary hinge hole 1321 is formed at a center portion of the first rotary hinge part 1320. A first rotary hinge projection 1323 is formed on an outer peripheral surface of the first rotary hinge part 1320 to be combined with the first guide recess 1121. Furthermore, a first rotary hinge surface 1322 is formed at a side of the first rotary hinge part 1320 to continuously and horizontally extends to the first rotary hinge hole 1321 while having two-wave type of bending when rotating each time. Such first rotary hinge part 1320 is installed outside of the first hinge spring 1310 in the first hinge chamber 1120.

The first fixed hinge part 1330 has a shape in order to rotate in the first hinge chamber 1120. Further, a first fixed hinge hole 1331 is formed at a center portion of the first fixed hinge part 1330 to be corresponding to the first rotary hinge hole 1321. A first fixed hinge surface 1332 is formed on a side of the first fixed hinge part 1330 to be corresponding to the first rotary hinge surface 1322. A first fixed hinge projection 1333 is formed at the other side of the first fixed hinge part 1330 to be fixed to the body 100.

The first fixing ring 1350 is a member to fix the first rotary hinge part 1320 and the first fixed hinge part 1330 to the first hinge shaft 1340, which is combined to the first fixing groove 1342 outside of the first fixed hinge projection 1333.

Hereinafter, an operation of the hinge mechanism of the portable phone constructed as described above will be described in detail.

The hinge mechanism shown in FIGS. 4 and 6 is operated such as the hinge mechanism shown in FIG. 1. Accordingly, the hinge mechanism shown in FIG. 1 will be described.

Figure 8:
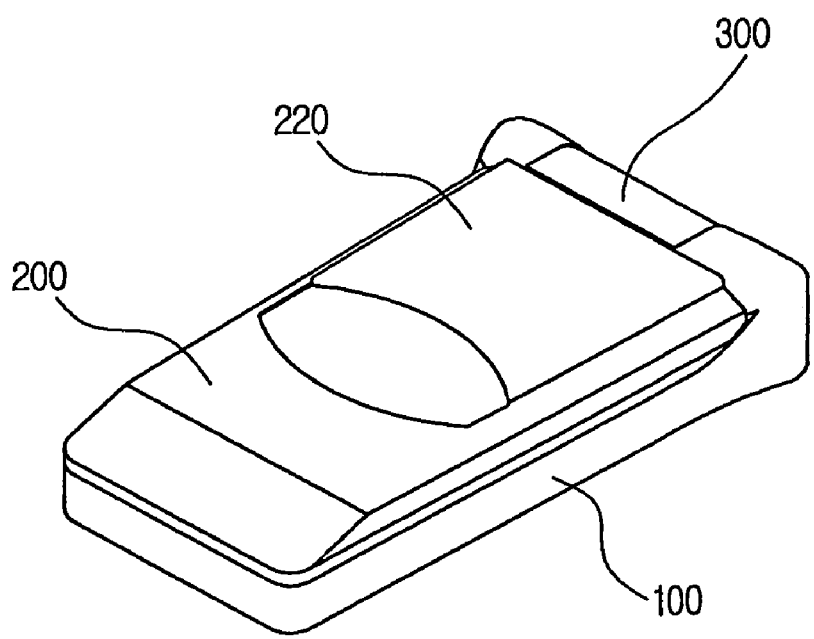
FIG. 8 is a perspective view of the portable phone to which the hinge mechanism according to the first embodiment of the present invention is applied, in which a cover is closed to a body of the portable phone.
Figure 9:
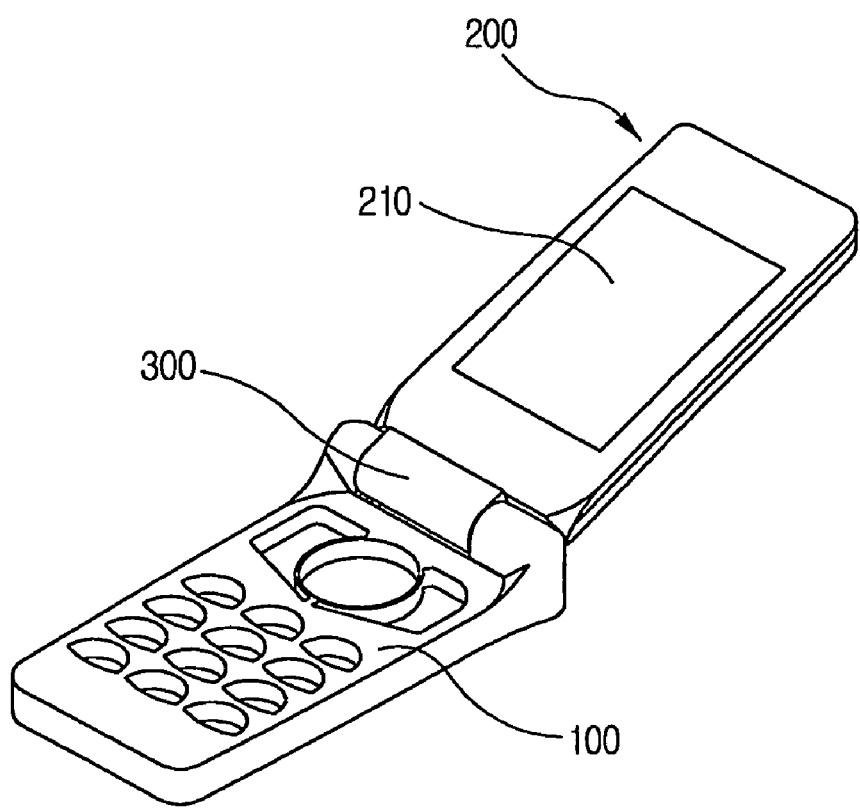
FIG. 9 is a perspective view of the portable phone as shown in FIG. 8, in which the cover is opened.
Figure 10:
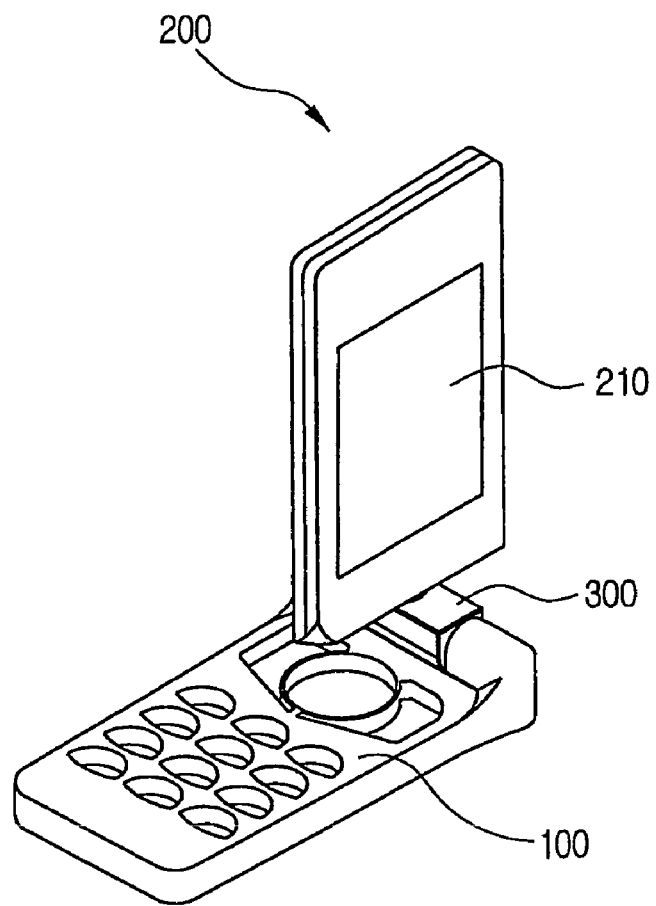
FIG. 10 is a perspective view of the portable phone as shown in FIG. 8, in which the cover rotates at an angle of 90 degree to the body of the portable phone.
Figure 11:
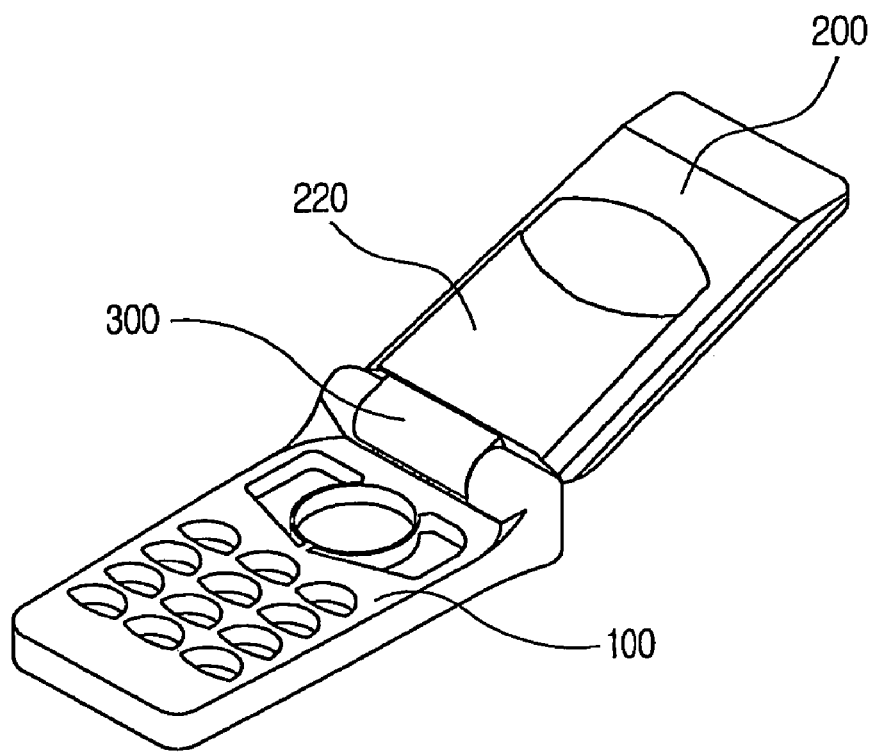
FIG. 11 is a perspective view of the portable phone as shown in FIG. 8, in which the cover turns reversely at an angle of 180 degree.
Figure 12:
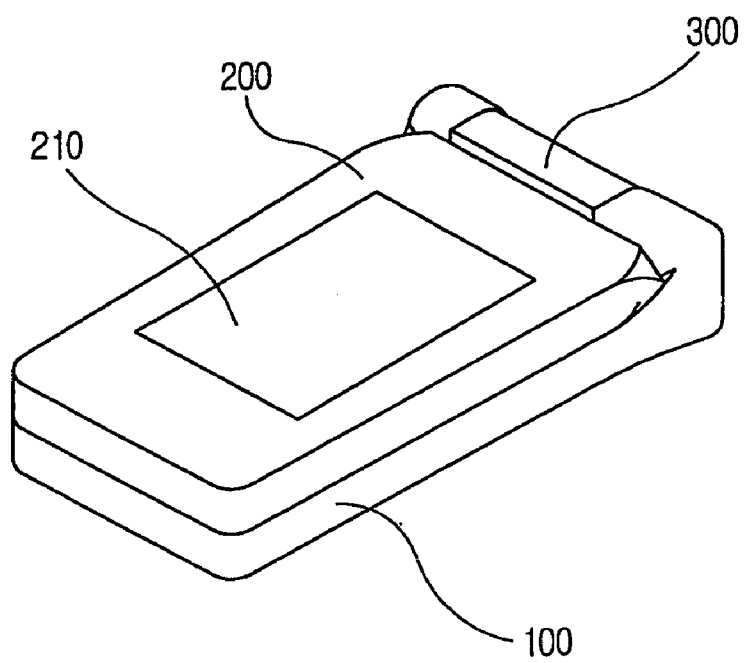
FIG. 12 is a perspective view of the portable phone as shown in FIG. 8, in which the reversed cover is closed.

FIG. 8 is a perspective view of the portable phone to which the hinge mechanism according to the first embodiment of the present invention is applied, in which the cover is open, FIG. 9 is a perspective view of the portable phone shown in FIG. 8, in which the cover is open, FIG. 10 is a perspective view of the portable phone shown in FIG. 8, in which the cover is open, FIG. 11 is a perspective view of the portable phone shown in FIG. 8, in which the cover turns reversely, and FIG. 12 is a perspective view of the portable phone shown in FIG. 8, in which the reversely turned cover is closed.

In the hinge mechanism, as shown in FIG. 3, the first center shaft 1240 which is formed in the first rotary chamber 1110 of the first housing 1100 extends through a first slip hole 1231 of the first slip member 1230, the first compressed spring 1220, a first cylinder hole 1212 of the first cylinder 1210 and the first washer 1260 to be fixed by means of the first sealing to the hinge mechanism. That is, all elements as mentioned above are combined with the first center shaft 1240.

Further, since the first center shaft projection 1241 of the first center shaft is jointed to the first slip groove 1233, the first slip member 1230 is fixed to the first center shaft 1240 so as not to rotate. When a projected portion of the pair of the leaf spring 1234, which is inserted in the leaf spring installing hole 1232 of the first slip member, is inserted in the leaf spring inserting hole 1214 of the first cylinder 1210, the cover can be held in open state or closed state.

Furthermore, a lower portion of the first compressed spring 1220 is supported by means of the first slip member 1230, and an upper portion of the first compressed spring comes in contact with the first cylinder 1210, so that the first cylinder 1210 has an upward and downward elasticity.

Meanwhile, the first hinge shaft 1340 extends through a first fixed hinge hole 1331 of the first fixed hinge part 1330, the first rotary hinge hole 1321 of the first rotary hinge part 1320, the first hinge spring 1310 and the first connecting hole 1140 to be projected to the first rotary chamber 1110. The first fixing ring 1350 is combined to the first fixing groove 1342 projected to the first rotary chamber 1110 in order to fix the first hinge shaft 1340 to the first hinge chamber 1120.

At this time, the first fixed hinge surface 1332 comes in surface contact with the first rotary hinge surface 1322, and the first hinge spring 1310 elastically supports the first rotary hinge part 1320.

Since the first rotary hinge projection 1323 is combined to the first guide recess 1121, the first rotary hinge part 1320 rotates along with the first housing 1100. Further, since the first fixed hinge projection 1333 is fixed to a receiving portion (not shown) of the body 100, the first fixed hinge part 330 cannot rotate.

In the state that the cover 200 is closed to the body 100, a mountaining portion of the first rotary hinge surface 1322 is held in the combination with a valley portion of the first fixed hinge surface 1332. Meanwhile, the liquid crystal display 210 is installed in an inner surface of the cover 200. Thus, when the cover 200 is closed to the body 100, the user cannot watch the liquid crystal display 210 of the cover 200.

A process of turning the cover 200 of the portable phone reversely will be described.

Firstly, the cover 200 is rotated about the first housing 1100 from the body 100 to open.

When the cover 200 is open, the first cylinder 1210 combined with the cover 200 rotates about the first housing 1100, while the first housing 1100 to which the first cylinder 1210 is fixed rotates along with the first cylinder 1210. At this time, the first rotary hinge part 1320 which is installed to the first hinge chamber 1120 is intersected with the first fixed hinge part 1330 fixed to the body 100 so that the first fixed hinge surface 1332 may be sliding along the first rotary hinge surface 1322.

When the cover 200 is released from the body 100 to open somewhat, the mountain portion of the first rotary hinge surface 1322 is slidably moved to the mountain portion of the first fixed hinge surface 1332. At this time, the first hinge spring 1310 is compressed to the utmost.

Then, when the cover 200 is opened completely, the mountain portion of the first rotary hinge surface 1322 passes over the mountain portion of the first fixed hinge surface to be engaged with the valley portion of the first fixed hinge surface. Thus, the first hinge spring 1310 is extended to elastically support the first rotary hinge part 1320.

At this time, the first hinge shaft 1340 is inserted in the first fixed hinge hole 1331 and the first rotary hinge hole 1321 so as to support the first rotary hinge part 1320 and the first fixed hinge part 1330. Since the first rotary hinge projection 1323 is inserted in the first guide recess 1121, the first hinge rotary hinge part 1320 is prevented from being rotated in the first hinge chamber 1120, so as to be straightly moved by elasticity of the first hinge spring 1310.

When the cover 200 is rotated in clockwise or counter-clockwise direction with an opened state, the first cylinder 1210 fixed to the cover 200 rotates along with the cover 200. However, since the first slip member 1230 is fixed to the first center shaft 1240, the first slip member 1230 cannot be rotated. The leaf spring 1234 is compressed as the first cylinder 1210 rotates, while the leaf spring projection is released from the leaf spring inserting hole 1214. When the cover 200 is turned reversely, the leaf spring projection is inserted in the leaf spring inserting hole 1214 again, resulting in stopping the rotation of the cover 200.

The first cylinder projection 1215 of the first cylinder 1210 is blocked by means of the first stopper 1111 formed in the first rotary chamber 1110. Accordingly, the rotation angle of the first cylinder 1210 is limited. As the result, the wire or a flexible PCB connecting the cover 200 to the body 100 can be prevented from being twisted.

When the user closes the cover 200, the liquid crystal display 210 of the cover 200 is exposed. Thus, the user can watch the liquid crystal display in the state that the cover 200 is closed. The controller can turn the liquid crystal display 210 on.

Meanwhile, when the user does not watch the liquid crystal display 210 of the cover 200, the user handles the portable phone in reverse order. That is, the cover is rotated such that the liquid crystal display 210 is directed to the body 100, and then the body 100 is closed.

The Second Embodiment

Hereinafter, the hinge mechanism of the portable phone according to the second embodiment of the present invention will be described.

Figure 13:
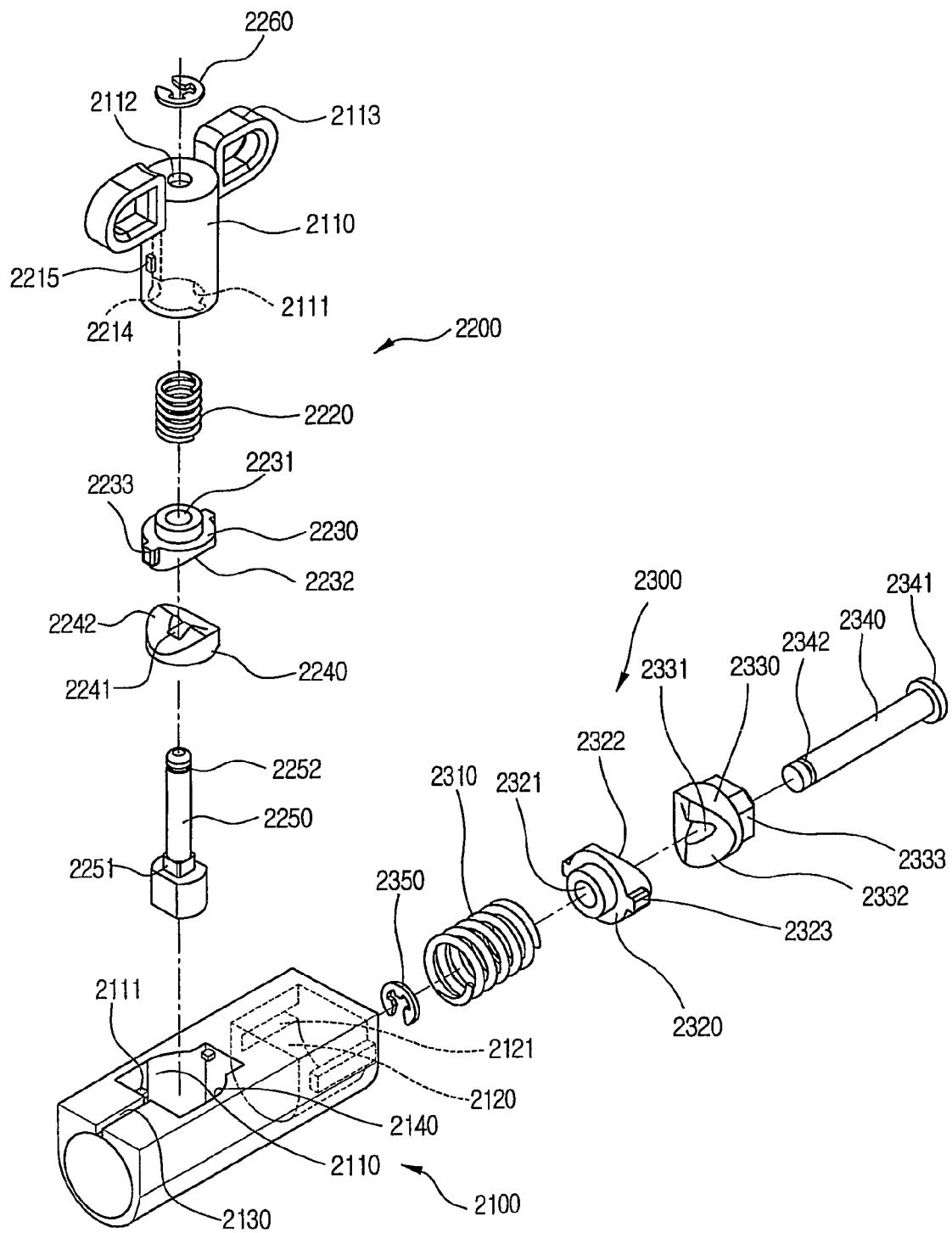
FIG. 13 is a perspective view of a hinge mechanism of a portable phone according to a second embodiment of the present invention.

FIG. 13 is an exploded perspective view of the hinge mechanism of the portable phone according to the second embodiment of the present invention. As shown in FIG. 13, the hinge mechanism according to the second embodiment includes a second housing 2100 for mechanically connecting the cover 200 to the body 100, a second rotary part which is installed in a second rotary chamber 2110 formed in the second housing 2100, for turning the cover 200 reversely, and a second hinge part 2300 which is inserted in the second rotary chamber 2110 formed in the second housing 2100, for opening and closing the cover 200.

Here, the description relating to the structure and the operation of the second housing 2100 and the second rotary part 2200 will be omitted because of having the same structure and the operation as the hinge mechanism according to the first embodiment of the present invention.

The second rotary part 2200 according to the second embodiment includes a second cylinder 2210, a second compressed spring 2220, a second rotary slip part 2230, a second fixed slip part 2240, a second center shaft 2250 and a second E-shaped ring 2260.

The second cylinder 2210 has a second cylinder chamber 2211 with an opened lower portion. The second cylinder groove 2214 is formed on inner surface of the second cylinder chamber 2211 lengthwise. The second arm 2213 is projected on the outer peripheral surface of the second cylinder 2210, which is fixed to the cover 200 by means of the jointing means such as a screw and the like.

Further, the second cylinder 2215 is formed on an outer peripheral surface of the second cylinder 2213 to limit the rotation angle of the cover 200.

Figure 15:
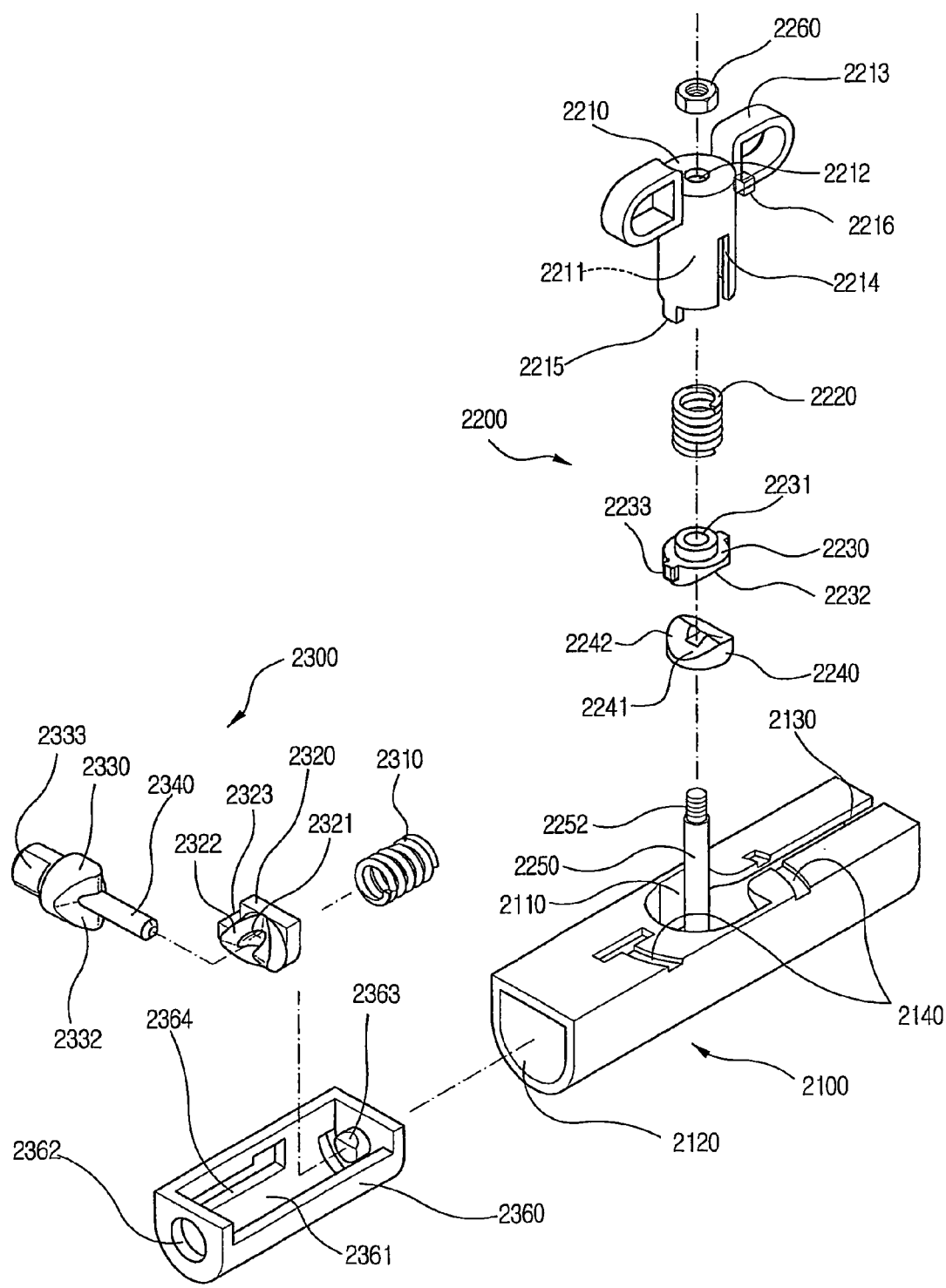
FIG. 15 is an exploded perspective view of another example of the second hinge part and a second rotary part in the hinge mechanism of the portable phone according to the second embodiment of the present invention as shown in FIG. 14.
Figure 16:
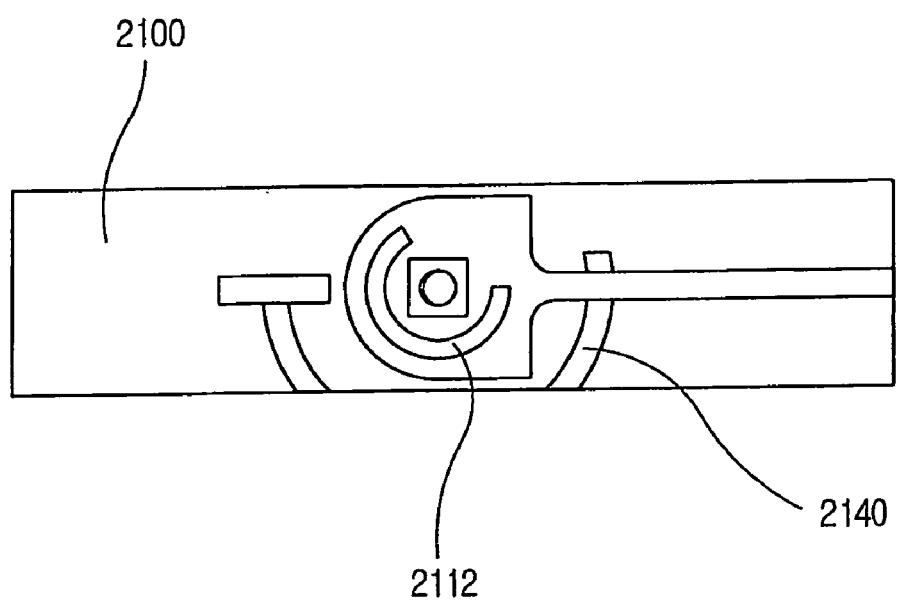
FIG. 16 is a plan view of a second housing of the hinge mechanism of the portable phone according to the second embodiment of the present invention as shown in FIG. 15.

As shown in FIGS. 15 and 16, meanwhile, the second cylinder projection 2215 is formed on the bottom surface of the second cylinder 2210, while the second cylinder projection 2215 is inserted in the bottom surface of the second rotary chamber 2110 to establish the second stopping groove 2112 in order to stop the second cylinder at an initial position or at a position of turning at an angle of 180 degree, thereby limiting the rotation angle of the cover 200. Furthermore, the second arm projection 2216 is formed on the bottom surface of the second arm 2213, while the second arm projection 2216 is inserted in the upper surface of the second housing 2100 to establish the second housing stopping groove in order to stop the second cylinder 2210 at an initial position or at a position of turning at an angle of 180 degree, thereby limiting the rotation angle of the cover 200.

The second compressed spring 2220 provides elasticity, which is installed in the second cylinder chamber 2211.

The second rotary slip part 2230 is cooperated with the second fixed slip part 2240 to perform the rotating movement of the second rotary part. The second rotary slip hole 2231 is formed at a center portion of the second rotary slip part 2230. The third rotary slip projection 3233 is formed on an outer peripheral surface of the second rotary slip part 2230 to be slidably inserted in the second cylinder groove 2214. Furthermore, the second rotary slip surface 2232 is formed at a bottom surface of the second rotary slip part 2230 to continuously and horizontally extend to the second rotary slip hole 2231 while having two-wave type of bending when rotating each time.

The second polygonal hole 2241 is formed at a center portion of the second fixed slip part 2240. Further, the second fixed slip surface is formed to be corresponding to the second rotary slip surface 2232.

The second center shaft 2250 is an element to support the members mentioned above, which is combined in order with the second polygonal hole 2241, the second rotary slip hole 2231, the second compressed spring 2220 and the second cylinder hole 2212. The second annular groove is formed at an end of the second center shaft 2250. The second polygonal projection 2251 is formed at the other end of the second center shaft 2250 to be inserted in the second polygonal hole 2241. That is, the second polygonal projection 2251 has a shape corresponding to the second polygonal hole 2241.

The second center shaft 2250 is fixedly and vertically installed to the first rotary chamber 1110. On the other hand, the second center shaft 2250 is integrally formed in the first rotary chamber 1110.

The second E-shaped ring 2260 is an element to fix the second cylinder to the second center shaft 2250, which is combined with the second annular groove 2252 from an upper portion of the second cylinder hole 2212.

Hereinafter, the other example of the second hinge part will be described.

Figure 14:
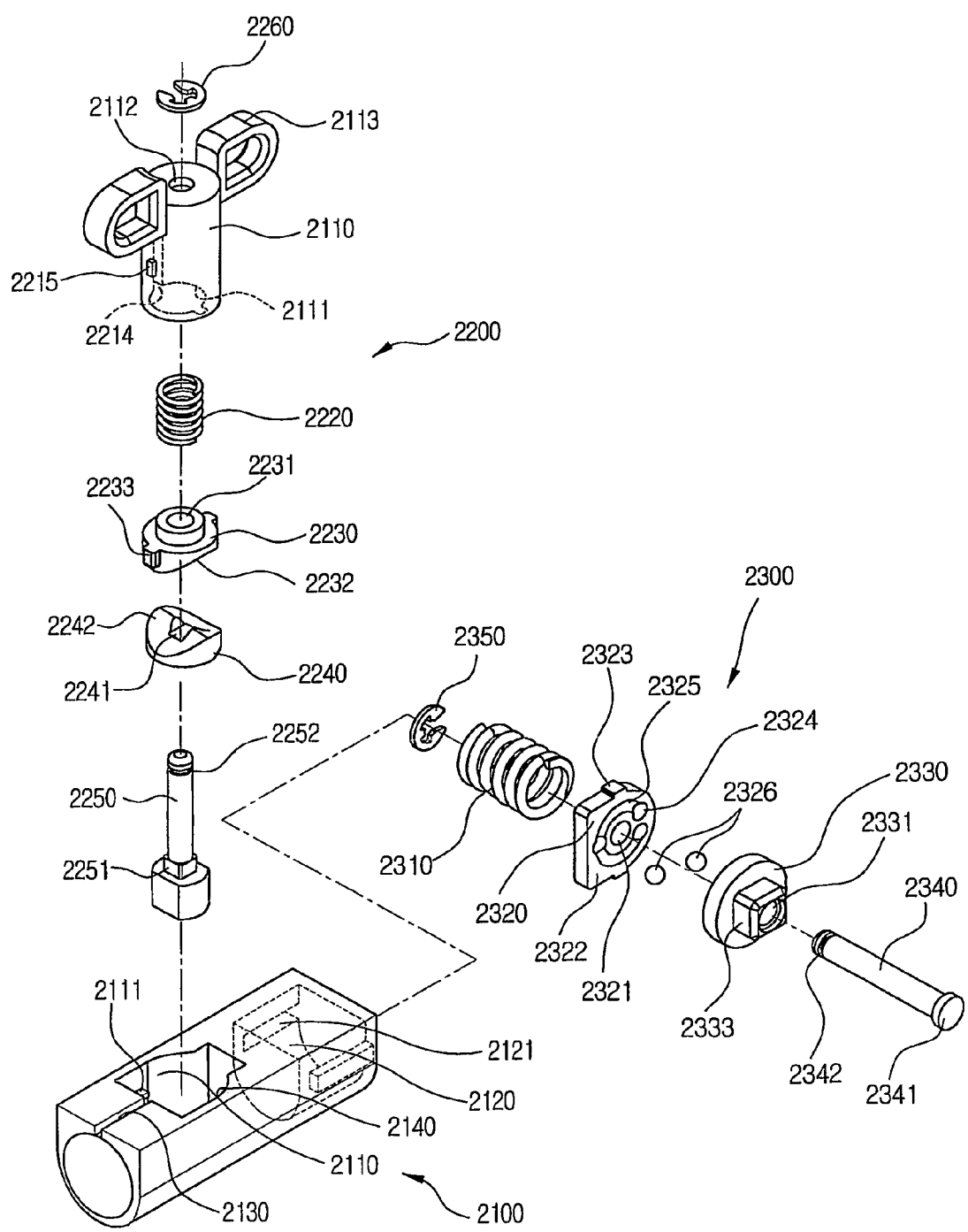
FIG. 14 is an exploded perspective view of an example of a second hinge part in the hinge mechanism of the portable phone according to the second embodiment of the present invention as shown in FIG. 13.

FIG. 14 is an exploded perspective view of the other example of the second hinge part in the hinge mechanism shown in FIG. 13.

As shown in FIG. 14, the second hinge part 2300 includes a second hinge spring 2310, a second rotary hinge part 2320, a second fixed hinge part 2330, a second hinge shaft 2340 and a second fixing ring 2350.

The second hinge spring 2310 is an element to elastically support the second rotary hinge part 2320 and the second fixed hinge part 2330, which is inserted in the second hinge chamber 2120.

The second fixed hinge part 23330 is cooperated with the second rotary hinge part 2320 to perform the opening and closing of the cover 200.

The second rotary hinge hole 2321 is formed at a center portion of the second rotary hinge part 2320. A second rotary hinge projection is formed on an outer peripheral surface of the second rotary hinge part 2320, which is combined with the second guide recess formed in parallel in a side surface of the second hinge chamber 2120. Further, a second plain rotary hinge surface 2232 is formed on a surface of the second rotary hinge part 2320. A pair of second hemispheric groove 2324 is formed on the second rotary hinge surface 2322 to be arranged around the second rotary hinge hole 2321. A second induction recess 2325 connects the second hemispheric groove 2324 to each other in circle. Such second rotary hinge part 2320 is inserted in the second hinge chamber 2120 from outside of the second hinge spring 2310.

The second fixed hinge hole 2331 is formed at a center portion of the second fixed hinge part 2330 to be corresponding to the second rotary hinge hole 2321. Further, the second fixed hinge surface 2332 is formed on a side surface of the second fixed hinge part 2330 to be corresponding to the second rotary hinge surface 2322. A pair of second balls 2326 is fixed to the second fixed hinge surface 2332, which is inserted in the second hemispheric groove 2324. The second fixed hinge projection 23333 is projected on the other surface of the second fixed hinge part 2330, which is fixed to the body 100. The second fixed hinge part 2330 is inserted in the second hinge chamber 2120 from outside of the second rotary hinge part 2320.

The second hinge shaft 2340 is a member to support the above-mentioned elements, which is combined with the second fixed hinge hole 2331, the second rotary hinge hole 2321 and the second hinge spring 2310. Further, the second fixed groove 2342 is formed at an end of the second hinge shaft 2340. A head portion 2341 of the second hinge shaft 2340 is formed at the other end of the second hinge shaft 2340.

The second fixing ring 2350 is a member to connect the second hinge shaft to the second hinge chamber 2120, which is jointed to the second fixed groove 2342 in the second rotary chamber 2110.

Meanwhile, still another example of the second hinge part 2300 is shown in FIG. 15.

As shown in FIG. 15, the second hinge part 2300 has the second hinge housing 2360 which is separately manufactured, in which the second hinge spring 2310, the second rotary hinge part 2320 and the second fixed hinge part 2330 are assembled in order.

The second hinge housing 2360 has the second hinge housing chamber 2361 with an opened upper portion, in which the second guide groove 2364 is formed lengthwise on an inner surface. Further, the second hinge housing hole 2362 is formed on a surface of the second hinge housing 2360, while the second hinge housing projection 2363 is formed on the other surface of the second hinge housing 2360.

The second rotary hinge projection 2323 is formed on an outer peripheral surface of the second rotary hinge part 2320, which is inserted in the second guide recess 2121 and in which the second rotary hinge hole 2321 is formed at a center portion thereof. Furthermore, the second rotary hinge surface 2322 is formed on a surface of the second rotary hinge part 2320 so as to continuously and horizontally extend to the second rotary hinge hole 2321, while having two-wave type of bending when rotating each time.

The second fixed hinge part 2330 has a shape to be rotatable in the second hinge housing 2360. The second fixed hinge surface 2332 is formed at a surface of the second fixed hinge part 2330 to be corresponding to the second rotary hinge surface 2322. The second hinge shaft 2340 is integrally formed on the second rotary hinge surface 2322, which is inserted in the second rotary hinge hole 2321. The second fixed hinge projection 2333 is formed at the other surface of the second fixed hinge part 2330.

The second hinge spring 2310 is inserted in the second hinge housing 2360 so that one end of the second hinge spring 2310 is combined with the second hinge housing projection 2363 and the other end of the second hinge spring 2310 elastically supports the second rotary hinge part 2320.

Hereinafter, an operation of the hinge mechanism of the portable phone having the above-described structure will be described.

The hinge mechanism shown in FIGS. 14 and 15 performs the same operation as the hinge mechanism shown in FIG. 13. The hinge mechanism according to the second embodiment shown in FIG. 13 has a similar operation to the hinge mechanism of the portable phone according to the first embodiment. Thus, the operation of the second rotary part of the second embodiment shown in FIG. 13 only will be described.

The second cylinder 2210 is fixed to the cover 200, and the second rotary slip projection 2233 of the second rotary slip part 2230 is combined with the second cylinder groove 2214 of the second cylinder 2210. When the cover 200 is rotated, therefore, the second cylinder 2210 and the second rotary slip part 2230 are rotated along with the cover 200.

Since the second center shaft 2250 is fixed to the first rotary chamber 1110 of the second housing 2100, while the second polygonal projection 2251 is inserted in the second polygonal hole 2241, the rotation of the second fixed slip part 2240 can be prevented.

In addition, the second compressed spring 2250 elastically and outwardly supports the second rotary slip part 2230 so that the second rotary slip surface 2232 comes in elastic contact with the second fixed slip surface 2242. At this time, the mountain portion of the second fixed slip surface 2242 is engaged with the valley portion of the second rotary slip surface 2232.

A process that the user turns the liquid crystal display 210 reversely to expose the liquid crystal display outside is as follows.

Firstly, the user rotates the cover about the first housing 1100 from the body 100 to open the cover 200.

When the user rotates the cover 200 in clockwise or counterclockwise direction in the state of opening the cover 200, the second cylinder 2210 fixed to the cover 200 rotates along with the cover 200. Thus, the second cylinder 2210 and the second rotary slip part 2230 are rotated along with the cover 200, while the second fixed slip part 2240 fixed to the second center shaft 2250 cannot be rotated.

When the cover 200 stars to rotate, the second fixed wave surface is slidably rotated against the second rotary slip surface 2232. When the cover 200 rotates somewhat, the mountain portion of the second rotary slip surface 2232 is slidably moved to the mountain portion of the second fixed slip surface 2242. At this time, the second compressed spring 2220 is compressed to the utmost.

When the cover 200 is turned reversely, the mountain portion of the second slip surface 2232 passes over the mountain portion of the second fixed slip surface 2242 to be engaged with the valley portion of the second fixed slip surface 2242. At this time, the second compressed spring 2220 is extended to elastically support the second fixed slip part 2240.

At this time, the second center shaft 2250 is inserted in the second polygonal hole 2241 and the second rotary slip hole 2231 so as to support the second rotary slip part 2230 and the second fixed slip part 2240 in order to smoothly rotate the cover 200. Since the second rotary slip projection 22333 of the second rotary slip part 2230 is combined with the second cylinder groove 2214 of the second cylinder 2210, the second rotary slip part 2230 rotates along with the second cylinder 2210.

The second cylinder projection 2215 of the second cylinder 2210 is stopped by means of the second stopper 2111 of the first housing 1100. Accordingly, the rotation angle of the cover 200 can be limited.

In this state, when the user rotates to close the cover 200, the liquid crystal display 210 of the cover 200 is turned reversely to expose the liquid crystal display 210 to outside environment. At the result, the user can watch the liquid crystal display 210 in the state that the cover 200 is closed.

To the contrary, when the user does not want to watch the liquid crystal display 210, the user operates the cover in reverse order so that the liquid crystal display 210 is rotated toward the body 100 to be closed against the body 100.

Meanwhile, the structures of the second hinge part and the second housing is not limited to the embodiments as described above, thereby being modified in variety of well known structures.

The Third Embodiment

Hereinafter, the cover hinge device of a portable phone according to the third preferred embodiment of the present invention will be explained.

Figure 17:
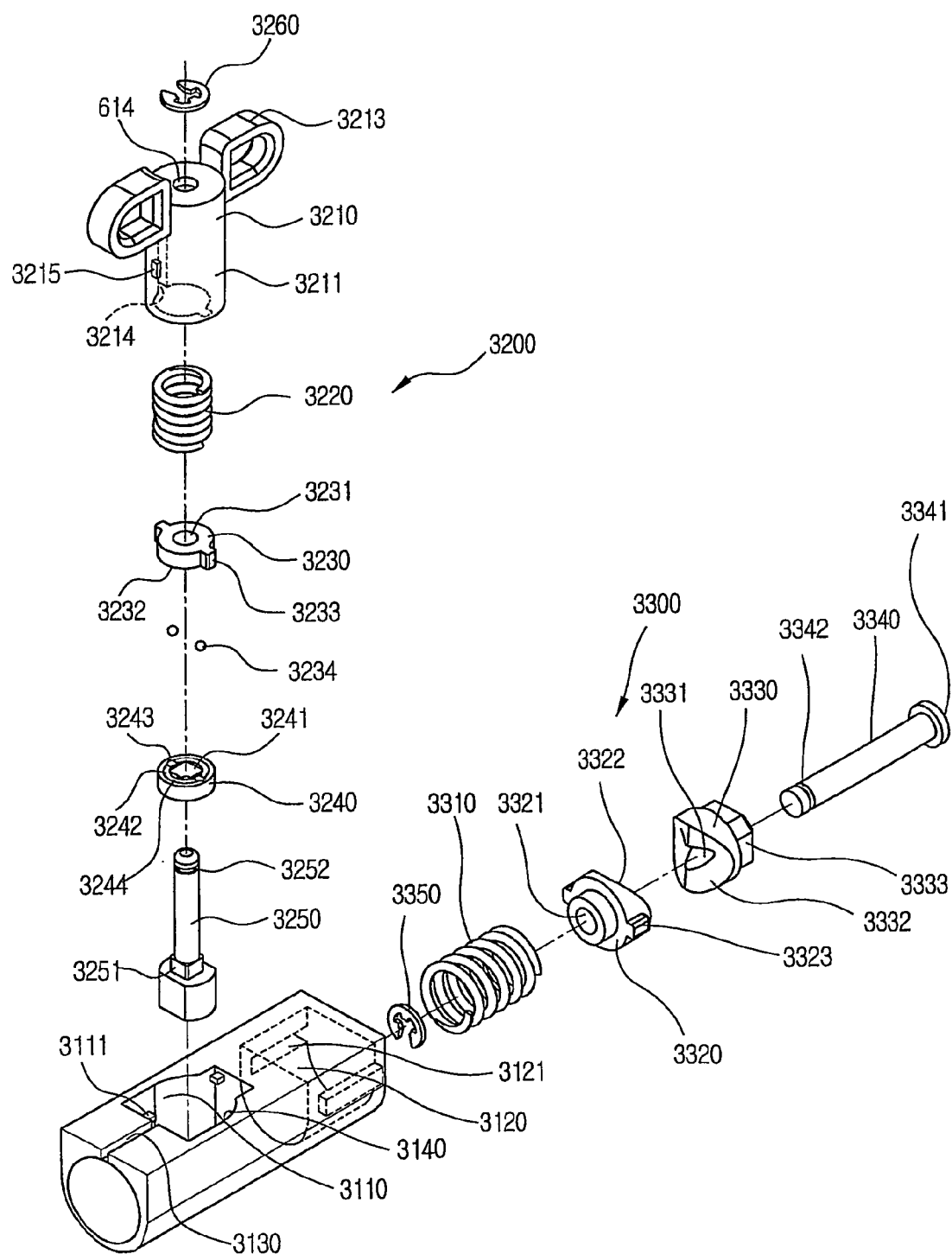
FIG. 17 is an exploded perspective view of a hinge mechanism of a portable phone according to a third embodiment of the present invention.

FIG. 17 is a broken perspective view of the cover hinge device of a cellular phone according to third preferred embodiment of the present invention.

The hinge device according to the third preferred embodiment includes the third housing 3100 which connects the cover 200 to the main body 100 mechanically, the first rotating portion 1200 which is install on the third rotating chamber 3110 and inverts the cover 200, and the third hinge portion 3300 which is installed on the first hinge chamber 1120 and opens/shuts the cover 200.

As shown in FIG. 17, in the third embodiment, only the third rotating portion 3200 is different from the cover hinge device of the cellular phone according to the first preferred embodiment. Therefore, the explanation for the third housing 3100 and the third hinge portion 3300 will be omitted.

The third rotating portion 3200 includes the third cylinder 3210 connecting to the cover 200, the second compressed spring 2220, the third rotating slip portion 3230, the third fixed slip portion 3240, the third central shaft 3250 and the E-ring 3260.

The third cylinder chamber 3211 having an open lower portion is formed on the third cylinder 3210, and the third cylinder hole 3212 is formed on the chamber 3211. The third cylinder recess 3214 is longitudinally formed on the inner wall of the third cylinder chamber 3211. A pair of third arm 3213 is protrudently formed on the upper portion of the outer surface of the third cylinder 3210 in order to be in symmetry against each other, and the third arm 3213 is fixed to the cover 200 by a connecting means such as screws. Further, the third cylinder protrusions 3215 for restricting the rotating angle of the cover 200 is formed on the outer periphery surface of the third cylinder 3210.

Meanwhile, as shown in FIGS. 15 and 16, the cylinder protrusion is formed on the bottom surface of the third cylinder 3210, and the third cylinder protrusion is inserted into the bottom of the third rotating chamber 3110. Thereby the third stop recess for stopping the third cylinder 3210 in the original position and 180 degrees position is formed, and therefore the rotating angel of the cover can be restricted. Further, the third arm protrusion is formed on the bottom surface of the third arm 3213, and the third arm protrusion is inserted into the upper surface of the third housing. Thereby, the third stop recess for stopping the third cylinder 3210 in the original position and 180 degrees position is formed, and therefore the rotating angel of the cover can be restricted.

The third compressed spring 3220 is to give elastic force, and is inserted into the third cylinder chamber 3211.

The third rotating slip portion 3230 and the third fixed slip portion 3240 jointly perform the rotation of the third rotating portion.

The rotating slip hole 3231 is formed on the intermediate of the third rotating slip portion 3230, and the third rotating slip protrusion 3233 being slidably connected to the third cylinder recess 3214 is formed thereon. Further, the flatted rotating slip surface 3232 is formed on the lower surface of the third rotating slip portion 3230, and a pair of third ball 3234 is oppositely installed on the third rotating slip surface 3232 with respect to the third rotating slip hole 3231.

The third square hole 3241 is formed on the intermediate of the third fixed slip portion 3240. The third fixed slip portion 3242 corresponding to the third rotating slip surface 3232 is formed on the upper surface of the third fixed slip portion 3240. And a pair of third hemisphere recesses 3243 are formed in order to opposite to the pair of third ball 3234 of the third fixed slip surface 3242. Further, the third guide recess 3244 circularly connecting each third hemisphere recess 3243 is also formed thereon.

In the present embodiment, the third ball 3234 is fixed to the third rotating slip portion 3230. However, the ball 3234 can be fixed to the third fixed slip portion 3240. The ball 3234 is separately formed on the third rotating slip portion 3230 or on the third fixed slip portion 3240, however it can be integrally formed on the third rotating slip surface 3232 or on the third fixed slip surface 3242.

The third central shaft 3250 is to support the third cylinder 3210, the third compressed spring 3220, the third rotating slip portion 3230 and the third fixed slip portion 3240. The third central shaft 3250 is uprightly fixed to the bottom surface of the third rotating chamber 3110, and the shaft 3250 passes through the third square hole 3241, the third rotating slip hole 3231, the third compressed spring 3220 and the third cylinder hole 3212. Further, the third annular recess 3252 is formed on the end portion of the third central shaft 3250, and the third square protrusion connecting to the third square hole 3241 is formed on the lower portion thereof.

The third E-ring 3260 is to fix the third cylinder 3210 to the third central shaft 3250, and is connected to the third annular recess 3252 from the upper direction of the third cylinder hole 3212.

Hereinafter, the operation of the cover hinge device of the portable having above described structure. The operation of the hinge device according to the third preferred embodiment is substantially the same as that of the hinge device according to the first preferred embodiment as shown in FIG. 1. Therefore, the operation for only third rotating portion 3200 will be explained.

Figure 19:
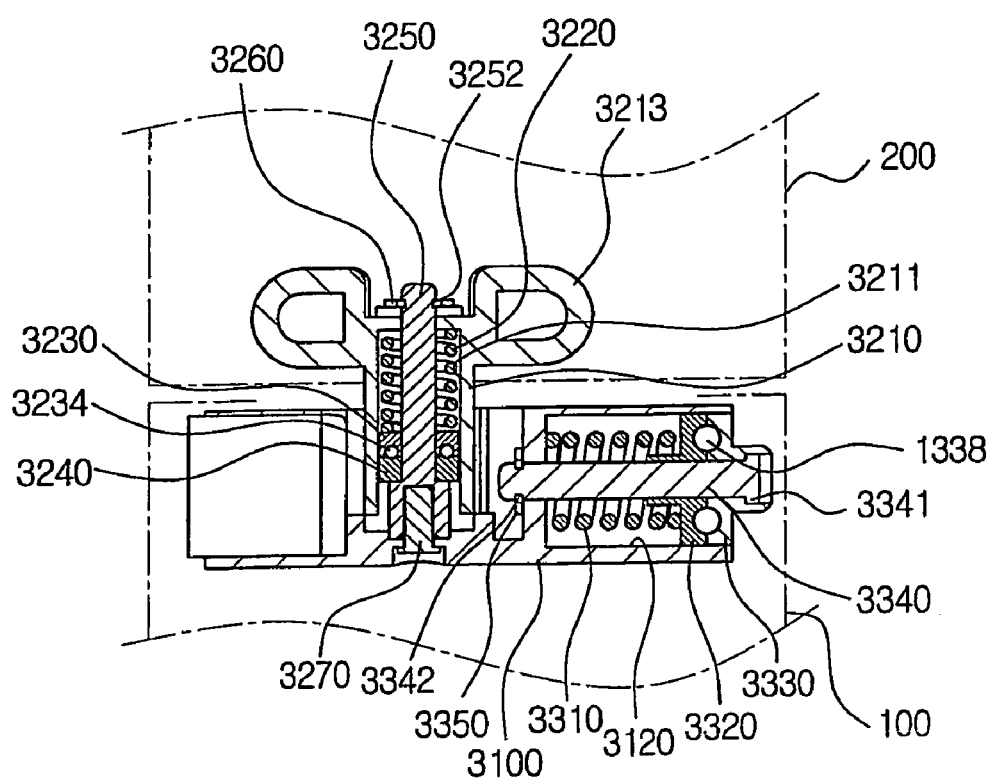
FIG. 19 is a sectional view of the hinge mechanism of the portable phone according to the third embodiment of the present invention as shown in FIG. 18, which shows the combination of the hinge mechanism.

As shown in FIG. 19, when the cover hinge device is assembled to the portable phone, the third cylinder 3210 is fixed to the cover 200, and the third rotating slip protrusion 3233 is connected to the third cylinder recess 3214. Therefore, as the cover 200 is rotated, the third cylinder 3210 and the rotating slip portion 3230 are integrally rotated together with the cover 200. The third central shaft 3250 is fixed to the third rotating chamber 3110 of the third housing 3100, and the third square protrusion 3251 is connected to the third square hole 3241, therefore the third fixed slip portion is prevented from being rotated.

Further, the third compressed spring 3220 elastically and outwardly supports the third rotating slip portion 3230, therefore, the third rotating slip portion 3232 is elastically contacted to the third fixed slip surface 3242.

The process to invert the cover 200 is as follows.

Firstly, the cover 200 is rotated against the third housing 3100, and then the cover 200 is opened. In a state in which the cover 200 is opened, if one rotates the cover 200 in clockwise or counterclockwise, the third cylinder 3210 fixed to the cover 200 is integrally rotated together with the cover 200. That is, the third cylinder 3210 an the third rotating slip portion 3230 are rotated together with the cover 200, and the third fixed slip portion 3240 fixed to the third central shaft 3250 is not rotated.

That is, the third rotating slip portion 3230 is slidably rotated from the third fixed slip portion 3240. At this time, the third ball 3234 which is fixed to the third rotating slip surface 3232 of the third rotating slip portion 3230 is separated from the third hemisphere recess 3243 which is formed on the third fixed slip surface 3242 of the third fixed slip portion 3240. And then, the ball 3234 is moved according to the third guiding recess 3244. At this time, the third compressed spring 3220 is fully compressed.

Consequently, if the cover 200 is rotated in 180 degrees, the third ball 3234 is inserted into another third hemisphere recess 3243 formed on the third fixed slip surface 3242. Therefore, the third compressed spring 3220 is extended and elastically supports the third rotating slip portion 3230.

In this process, the third central shaft 3250 safely supports the third rotating slip portion 3230 and the third fixed slip portion 3240, in a state in which the shaft 3250 is inserted into the third square hole 3241 and the third rotating slip hole 3231. Further, the third rotating slip protrusion 3233 of the third rotating slip portion 3230 is inserted into the third cylinder recess 3214 of the third cylinder 3210, therefore the third rotating slip portion 3230 is integrally moved together with the third cylinder 3210.

Further, the third cylinder protrusion 3215 of the third cylinder 3210 is caught by the third stop protrusion 3111, thereby the rotation angle of the cover is restricted.

In a state in which the cover 200 is rotated, if one rotates the cover 200 toward the main body 100, the liquid crystal display 210 of the cover 200 is outwardly exposed. Therefore, one can see a large liquid crystal display 210 in a state in which the cover 200 is closed to the main body 100.

Meanwhile, one does not see the large liquid crystal display 210 of the cover 200, the cover 200 is rotated toward the main body 100 so that the large liquid crystal display 210 faces to the main body 100 by reversely operating against the above described operation.

Figure 18:
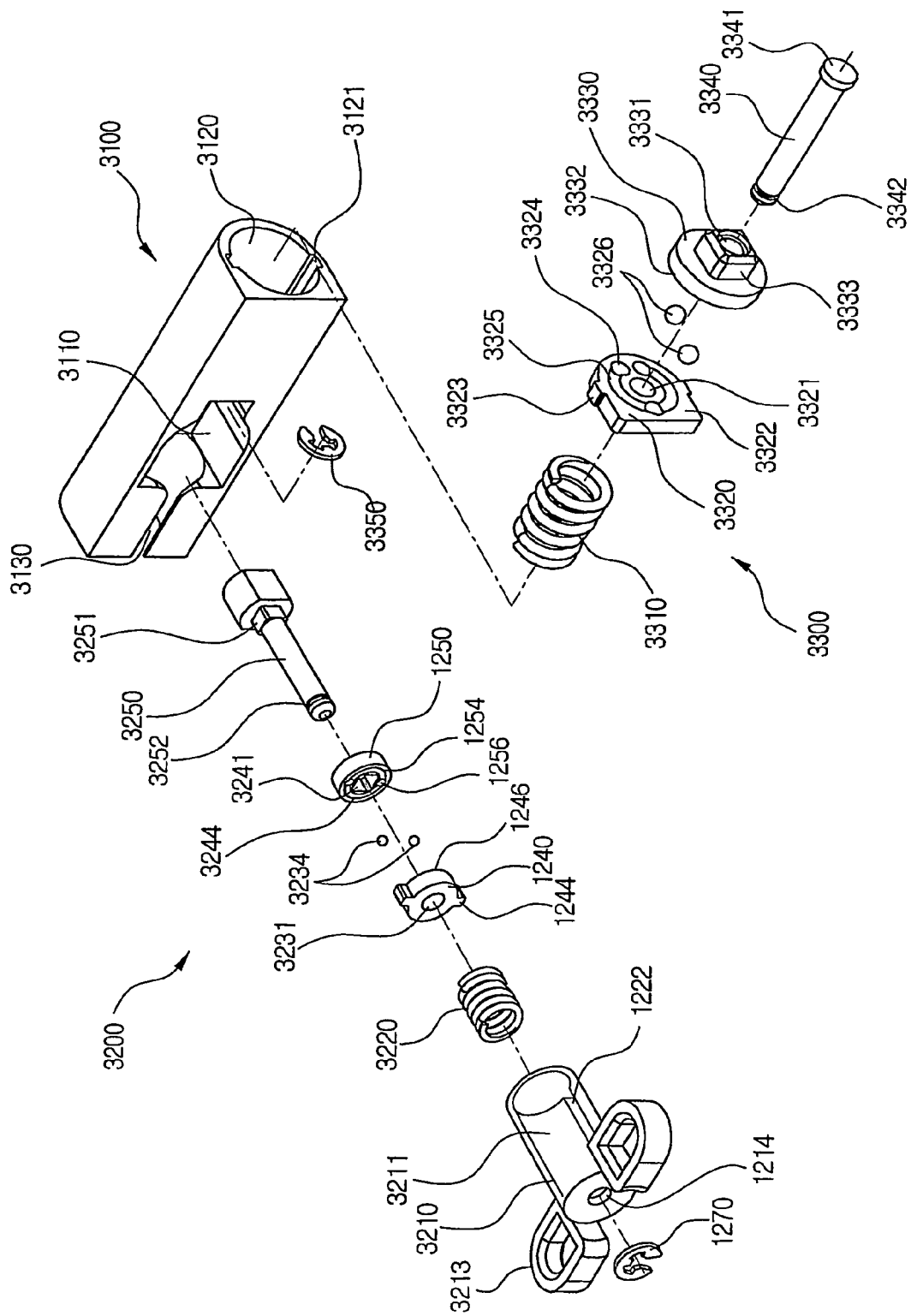
FIG. 18 is a sectional view of an example of a third hing part in the hinge mechanism of the portable phone according to the third embodiment of the present invention as shown in FIG. 17.

In the FIGS. 18 and 19, another preferred embodiment for the third hinge portion 3300 is disclosed.

The third hinge portion 3300 of the hinge device as shown in FIG. 18 has the same structure as that of the second preferred embodiment as shown in FIG. 14, therefore a specific explanation thereof will be omitted.

Figure 20:
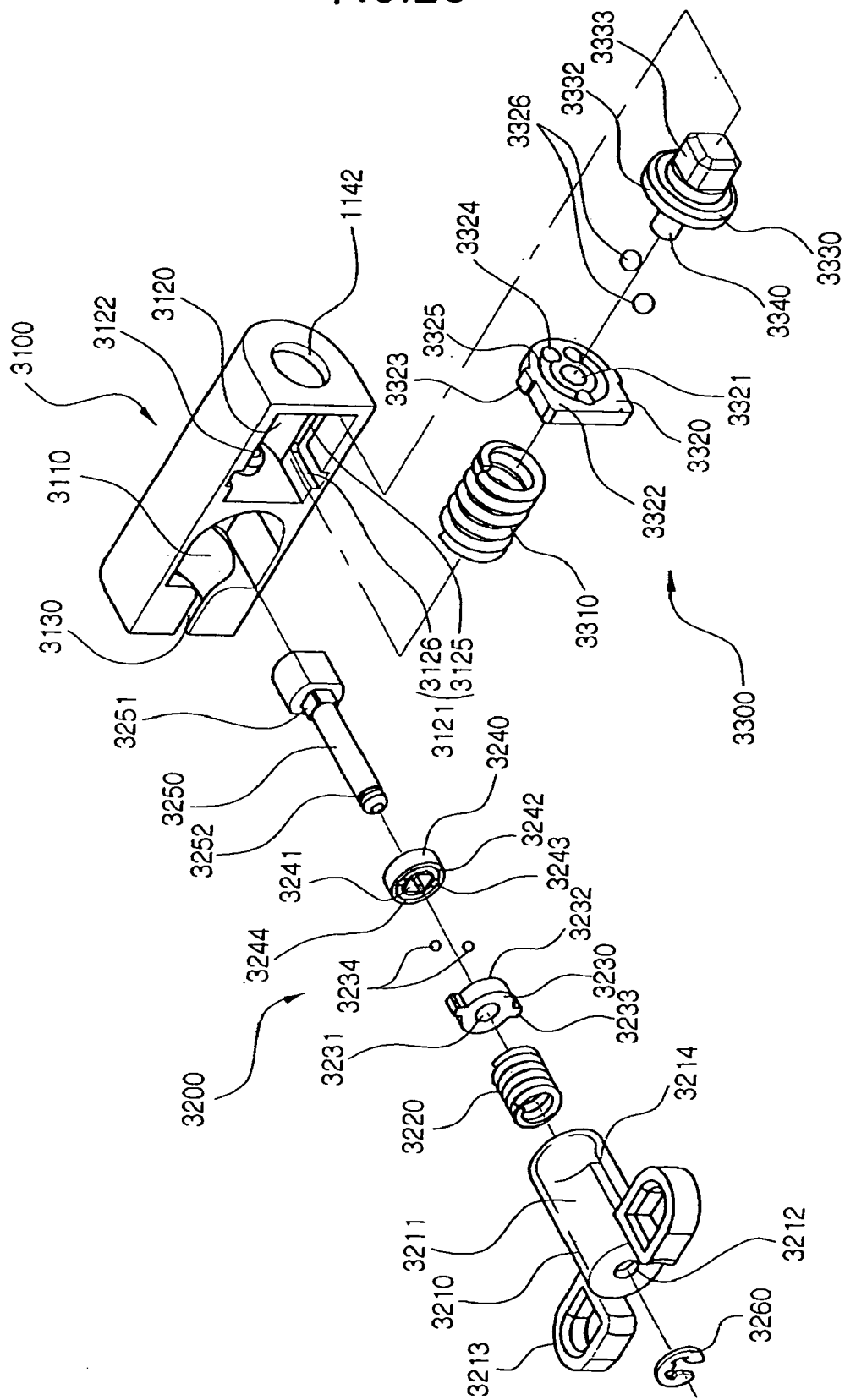
FIG. 20 is a sectional view of another example of the third hinge part and a third hinge chamber in the hinge mechanism of the portable phone according to the third embodiment of the present invention as shown in FIG. 17.
Figure 21:
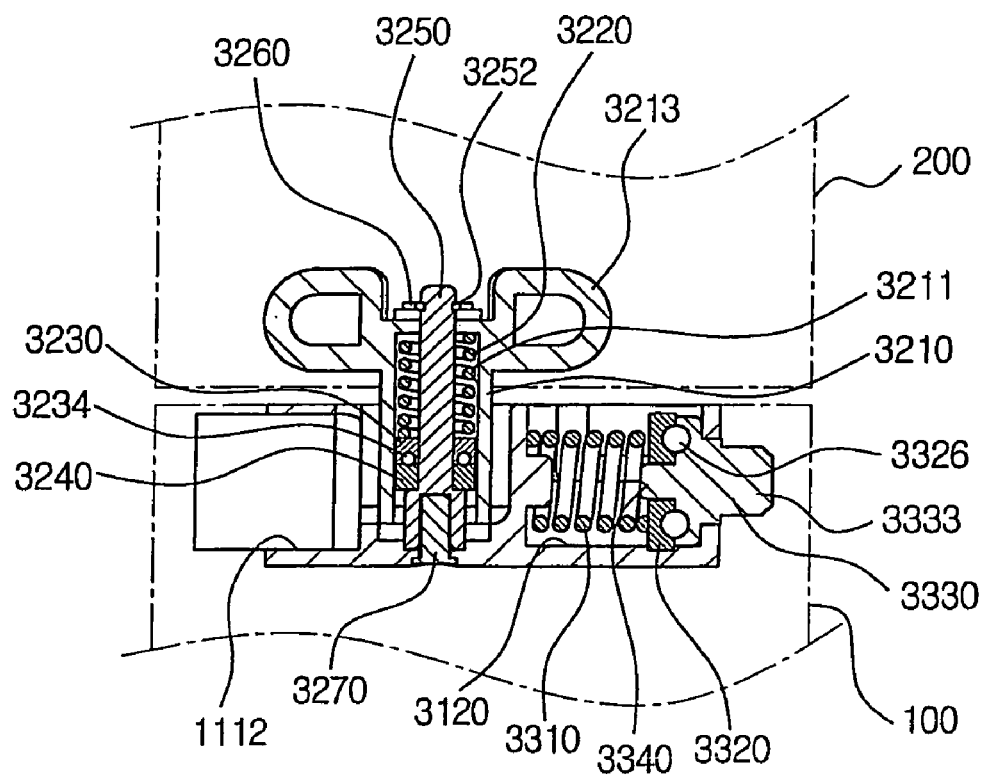
FIG. 21 is a sectional view of the hinge mechanism of the portable phone according to the third embodiment of the present invention as shown in FIG. 20, which shows the combination of the hinge mechanism.

In the FIGS. 20 and 21, another preferred embodiment for the third housing 3100 and the third hinge portion 3300 is disclosed.

The third cutoff portion 3130, for coming in and out the wire electrically connecting the main body 100 to the cover 200 to the third rotating chamber 3110, is formed on the third housing 3100. Further, the third hinge chamber 3120 has an opened top feature (the third opened portion 3122), and the third guiding recess 3121, which has a horizontal recess (groove) 3125 formed longitudinally and a vertical recess (groove) 3126 being perpendicular to the horizontal recess 3125 and connecting to the third opened portion 3122. Further, the third hinge chamber hole 3123 is formed on the inner wall of one side of the third hinge chamber 3120, and the third hinge spring protrusion 3124 is formed on the inner wall of the other side of the third hinge chamber 3120.

The third hinge portion 3300 includes the third hinge spring 3310, the third fixed hinge portion 3330 and the third rotating hinge portion 3320.

The third hinge spring 3310 is to give elastic force to the third fixed hinge portion 3330 and the third rotating hinge portion 3320. And, the spring 3310 has one end which is fixed to the third hinge spring protrusion 3124 and the other end which is inserted into the third hinge chamber 3120 in order to elastically support the third rotating hinge portion 3320.

The flat third rotating hinge surface 3322 is formed on one surface of the third rotating hinge portion 3320. A pair of third hemisphere recesses 3243 are formed on the third rotating hinge surface 3322 in a position in which they are in symmetry against the third rotating hinge hole 3321, and also the third guiding recess 3244 annularly connecting the third square recess 3243 is formed. Further, the third rotating hinge protrusion 3323 slidably connecting to the third guiding recess 3121 is formed on the both side surfaces of the third rotating hinge portion 3320. This third rotating hinge portion 3320 is inserted into the third hinge chamber 3120 from outside of the third hinge spring 3310.

The third hinge shaft 3340 rotatably connecting to the third rotating hinge hole 3321 is protrudently formed on one surface of the third fixed hinge portion 3330. And the third fixed hinge surface 3332 corresponding to the third rotating hinge surface 3322 is formed in near the third hinge shaft 3340. Further, the pair of third balls 3234 being inserted into the third hemisphere recess 3243 is installed on the third fixed hinge surface 3332. Further, the third fixed hinge protrusion 3333 fixed to the main body 100 is formed on the other surface of the third fixed hinge portion 3330 by passing through the third hinge chamber hole 3123. This third fixed hinge portion 3330 is inserted and installed on the third hinge chamber 3120 from outside of the third rotating hinge portion 3320.

The operation of the hinge device shown in FIG. 20 is substantially the same as that of the hinge device shown in FIG. 17, therefore the operation being related to only the third hinge portion 3300 will be explained.

In a state in which the cover hinge device is assembled with the portable phone, the third cylinder 3210 is fixed to the cover 200. And the third rotating slip protrusion 3233 of the third rotating slip portion 3230 is connected to the third cylinder recess 3214 of the third cylinder 3210. Therefore, if the cover 200 is rotated, the third cylinder 3210 and the third rotating slip portion 3230 are integrally rotated.

Meanwhile, the third fixed hinge protrusion 3333 of the third fixed hinge portion 3330 is passed through the third hinge chamber hole 3123 and is fixed to the main body 100, therefore the third fixed hinge portion 3330 is prevented from being rotated.

Further, the third hinge spring 3310 elastically and outwardly support the third rotating hinge portion 3320, therefore the third rotating hinge surface 3322 is closely contacted to the third fixed hinge surface 3332.

Meanwhile, a large liquid crystal display 210 is installed in the cover 200. However, one cannot see the large liquid crystal display 210 of the cover 200 if the cover 200 is closed to the main body 100.

The process for exposing the large liquid crystal display 210 is as follows.

Firstly, one opens the cover 200 from the main body 100 by rotating it against the third housing 3100.

If the cover 200 begins to be opened, the third housing 3100 is rotated together. At this time, the third rotating slip portion 3230 crosses over the third fixed slip portion 3240. And it separated from the third hemisphere recess 3243 in which the third ball 3234 fixed on the third fixed hinge surface 3332 is formed on the third rotating hinge surface 3322, and is moved according to the third guiding recess 3244. At this time, the third hinge spring 3310 is fully compressed.

Consequently, if the cover 200 is fully opened, the third ball 3234 is entered into another third hemisphere recess 3243 formed on the third rotating hinge surface 3322. And, the third hinge spring 3310 is extended by the restitutive force and supports the third rotating hinge portion 3320.

At this time, the third hinge shaft 3340 is inserted into the third rotating hinge hole 3321, therefore the third rotating hinge portion 3330 and the third fixed hinge portion 3330 are well operated each other. Further, since the third rotating hinge protrusion 3323 is inserted into the third guiding recess 3121, the third rotating hinge portion 3320 is restricted to rotate in the third hinge chamber 3120 and only carries out linear motion.

Meanwhile, the process for reversely rotating the cover 200 in a state in which the cover 200 is fully opened by the above explained process is the substantially same as that of the embodiment shown in FIG. 17, therefore the explanation for the process will be omitted.

Figure 22:
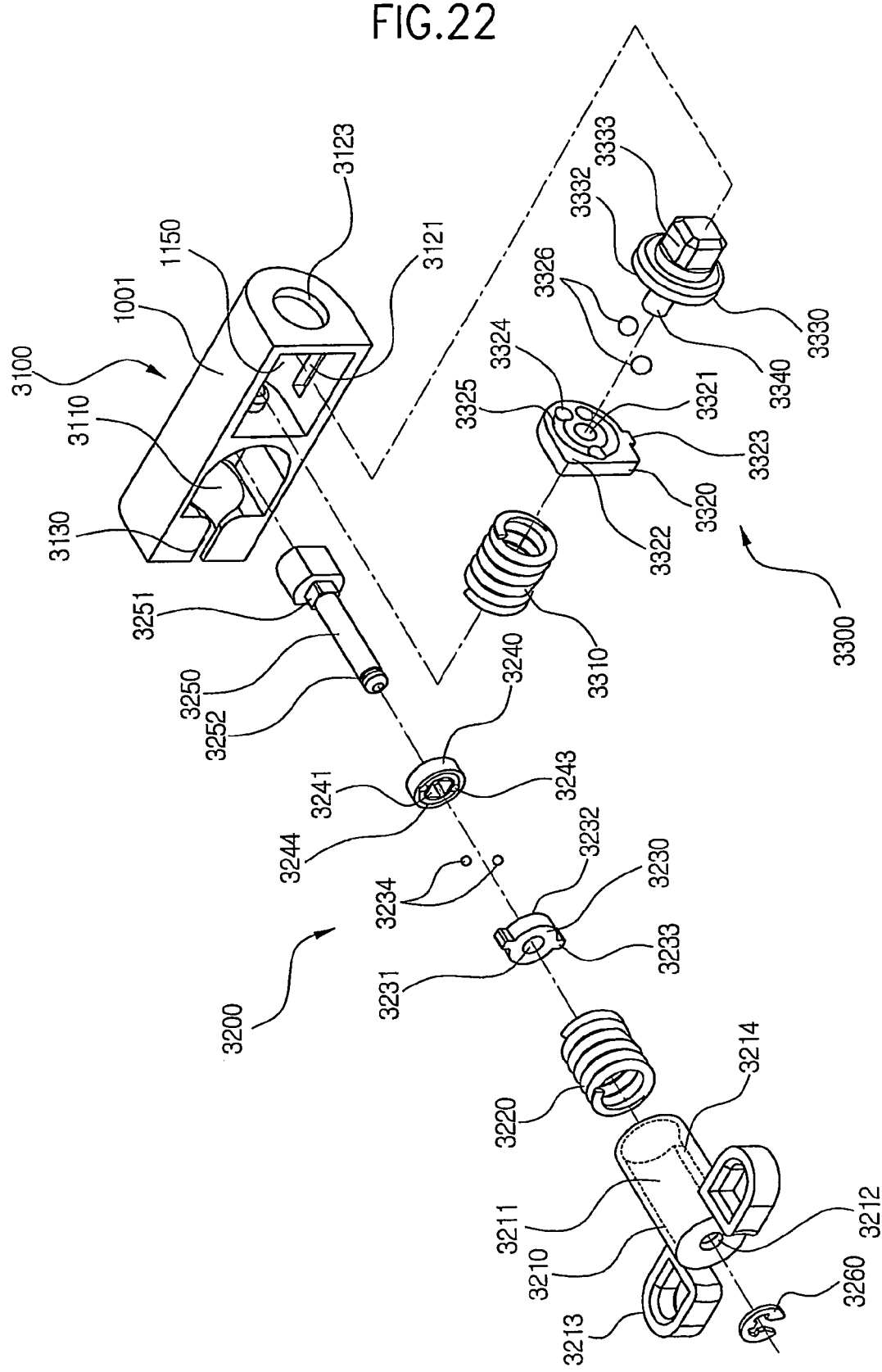
FIG. 22 is a sectional view of another example of the third hinge chamber in the hinge mechanism of the portable phone according to the third embodiment of the present invention as shown in FIG. 20.
Figure 23:
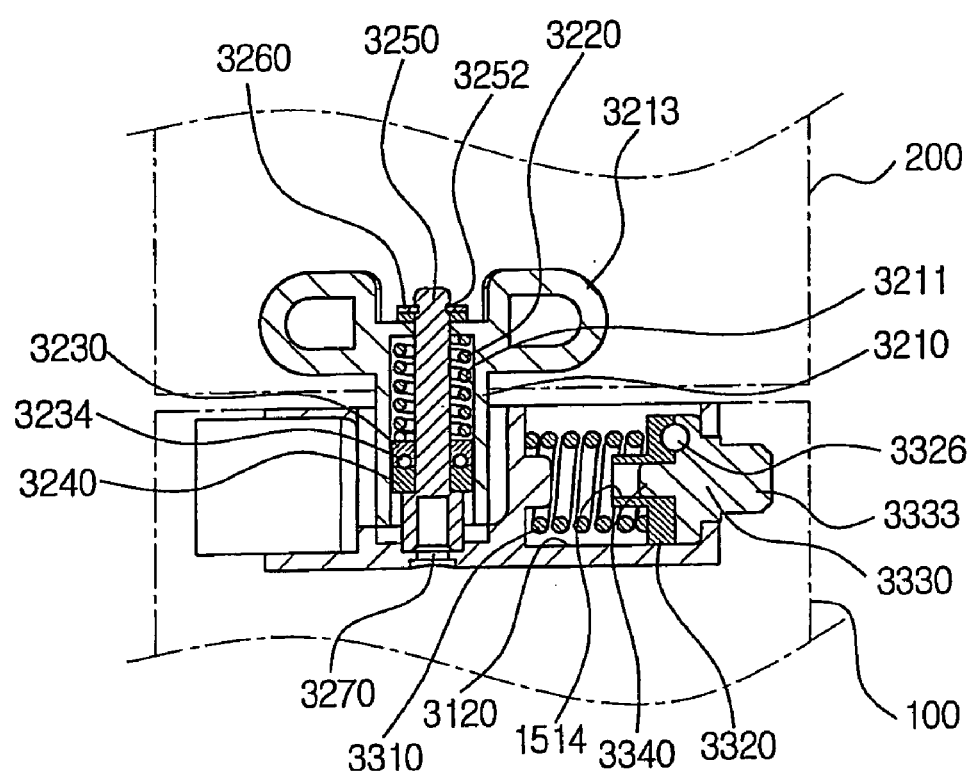
FIG. 23 is a sectional view of the hinge mechanism of the portable phone according to the third embodiment of the present invention as shown in FIG. 22, which shows the combination of the hinge mechanism.

In FIGS. 22 and 23, still another embodiment for the third housing 3100 is disclosed.

The third cutoff portion 3130, for coming in and out the wire electrically connecting the main body 100 to the cover 200 to the third rotating chamber 3110, is formed on the third housing 3100. Further, the third hinge chamber 3120 has an opened upper portion (the third opened portion 3122), and the third guiding recess 3121 is longitudinally formed on the inner wall thereof. Further, the third hinge chamber hole 3123 is formed on the inner wall of one side of the third hinge chamber 3120, and the third hinge spring protrusion 3124 is formed on the inner wall of the other side of the third hinge chamber 3120.

The third rotating portion 3200 and the third hinge portion 3300 of the hinge device shown in FIG. 22 is the substantially same as that of the hinge device shown in FIG. 20, therefore the explanation for the third rotating portion 3200 will be omitted.

The Fourth Embodiment

The fourth embodiment of the present invention will be illustrated below.

Figure 24:
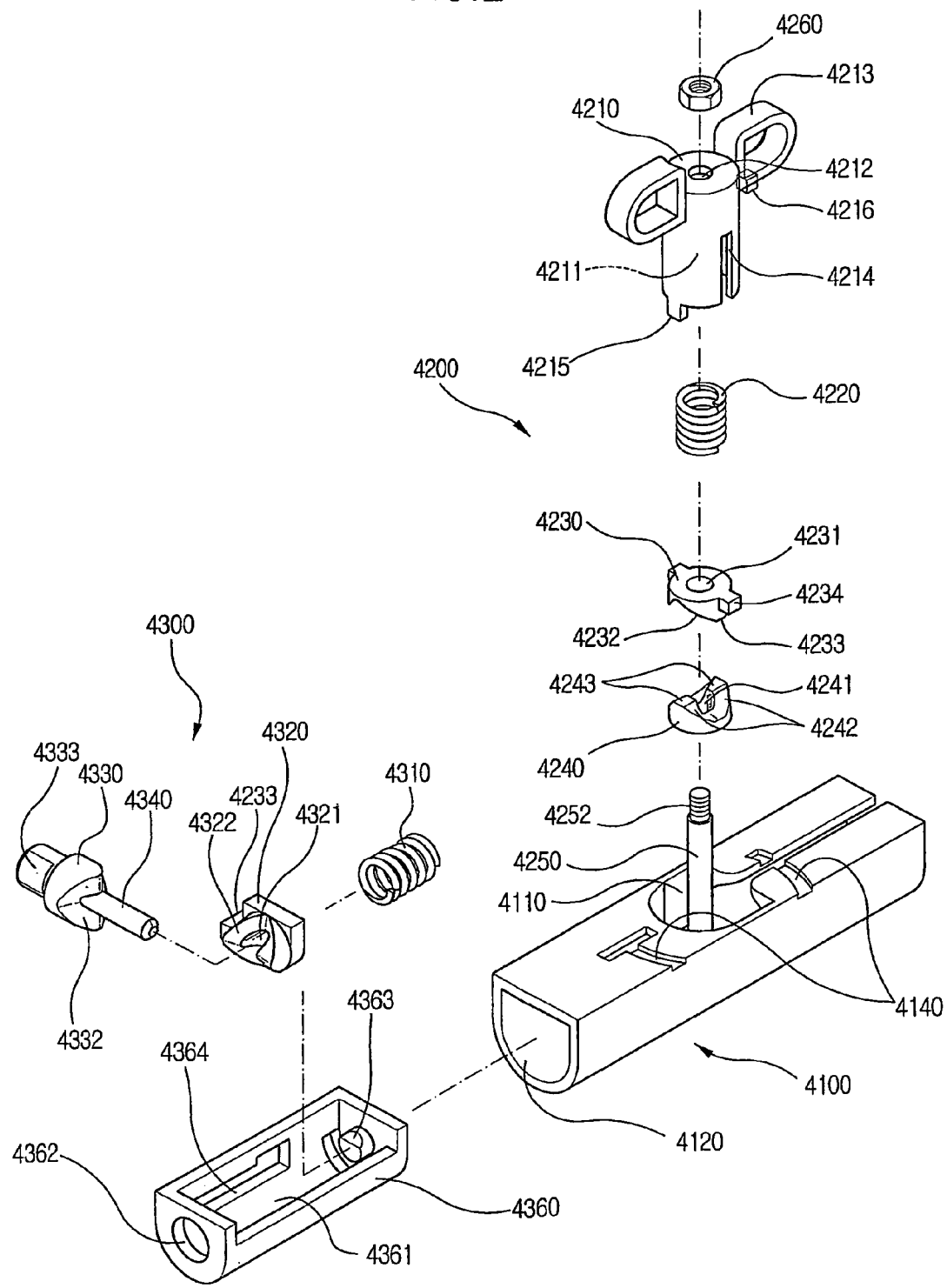
FIG. 24 is an exploded perspective view of a hinge mechanism of a portable phone according to a fourth embodiment of the present invention.
Figure 25:
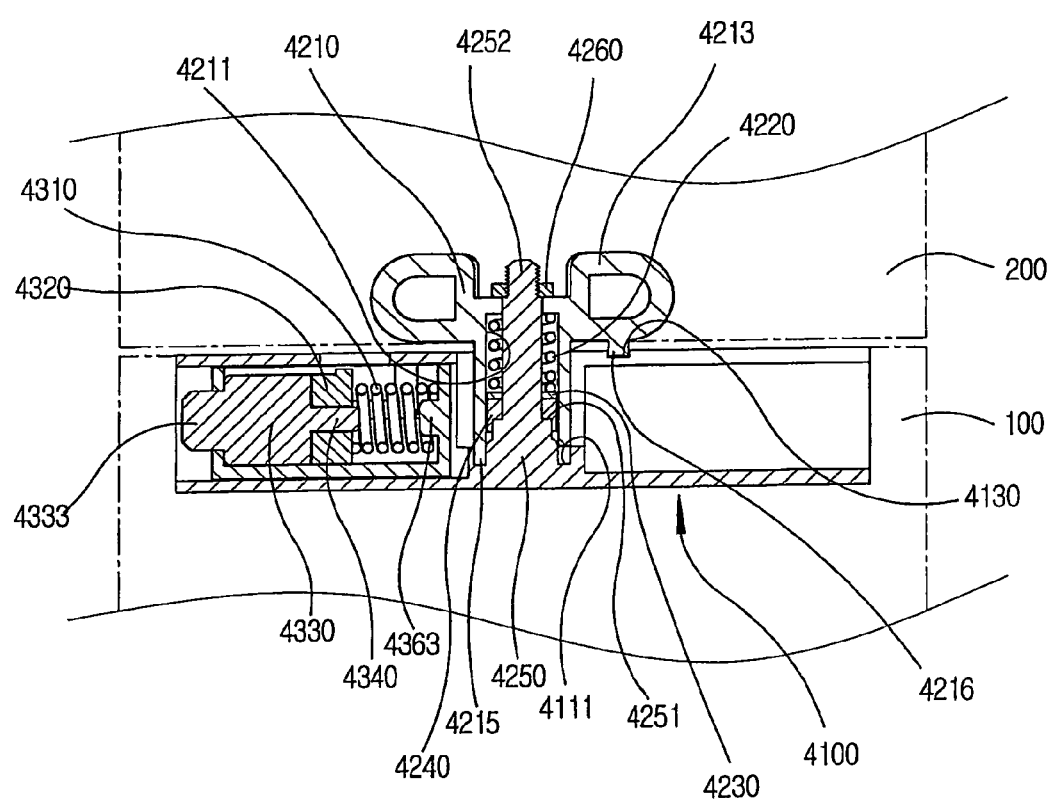
FIG. 25 is a sectional view of the hinge mechanism of the portable phone according to the fourth embodiment of the present invention as shown in FIG. 24, which shows the combination of the hinge mechanism.
Figure 26:
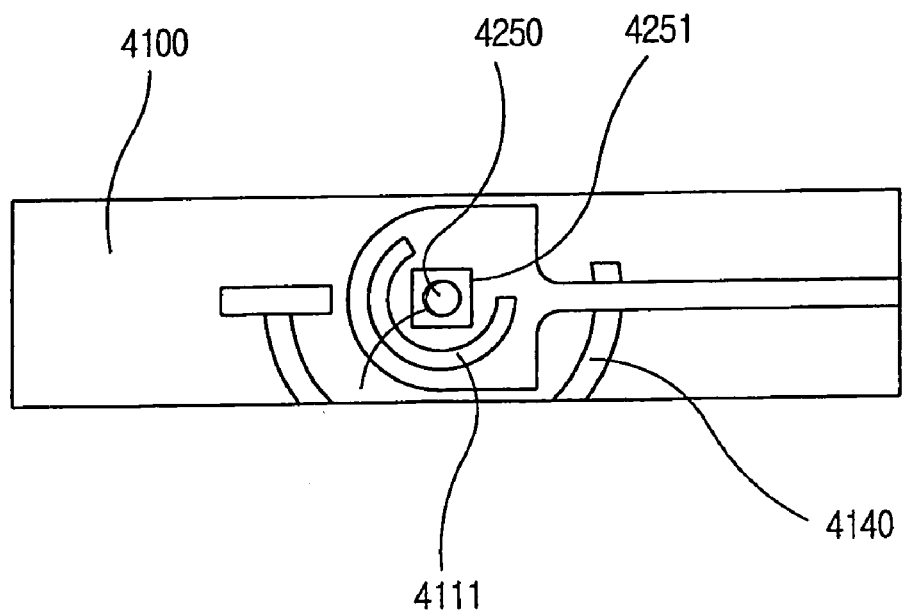
FIG. 26 is a plan view of a fourth housing in the hinge mechanism of the portable phone according to the fourth embodiment of the present invention as shown in FIG. 24, which shows the combination of the hinge mechanism.

FIG. 24 is an exploded and perspective view for showing a cover hinge apparatus for a handheld telephone according to the fourth embodiment of the present invention. FIG. 25 is a sectional view for showing an assembled state of the cover hinge apparatus depicted in FIG. 24. And, FIG. 26 is a plane view for showing the fourth housing of the hinge apparatus depicted in FIG. 24.

The hinge apparatus according to the present embodiment includes the fourth rotational chamber 4110 which has an upper portion opened and the fourth hinge chamber 4120 which is formed at one side surface. The hinge apparatus includes the forth housing 4100 for mechanically connecting a cover 200 and a main body 100, the fourth hinge part 4300 which is installed at the fourth hinge chamber 4120 for opening and closing the cover 200, and the rotational part 4200 which is installed at the fourth rotational chamber 4110 for rotating the cover 200.

The fourth rotational part 4200 includes the fourth cylinder 4210, the fourth compressor spring 4220, the fourth rotational slip portion 4230, the fourth fixing slip portion 4240, the forth central shaft 4250, and the fourth nut 4260.

The fourth cylinder 4210 has the fourth cylinder chamber 4211 having a lower portion opened and the fourth cylinder hole 4212 formed at the upper portion thereof. Further, the fourth cylinder groove 4214 is formed at an outer side surface of the fourth cylinder 4210 along the longitudinal direction of the fourth cylinder 4210. A pair of the fourth arms 4213 is symmetrically formed on an upper portion of the outer side surface, which is assembled with the cover 200. The fourth arms 4213 are fixed at the cover 200 by connecting means such as a screw.

The fourth cylinder protrusion 4215 is formed at a lower surface of the fourth cylinder 4210. The fourth stopping groove 4111 is formed at a bottom surface of the fourth rotational chamber 4110. The fourth cylinder protrusion 4215 can only move along the fourth stopping groove 4111. The fourth stopping groove 4111 is designed to allow the fourth cylinder 4210 to be stopped at an original position and a position rotated at an angle of 180 degrees from the original position.

On the other hand, the arm protrusion 4216 is formed at a lower surface of the fourth cylinder 4210. The fourth housing stopping groove 4140 is formed at an upper portion of the fourth housing 4100. The fourth arm protrusion 4216 can only move along the fourth housing stopping groove 4140. The fourth housing stopping groove 4140 is designed to allow the fourth cylinder 4210 to be stopped at an original position and a position rotated at an angle of 180 degrees from the original position.

The fourth cylinder protrusion 4215 and the fourth stopping groove 4111, and the fourth arm protrusion 4216 and the fourth housing stopping groove 4140 restricts the rotation degree of the cover 200, such that twist of electrical connecting wires or flexible PCBs is prevented.

The fourth compressor spring 4220 is inserted into the fourth cylinder chamber 4211 thereby to elastically support the fourth rotational slip part 4230 and the fourth fixing slip part 4240.

The fourth rotational slip hole 4231 is formed at the central portion of the fourth rotational slip part 4230. The fourth rotational slip protrusion 4234 is formed at a periphery surface of the fourth rotational slip part 4230, which is slipped into and assembled with the fourth cylinder groove 4214. The fourth rotational slip surface 4232 is formed at a lower portion of the fourth rotational slip part 4230. The fourth rotational slip surface 4232 has a pair of wave-shaped protrusions which is formed at both sides thereof with respect to the fourth rotational slip hole 4231. The fourth rotational plane portions 4233 are formed at each upper end of the pair of wave-shaped protrusions.

The fourth rectangular hole 4241 is formed at the central portion of the fourth fixing slip part 4240. The fourth fixing slip surface 4240 is formed at an upper surface, which has a wave-shaped protrusion corresponding to the wave-shaped protrusion and the fourth fixing plane portion 4243 corresponding to the fourth rotational plane portion 4240.

The fourth central shaft 4250 is perpendicularly stood in the bottom surface of the fourth rotational chamber 4110. The fourth central shaft 4250 has the fourth screw portion 4252 formed at an upper end thereof and the fourth rectangular protrusion 4251 formed at a lower end thereof to be inserted into the fourth rectangular hole 4241.

The fourth central shaft 4250 passes through the fourth rectangular hole 4241, the fourth rotational hinge hole 4321, the fourth compressing spring 4220 and the fourth cylinder hole 4212 to support them. The fourth nut 4260, which is an element for fixing the fourth cylinder 4210 to the fourth central shaft 4250, is locked to the fourth screw portion 4252.

The fourth hinge part 4300 has the fourth hinge housing 4360 in which the fourth hinge spring 4310, the fourth rotational hinge part 4320, and the fourth fixing hinge part 4330 are successively assembled with one another.

The fourth hinge housing 4360 has the fourth hinge housing chamber 4361 having an upper portion which is opened. The fourth guide groove 4364 is formed at a sidewall of the fourth hinge housing 4360 in the longitudinal direction. Also, the fourth hinge housing hole is formed at one side of the fourth hinge housing 4360, and the fourth hinge housing protrusion 4363 is formed at an inner wall of the other side.

The fourth rotational hinge protrusion 4323, which is inserted into the fourth guide groove 4364, is formed at an outer surface of the fourth hinge part 4320. The fourth hinge hole is formed at the central portion of the fourth hinge part 4320. Further, the fourth rotational hinge surface 4322 is formed at one surface of the fourth hinge part 4320. The fourth rotational hinge surface 4322 is successively formed from the surface of the fourth hinge part 4320 and has a wave-shaped curve of two wavelengths per one rotation.

The fourth fixing hinge part 4330 has a shape to be able to be rotated at the fourth hinge housing 4360. The fourth rotational hinge surface 4332 which corresponds to the fourth rotational hinge surface 4322 is formed at the one surface of the fourth fixing hinge part 4330. The forth hinge shaft 4340 is integrally formed on the fourth fixing hinge surface 4332 to be inserted into the fourth rotational hinge hole 4321, and the fourth fixing hinge protrusion 4333 is formed at the other surface of the fourth fixing hinge surface 4332 to be inserted into the fourth hinge housing hole 4362.

The fourth hinge spring 4310 has one end which is assembled with the fourth hinge housing protrusion 4363 and the other end which is inserted into the fourth hinge housing 4360 thereby to elastically support the fourth rotational hinge part 4320.

Hereinafter, the operation of the cover hinge apparatus for a handheld telephone will be illustrated.

At the state of assembling the hinge apparatus with the handheld telephone, the fourth cylinder 4210 is fixed at the cover 200, and the fourth rotational slip protrusion 4234 of the fourth rotational slip part 4230 is assembled with the fourth cylinder groove 4214 of the fourth cylinder 4210. Therefore, the cover 200, the fourth cylinder 4210, and the fourth rotational slip part 4230 are integrally rotated.

And, the fourth rectangular protrusion 4251 formed at the fourth central shaft 4250 is assembled with the fourth rectangular hole 4241 of the fourth rotation slip portion 4230 thereby to prevent the fourth fixing slip part 4240 from being rotated.

Further, the fourth compressing spring 4220 elastically supports the fourth rotational slip portion 4240 toward the fourth fixing slip portion 4240, such that the fourth rotational slip surface 4232 of the fourth rotational slip portion 4230 is adhered closely to the fourth fixing slip surface 4242 of the fourth fixing slip portion 4240 to be elastically contacted with each other.

On the other hand, the fourth fixing hinge protrusion 4333 of the fourth fixing hinge part 4330 passes through the fourth hinge housing hole 4362 to be fixed to the main body 100. And, the fourth hinge spring 4310 elastically supports the fourth rotational hinge part 4320 toward the fourth fixing hinge part 4330 and is assembled with the thread of the fourth fixing hinge surface 4332 to be elastically contacted with each other. Therefore, if a slipping is not developed between the fourth rotational hinge surface 4322 and the fourth fixing hinge surface 4332, the rotation of the fourth housing chamber and the fourth housing 4100 is prevented. Further, the fourth housing 4100 is rotated because the other side of the fourth housing 4100 is hinged with the main body 100.

On the other hand, though a large liquid crystal display 210 is installed in the cover 200, the large liquid crystal display 210 of the cover 200 is not seen when the cover 200 is closed on the main body 100.

Processes of reversing the cover for seeing the large liquid crystal display 210 when a user closes the cover 200 of the handheld telephone will be illustrated below.

First, the cover 200 is opened by rotating the main body with respect to the fourth housing 4100.

When the cover 200 begins to be opened, the fourth cylinder 4210 and the fourth housing 4100 fixed at the cover 200 by the fourth arm 4213 are rotated. At this time, the fourth rotational hinge part 4320 installed at the fourth hinge housing 4360 is also rotated with the cover 200. However, the fourth fixing hinge part 4330 is not rotated because it is fixed to the main body 100. Therefore, a slipping is developed between the fourth rotational hinge surface 4322 of the fourth rotational hinge part 4320 and the fourth fixing hinge surface 4332 of the fourth fixing hinge part 4330.

When the cover 200 is rotated at the angle of 90 degrees, the mountain portions of the fourth rotational hinge surface 4322 and the fourth fixing hinge surface 4322 are contacted with each other. At this time, the fourth hinge spring 4310 is at the most compressed state. When the cover 200 is more rotated and is opened completely, the valley and mountain portions of the fourth rotational hinge surface 4322 are assembled with the mountain and valley portions the fourth fixing hinge surface 4332, respectively, such that the fourth hinge spring 4310 is expended again.

At this time, because the fourth hinge shaft 4340 is inserted into the fourth rotational hinge hole 4321, when slipping between the fourth rotational hinge surface 4322 and the fourth fixing hinge surface 4322 is developed, the separation in the side direction is prevented. And, because the fourth rotational hinge protrusion 4323 of the fourth rotational hinge part 4320 is inserted into the fourth guide groove 4364 of the fourth hinge housing 4360, the fourth rotational hinge part 4320 moves not in a rotation but in a straight line.

On the other hand, at the state that the cover 200 is opened, when the cover 200 is clockwise (or, counter clockwise) rotated, the fourth cylinder 4210 which is fixed at the cover 200 is rotated integrally with the cover 200. This is because the fourth rotational slip protrusion 4234 is inserted into the fourth cylinder groove 4314. However, because the fourth fixing slip part 4240 is fixed at the central shaft 4250 which is fixed at the bottom surface of the fourth rotational chamber 4110, the fourth fixing slip part 4240 is not rotated.

Therefore, the fourth rotational slip part 4230 is slipped rotated with the fourth fixing slip part 4240. That is, the slipping is developed between the fourth rotational slip surface 4232 of the fourth rotational slip part 4230 and the fourth fixing slip surface 4242 of the fourth fixing slip part 4240.

When the cover is rotated at the angle of 90 degrees, the fourth rotational plane portion 4233 of the fourth rotational slip surface 4232 and the fourth fixing plane portion 4243 of the fourth fixing slip surface 4242 are contacted with each other.

At this time, the spaced length between the fourth rotational slip part and the fourth fixing slip part 4240 is maximized and the fourth compressing spring 4220 is the most compressed. At this way, when the fourth rotational plane part 4233 and the fourth fixing plane part 4243 are contacted with each other, the cover 200 may be stopped for a while because the cover 200 does not receive the rotational force. That is, the contacting section between fourth rotational plane part 4233 and the fourth fixing plane part 4243 is a stopping section.

When the cover 200 is rotated at 180° by continuing the rotation of the cover 200, the fourth rotation slip surface 4232 and the fourth fixing slip surface 4242 are returned to an initial connecting state. At this time, the fourth rotation slip surface 4232 and the fourth fixing slip surface 4242 again keep the nearest distance to each other. The fourth compression spring 4220 is expanded by the restoring force and elastically supports the fourth rotation slip portion 4230. At this time, since a fourth central shaft 4250 is inserted into the fourth angular hole 4241 and the fourth rotation slip hole 4231, a mutual operation of the fourth rotation slip portion 4230 and the fourth fixing slip portion 4240 is easily performed.

Since a fourth rotation slip projection 4234 of the fourth rotation slip portion 4230 is inserted into a fourth cylinder groove 4214 of a fourth cylinder 4210, the fourth rotation slip portion 4230 performs a linear motion in the fourth cylinder 4210.

On the other hand, a fourth cylinder projection 4215 and a fourth arm projection 4216 of the fourth cylinder 4210 are moved along a fourth stop groove 4111 and a fourth housing stop groove 4140 of a fourth housing 4100, respectively. When the cover 200 entirely turns in the reverse direction, namely, is turned by 180°, the cover 200 is hooked to end portions of the fourth stop groove 4111 and the fourth housing stop groove 4140 to prevent an excessive rotation of the fourth cylinder 4210. That is, since the cover 200 has a rotation range of about 180°, an entanglement of a wire is prevented wherein the wire electrically connects the body 100 and the cover 200 to each other.

In such a state, when the user rotates the cover 200 to close the body 100, a large liquid crystal display screen 210 of the cover 200 is exposed to an outside. Accordingly, although the user closes a cover of a portable phone, the user can see the large liquid crystal display screen 210. An operation procedure of a fourth hinge portion 4300 is performed in the reverse order of the above stated operation.

On the other hand, when the user does not see the large liquide crystal display screen 210 of the cover 200, the user operates the fourth hinge portion 4300 in the reverse order of the above stated operation to rotate the large liquide crystal display screen 210 of the cover 200 toward the body 100 thereby closing the body 100 by the cover 200. At this time, operation procedures of a fourth rotating portion 4200 and the fourth hinge portion 4300 are performed in the reverse order of the above stated operation.

The Fifth Embodiment

Hereinafter, a cover hinge device of a portable phone according to the fifth embodiment of the present invention.

Figure 27:
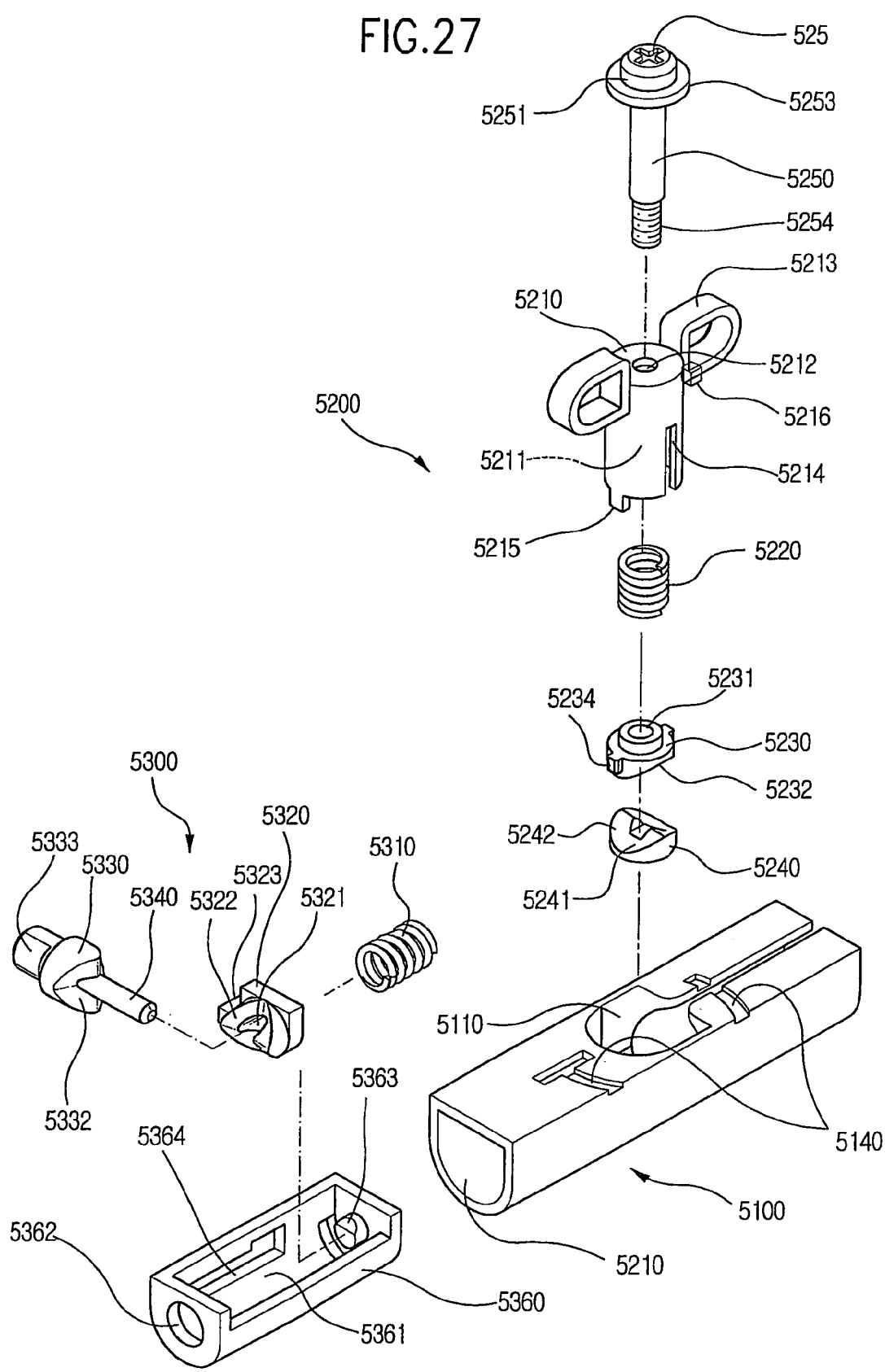
FIG. 27 is an exploded perspective view of a hinge mechanism of a portable phone according to a fifth embodiment of the present invention.
Figure 28:
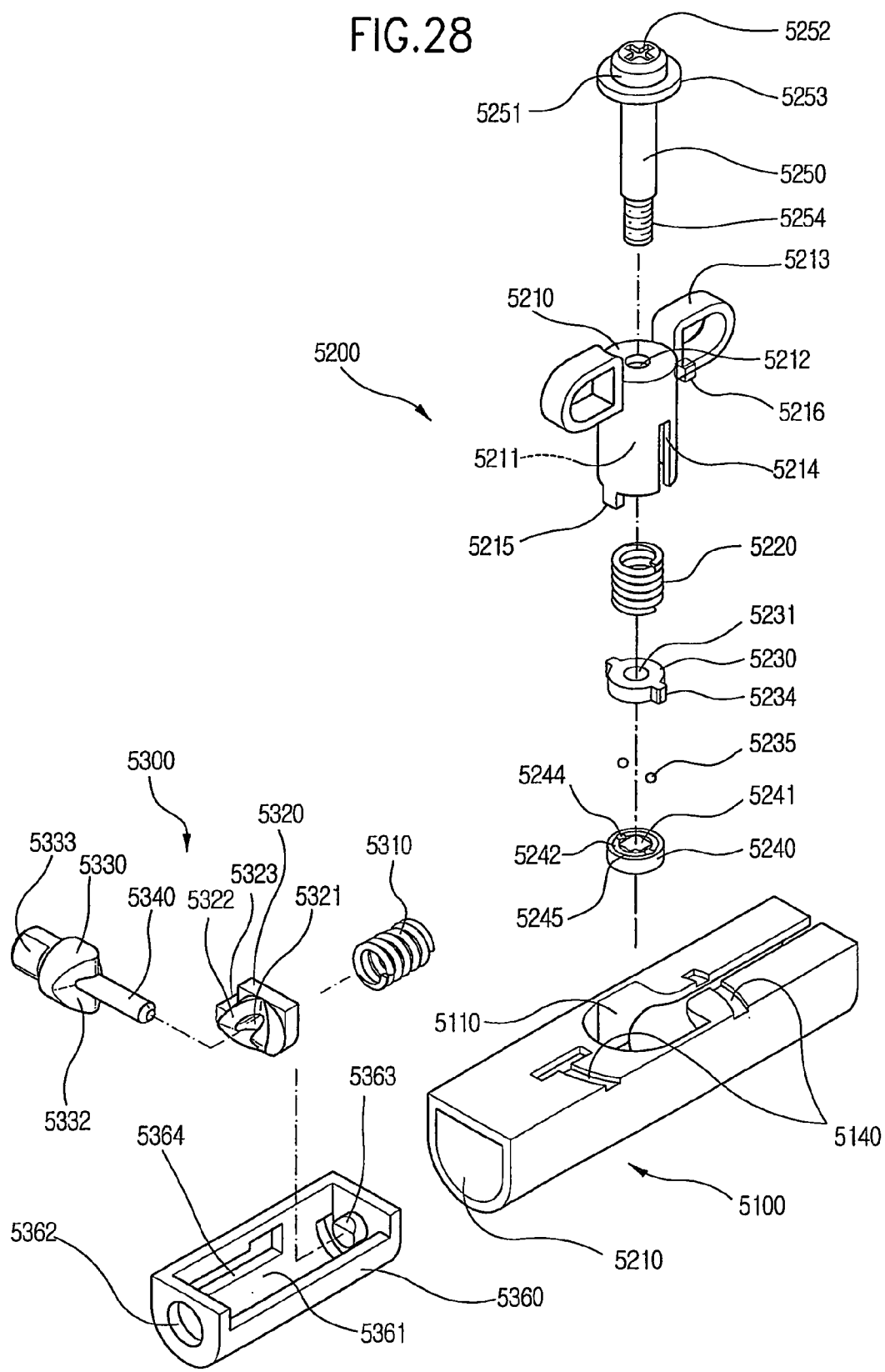
FIG. 28 is a sectional view of an example of a fifth rotary part in the hinge mechanism of the portable phone according to the fifth embodiment of the present invention as shown in FIG. 27.
Figure 29:
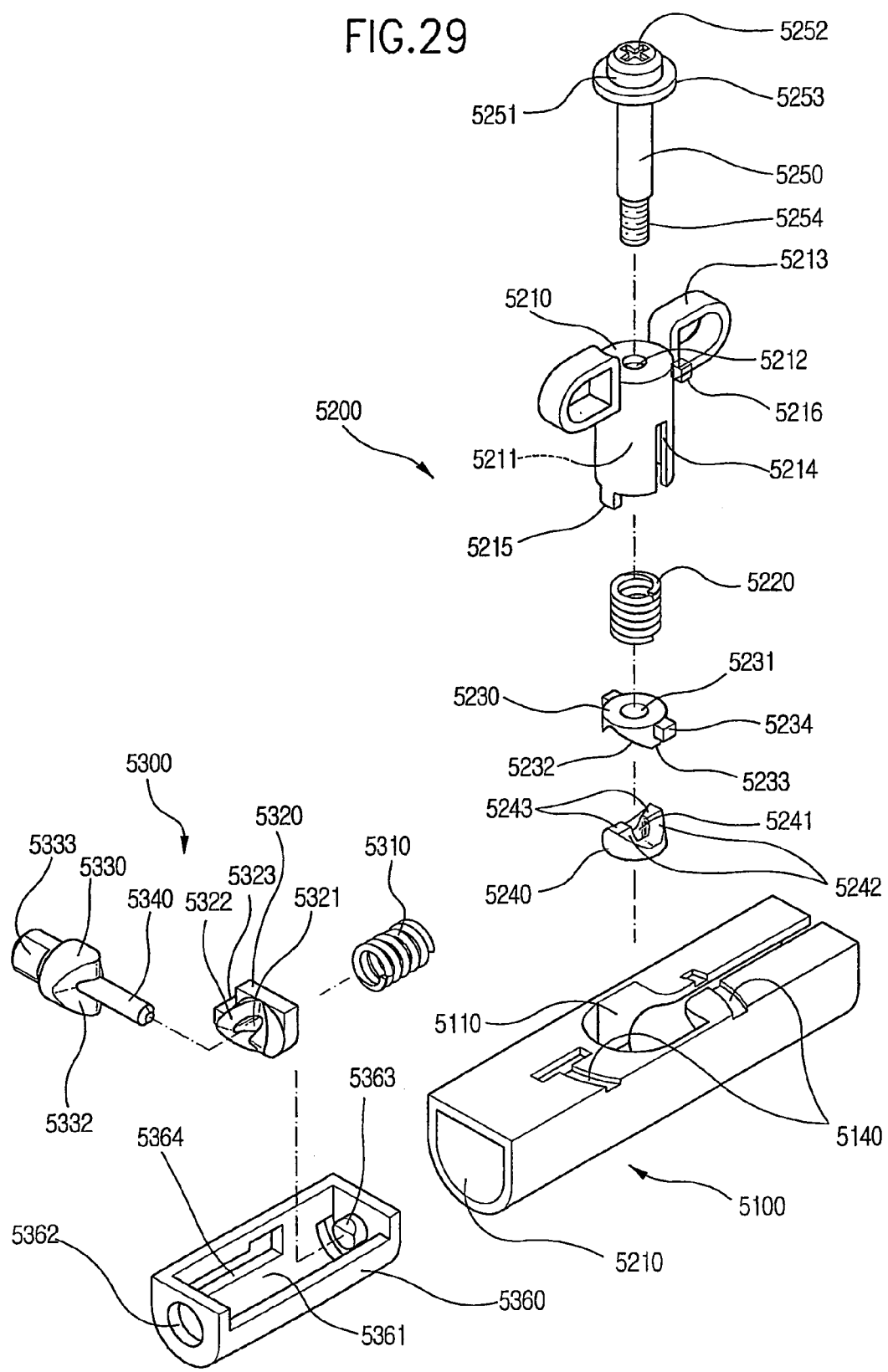
FIG. 29 is a sectional view of another example of the fifth rotary part in the hinge mechanism of the portable phone according to the fifth embodiment of the present invention as shown in FIG. 27.
Figure 30:
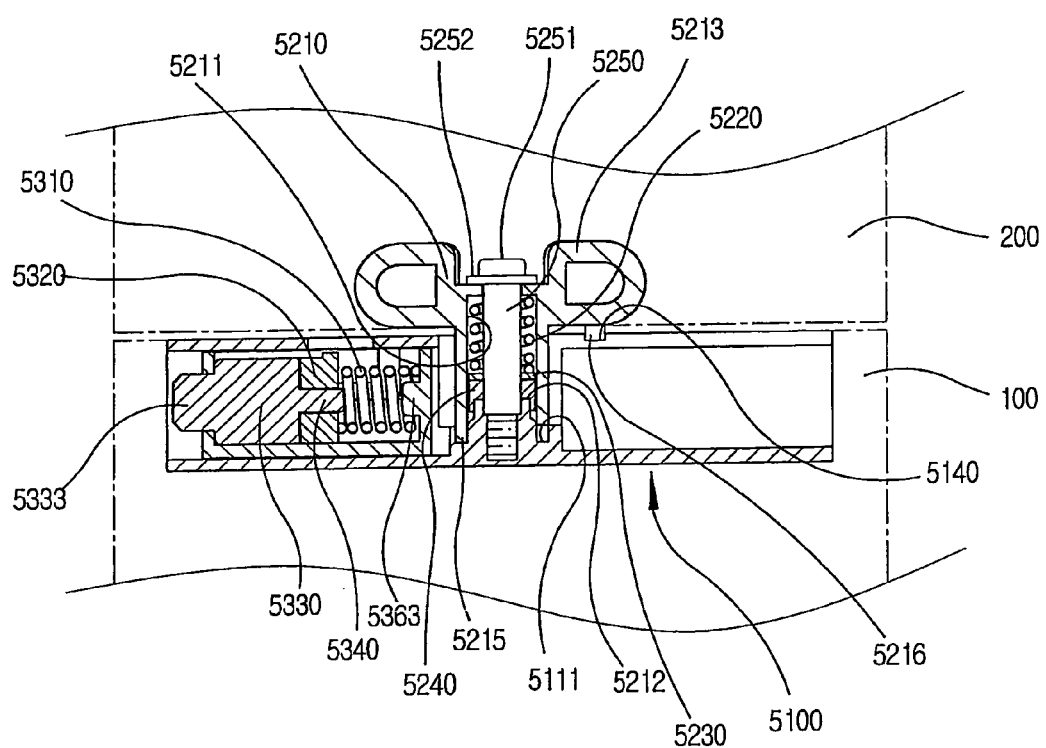
FIG. 30 is a sectional view of the hinge mechanism of the portable phone according to the fifth embodiment of the present invention as shown in FIG. 29, which shows the combination of the hinge mechanism.
Figure 31:
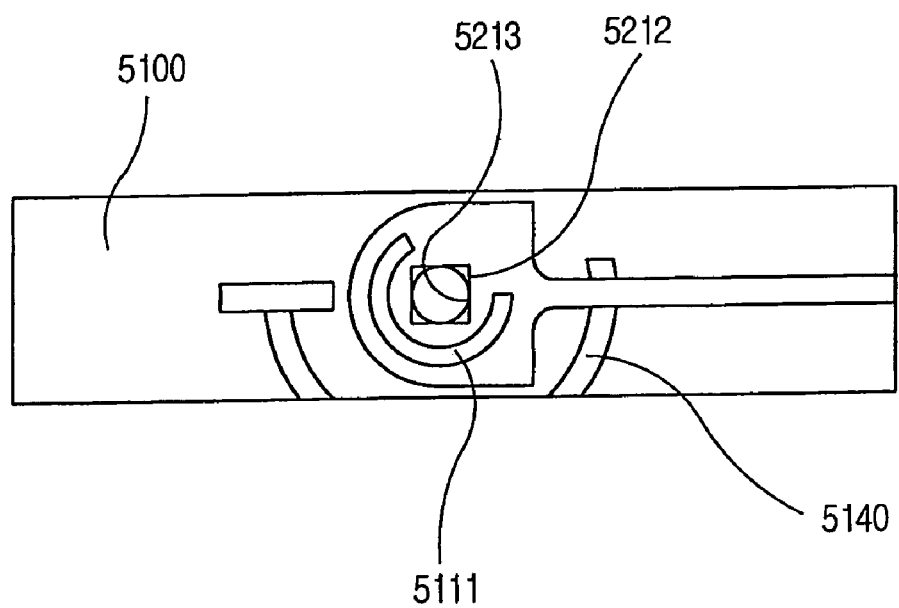
FIG. 31 is a plan view of a fifth housing in the hinge mechanism of the portable phone according to the fifth embodiment of the present invention as shown in FIG. 29.

FIG. 27 is an exploded perspective view of the cover hinge device of a portable phone according to the fifth embodiment of the present invention. FIG. 28 is a sectional view showing another example of the firth rotating portion of the hinge device shown in FIG. 27. FIG. 29 is a sectional view showing a further example of the firth rotating portion of the hinge device shown in FIG. 27.

A hinge device shown in FIG. 29 will now be explained.

As shown in FIG. 29, the hinge device includes a fifth rotation chamber 5110, a fifth housing 5100, a fifth hinge portion 5300, and a fifth rotating portion 5200. A upper portion of the fifth rotation chamber 5110 is open. The first rotation chamber 5300 is formed at one side of the fifth housing 5100. The fifth housing 5100 electrically connects the cover 200 and the body 100 to each other. The fifth hinge portion 5300 is installed at the fifth hinge chamber 5120 and opens/closes the cover 200. The fifth rotating portion 5200 is installed at the fifth rotation chamber 5110 and rotates the cover 200.

The hinge device according to the fifth embodiment is identical with the hinge device according to the fourth embodiment except structures of the fifth rotation chamber 5110 and the fifth rotating portion 5200. Accordingly, only the fifth rotation chamber 5110 and the fifth rotating portion 5200 will be described but repetition of the description on the same or similar components will be omitted.

A upper portion of the first rotation chamber 5110 is open. A fifth screw hole 5113 is formed at a bottom surface of the fifth rotation chamber 5110. A fifth angular projection 5112 is formed around the fifth screw hole 5113.

The fifth rotating portion 5200 includes a fifth cylinder 5210, a fifth compression spring 5220, a fifth rotation slip portion 5230, a fifth fixing slip portion 5240, and a fifth central shaft 5250. The fifth cylinder 5210 includes a fifth cylinder chamber 5211. A lower portion of the fifth cylinder chamber 5211 is open. A fifth cylinder hole 5212 is formed at a upper surface of the fifth cylinder 5210. A fifth cylinder groove 5214 is longitudinally formed at an outer and lower side of the fifth cylinder 5210. A pair of fifth arms 5213 are formed at an outer and upper side of the fifth cylinder 5210 symmetrical to each other. The fifth arms 5213 are connected to the cover 200. The fifth arms 5213 are fixed to the cover 200 by a locking device such as a screw.

A fifth cylinder projection 5215 is formed at a lower surface of the fifth cylinder 5210. A fifth stop groove 5111 is formed at a bottom surface of the fifth rotation chamber 5110. The fifth cylinder projection 5215 is moved along the fifth stop groove 5111. The fifth stop groove 5111 is designed to stop the fifth cylinder 5210 at an initial position and 180° rotated position.

On the other hand, a fifth arm projection 5216 is formed at a lower surface of the fifth arm 5213. A fifth housing stop groove 5140 is formed at a upper surface of the fifth housing 5100. The fifth arm projection 5216 is moved along the fifth housing stop groove 5140. The fifth housing stop groove 5140 is designed to stop the fifth cylinder 5210 at an initial position and 180° rotated position.

The fifth cylinder projection 5215, the fifth stop groove 5111, the fifth arm projection 5216, and the fifth housing stop groove 5140 limits a rotating angle of the cover 200 thereby preventing an entangelment of a wire or a flexible PCB wherein the wire or the flexible PCB electrically connects the body 100 and the cover 200 to each other.

The fifth compression spring 5220 is inserted and installed in the fifth cylinder chamber 5211. The fifth compression spring 5220 elastically supports the fifth rotation slip portion 5230 and the fifth fixing slip portion 5240.

A fourth rotation slip hole 4231 is formed at a center of the fifth rotation slip portion 4231. A fifth rotation slip projection 5234 is formed at a peripheral surface of the fifth rotation slip portion 5230 and is slidably connected to the fifth cylinder groove 5214. A fifth rotation slip surface 5232 is formed at a lower surface of the fifth rotation slip portion 5230. The fifth rotation slip surface 5232 includes a pair of wave projections which are formed at both sides thereof. A fifth rotation plane portion 5233 is formed at a upper end of each of the wave projections.

A fifth angular hole 5241 is formed at a center of the fifth fixing slip portion 5240. A fifth fixing slip surface is formed at a upper surface of the fifth fixing slip portion 5240. Wave projections corresponding to the wave projections and the fifth fixing plane portion 5243 corresponding to the fifth rotation plane portion 5233 are formed at the fifth fixing slip surface.

The fifth rotation slip portion 5230 and the fifth fixing slip portion 5240 are not limited to the above stated structures. However, the fifth rotation slip portion 5230 and the fifth fixing slip portion 5240 are substituted by a rotation slip portion and a fixing slip portion accroding the first through fourth embodiments, respectively.

A fifth screw portion 5254 is formed at a lower end portion of the central shaft 5250. The fifth screw portion 5254 is connected to a fifth screw hole 5113. A fifth head portion 5251 is formed at a upper end portion of the fifth central shaft 5250. A fifth tool groove 5252 is formed at a upper surface of the fifth head portion 5251. A fifth washer 5253 is integrally formed on a lower surface of the fifth head portion 5251. The fifth tool groove 5252 has a line shape of a cross shape. A rotation tool such as a driver is inserted into the fifth tool groove 5252 and fixes the fifth central shaft 5250 to the fifth rotation chamber 5110. The fifth washer 5253 is installed to be separated from the fifth central shaft 5250.

The fifth central shaft 5250 pierces the a fifth cylinder hole 5212, a fifth compression spring 5220, a fifth rotation slip hole 5231, and a fifth fixing slip hole, and locks the fifth screw portion 5254 to a fifth screw hole, and is fixed to the fifth rotation chamber 5110. At this time, a fifth angular hole 5241 of a fifth fixing slip portion 5240 is connected to a fifth angular projection 5112 of a fifth rotation chamber 5110.

Since a structure of the fifth hinge portion 530 and an operation according to an embodiment of the present invetion are identical with those of a fourth embodiment, the descriptions are omitted.

The Sixth Embodiment

Hereinafter, a cover hinge device of a portable phone according to the sixth embodiment of the present invention.

Figure 32:
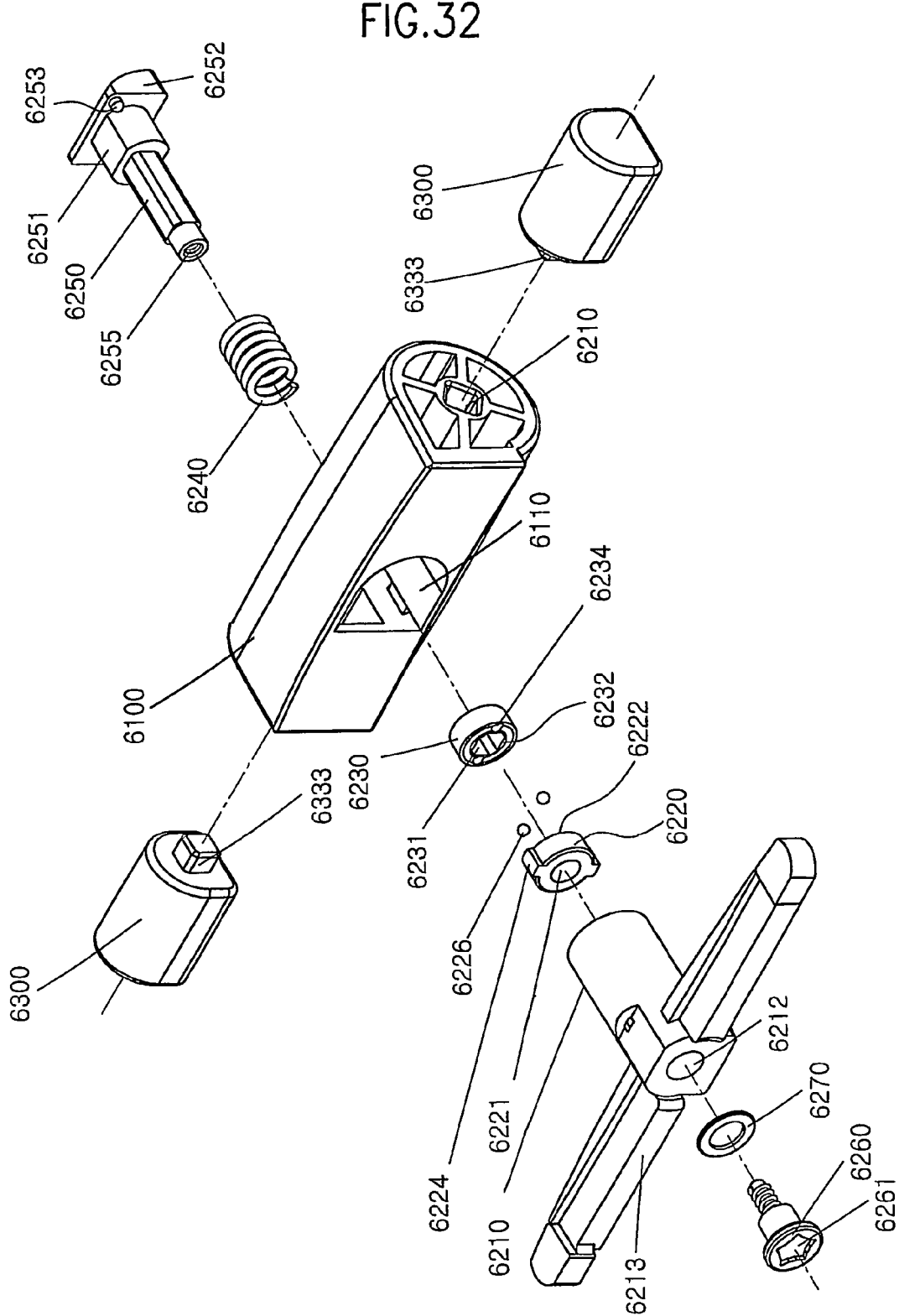
FIG. 32 is an exploded perspective view of a hinge mechanism of a portable phone according to a sixth embodiment of the present invention.
Figure 33:
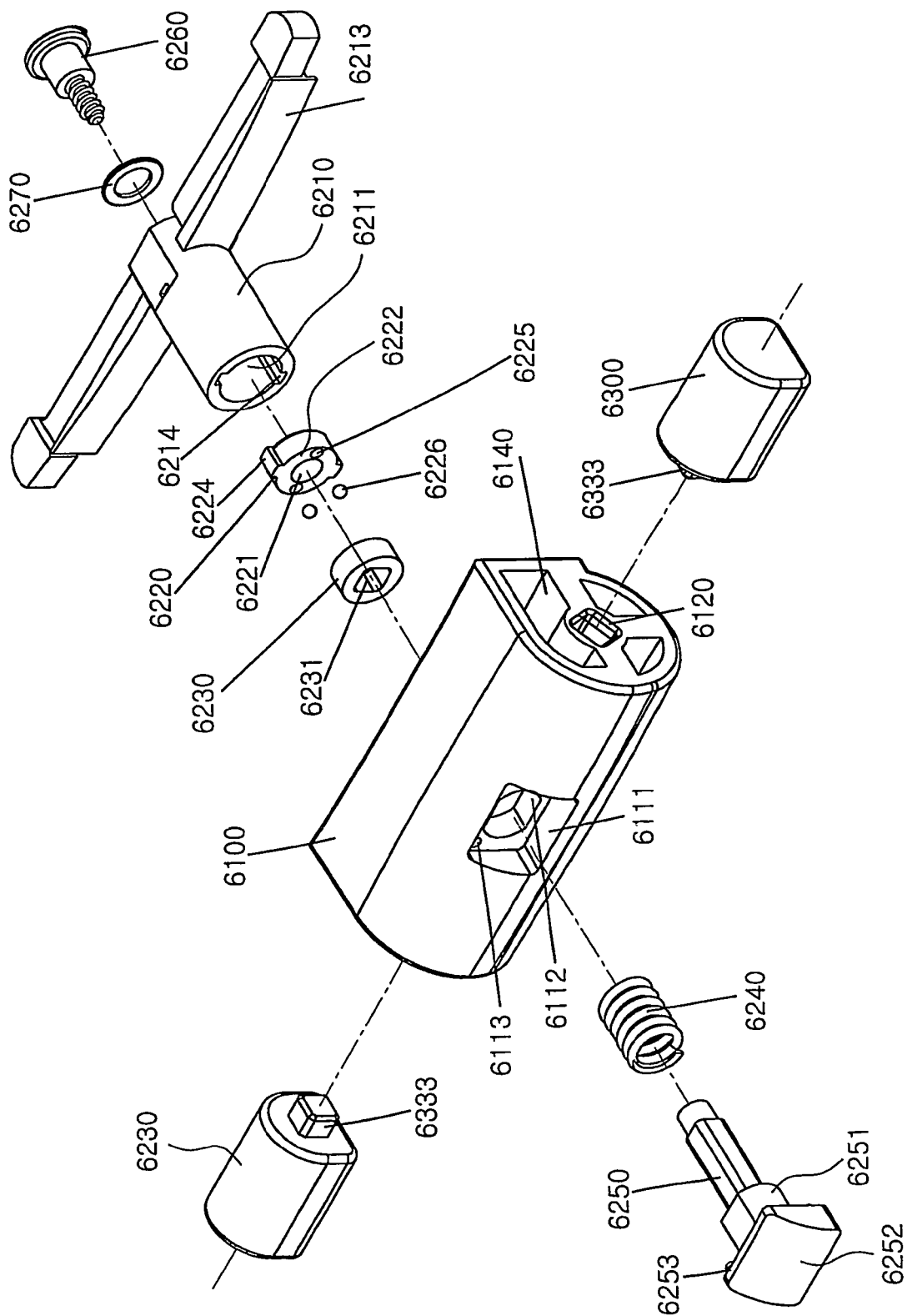
FIG. 33 is an exploded perspective view of the hinge mechanism of the portable phone according to the sixth embodiment of the present invention as shown in FIG. 32, in which the hinge mechanism is shown in a view of rotating the hinge mechanism at an angle of 180 degree.
Figure 34:
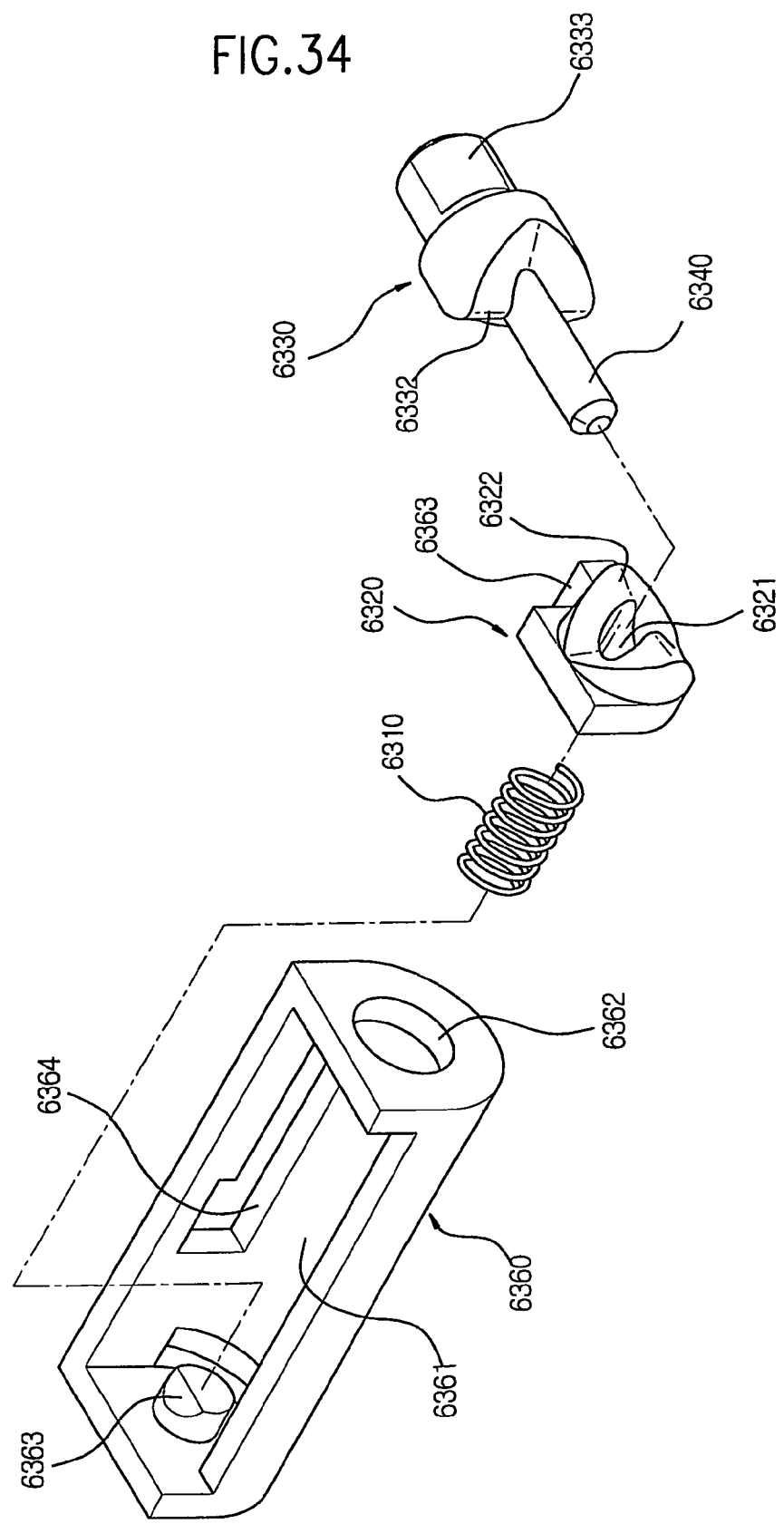
FIG. 34 is an exploded perspective view of a sixth hige part in the hinge mechanism of the portable phone according to the sixth embodiment of the present invention as shown in FIG. 32.
Figure 35:
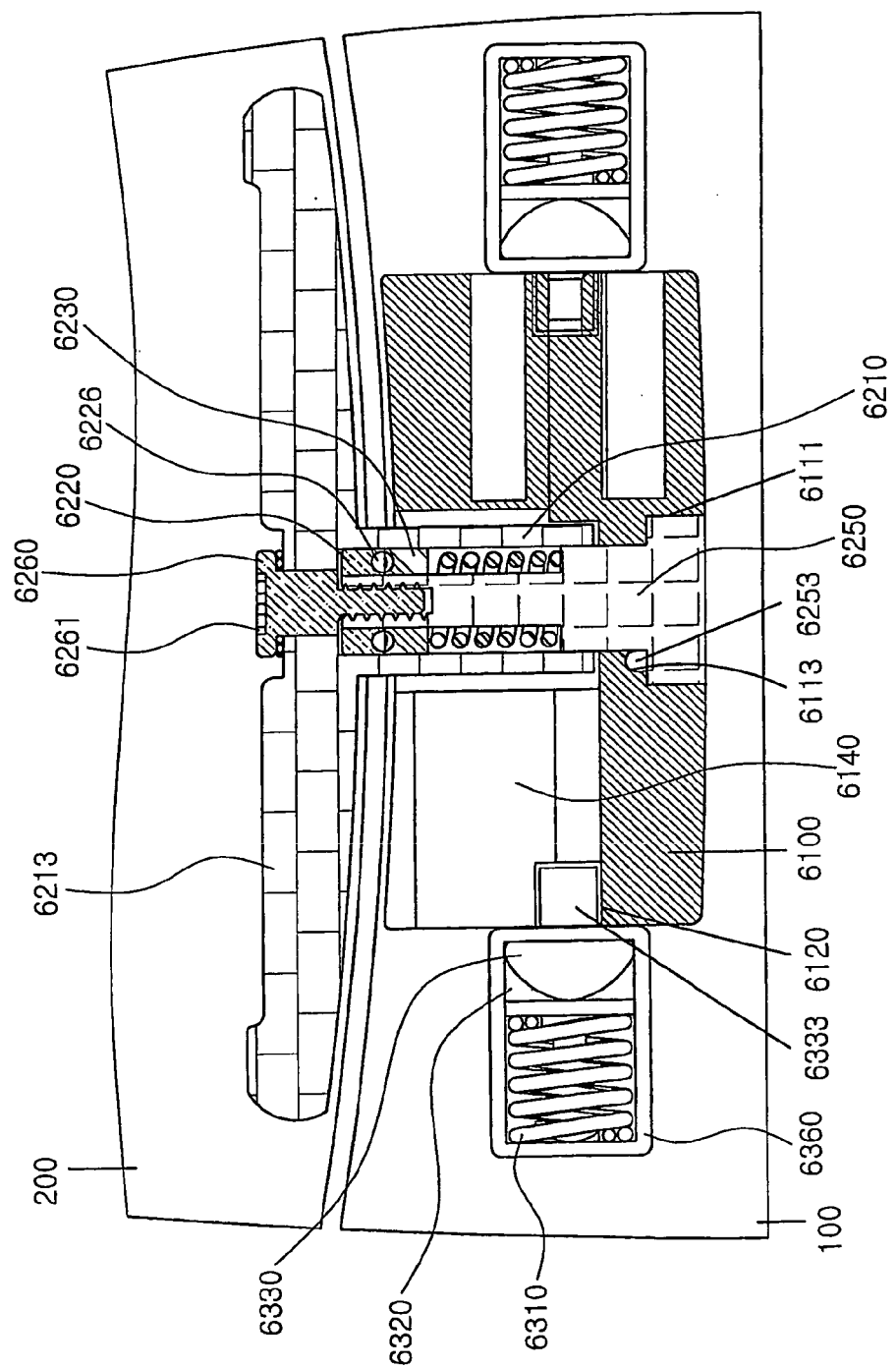
FIG. 35 is a sectional view of the hinge mechanism of the portable phone according to the sixth embodiment of the present invention as shown in FIG. 32, which shows the combination of the hinge mechanism.

FIG. 32 is an exploded perspective view of the cover hinge device of a portable phone according to the sixth embodiment of the present invention. FIG. 33 is an exploded perspective view of the hinge device shown in FIG. 32 taken in another angle. FIG. 34 is an exploded perspective view showing a sixth hinge portion of the hinge device shown in FIG. 32. FIG. 35 is a sectional view showing a connecting state of the cover hinge device shown in FIG. 32.

As shown in FIG. 32, the cover hinge device includes a sixth rotation chamber 6110, a sixth housing 6100, a sixth hinge portion 6300, and a sixth rotating portion 6200. A upper portion of the sixth rotation chamber 6110 is open. A sixth fixing groove 6111 is formed at a lower surface of the sixth rotation chamber 6110. A sixth housing angular hole 6112 is formed at the sixth fixing groove 6111. Sixth hinge fixing grooves 6120 are formed at both sides of the sixth housing 6100. The sixth hinge portion 6300 is connected to the sixth hinge fixing groove 6120 and opens/closes the cover 200.

A sxith position fixing groove 6113 is formed at the sixth fixing groove 6111.

A sixth wiring path 6140 is formed at a side surface of the sixth housing 6100 in a side direction. All kinds of wirings are installed through the sixth wiring path 6140.

The sixth rotating portion 6200 includes a sixth cylinder 6210, a sixth compression spring 6240, sixth slip members 6220 and 6230, a six central shaft 6250, and a sixth screw 6260.

The sixth cylinder 6210 includes a sixth cylinder chamber 6211. A lower surface of the sixth cylinder chamber 6200 is open. A sixth cylinder hole 6212 is formed at a upper surface of the sixth cylinder chamber 6211. A pair of sixth arms is protruded to an outer and upper side of the sixth cylinder 6210. The arms are connected to the cover 200. A sixth cylinder groove 6214 is longitudinally formed at an inner surface of the sixth cylinder 6210.

The sixth compression spring 6240 elastically supports the sixth slip members 6220 and 6230. The sixth compression spring 6240 is installed at the sixth cylinder chamber 6211.

The sixth slip members 6220 and 6230 include a sixth rotation slip portion 6220, a sixth fixing slip portion 6230, and a first ball 6226.

A sixth rotation slip hole 6221 is formed at a center of the sixth rotation slip portion 6220. A sixth rotation slip projection 6224 is formed at a peripheral surface of the sixth rotation slip portion 6220. The sixth rotation slip portion 6224 is connected to the sixth cylinder groove 6214. A sixth plane rotation slip surface 6222 is formed at a lower surface of the sixth rotation slip portion 6220. A pair of sixth hemispherical rotation grooves 6225 are formed at the sixth plane rotation slip surface 6222.

A sixth angular hole 6231 is formed at a center of the six fixing slip portion 6230. A sixth fixing slip surface 6232 corresponding to the sixth rotation slip surface 6222 is formed at a upper surface of the sixth fixing slip portion 6230. A sixth hemispherical fixing groove 6234 corresponding to the sixth hemispherical rotation groove 6225 is formed at the sixth fixing slip surface 6232.

A sixth ball 6226 is inserted and fixed in the sixth hemispherical rotation groove 6225 and the sixth hemispherical fixing groove 6234.

The sixth central shaft 6250 has a long stick shape which corresponds to the sixth angular hole 6231. A sixth angular projection 6251 is formed at a upper portion of the sixth central shaft 6250 and is inserted into the sixth housing angular hole 6112. A sixth angular head portion 6252 is formed at an end of the sixth angular projection 6251. When the sixth central shaft 6250 is installed at the sixth housing 6100, the sixth angular projection 6251 is connected to the sixth housing angular hole 6112 and the sixth head portion 6252 is connected to the sixth fixing groove 6111. A sixth position fixing projection 6253 is formed at the sixth head portion 6252. The sixth position fixing projection 6253 is inserted into the sixth position fixing groove 6113. The sixth central shaft 6250 is fixed and installed at the sixth rotation chamber 6110 through the sixth housing angular hole 6112 in a lower surface of the sixth housing 6100.

A sixth screw hole 6255 is formed at a lower end of the sixth central shaft 6250. A sixth screw 6260 is locked to the sixth screw hole 6255 to fix the sixth cylinder 6210 to the sixth central shaft 6250.

A sixth tool groove 6261 is formed at a upper surface of the sixth screw 6260 to connect a rotation tool. Between the sixth cylinder 6210 and the sixth screw 6260.

The liquid crystal display 210 is set to off when the cover 200 is closed to the main body 100. In the portable phone of the present embodiment, if the main body 100 is closed in a state in which the cover 200 is reversely rotated and the liquid crystal display 210 is outwardly exposed, additional sensor and control function operating the liquid crystal display 210 is required.

As shown in FIG. 34, the sixth hinge portion 6300 is the substantially same as the fourth hinge portion 4300 in the structure and operation, therefore the specific explanation thereof will be omitted. The names of the essential parts of the sixth hinge portion 6300 are changed the fourth to the sixth, and the numerals are changed the 4000 to the 6000.

Figure 39:
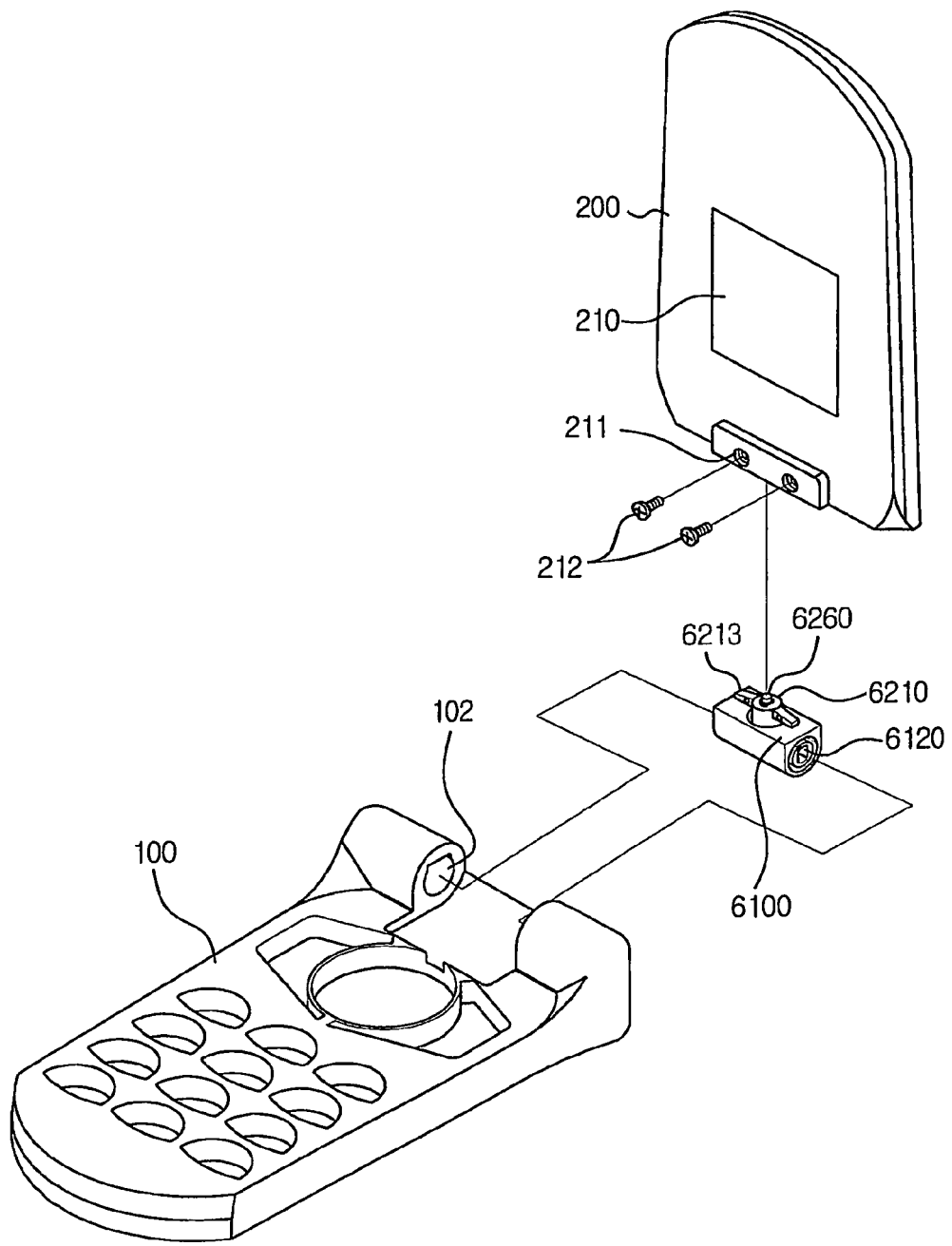
FIG. 39 is an exploded perspective view of a process of assembling the hinge mechanism with a body of the portable phone according to the sixth embodiment of the present invention as shown in FIG. 32.

FIG. 39 is a broken perspective view showing the assembling process in which the hinge device according to the present invention is assembled with the main body.

The sixth hinge shaft 6340 is rotatably connected to the sixth rotating hinge hole 6321 in a state in which the cover hinge device is assembled between the main body 100 and the cover 200. And, the sixth rotating hinge surface 6322 is closely contacted to the sixth fixed hinge surface 6332 by the sixth hinge spring 6310. At this time, the sixth fixed hinge protrusion 6333 of the sixth fixed hinge portion 6330 is connected to the sixth hinge fixed recess 6120 of the sixth housing 6100 through the sixth hinge housing hole 6362.

The mountain portion and the valley portion of the sixth rotating hinge surface 6322 are respectively connected to the mountain portion and the valley portion of the sixth fixed hinge surface 6332 in a state in which the cover 200 is closed to the main body 100.

Meanwhile, the sixth central shaft 6250 passes through the sixth housing square hole, the sixth compressed spring 6240, the sixth fixed slip hole, the sixth rotating slip hole 6221 and the sixth cylinder hole 6212. And, the sixth screw 6260 is connected to the sixth screw hole 6255. Thereby, the sixth central shaft 6250 is fixed to the sixth rotating chamber 6110. That is, all components of the sixth rotating portion 6200 are connected to the sixth central shaft 6250. One inserts a rotating tool such as a hexagonal wrench into the sixth screw recess 6261 formed on the sixth screw 6260, afterward rotates and connects the sixth screw 6260.

Figure 36:
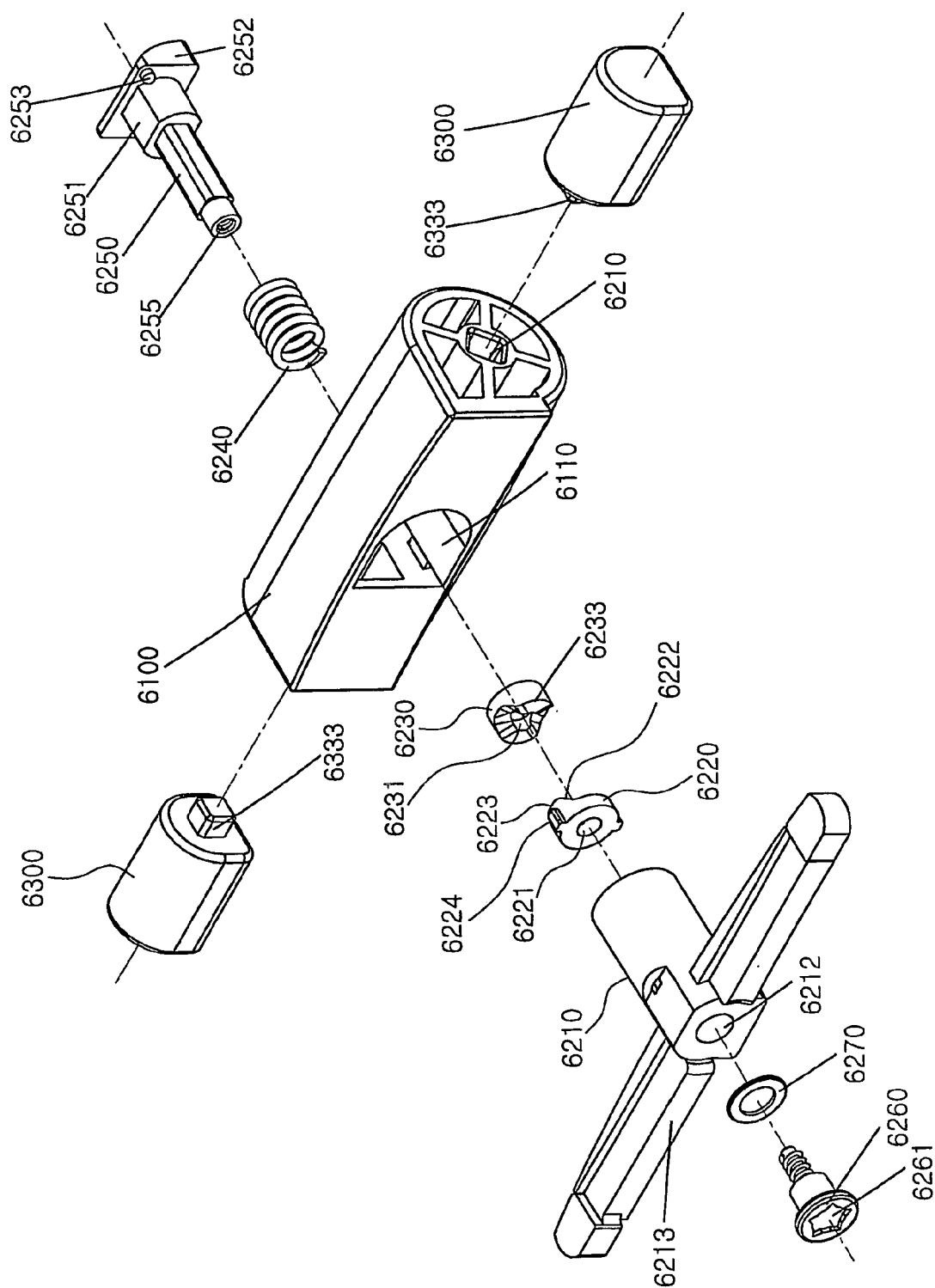
FIG. 36 is an exploded perspective view of an example of a sixth rotary slip part and a sixth fixed slip part in the hinge mechanism of the portable phone according to the sixth embodiment of the present invention as shown in FIG. 32.
Figure 37:
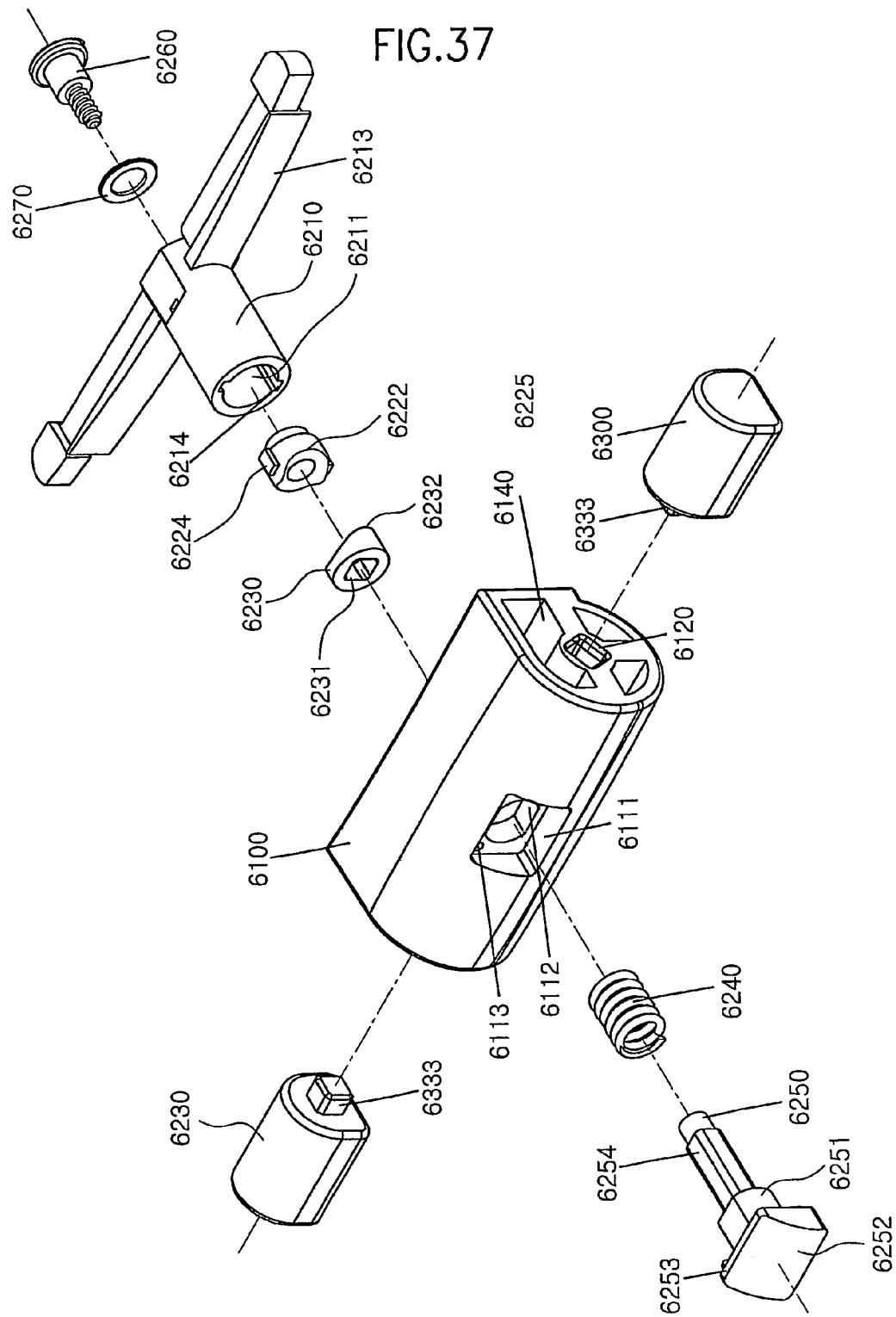
FIG. 37 is an exploded perspective view of another example of the sixth rotary slip part and the sixth fixed slip part in the hinge mechanism of the portable phone according to the sixth embodiment of the present invention as shown in FIG. 32.

Meanwhile, the sixth slip members 6220 and 6230 can be displaced those of embodiment shown in FIGS. 36 and 37.

Figure 38:
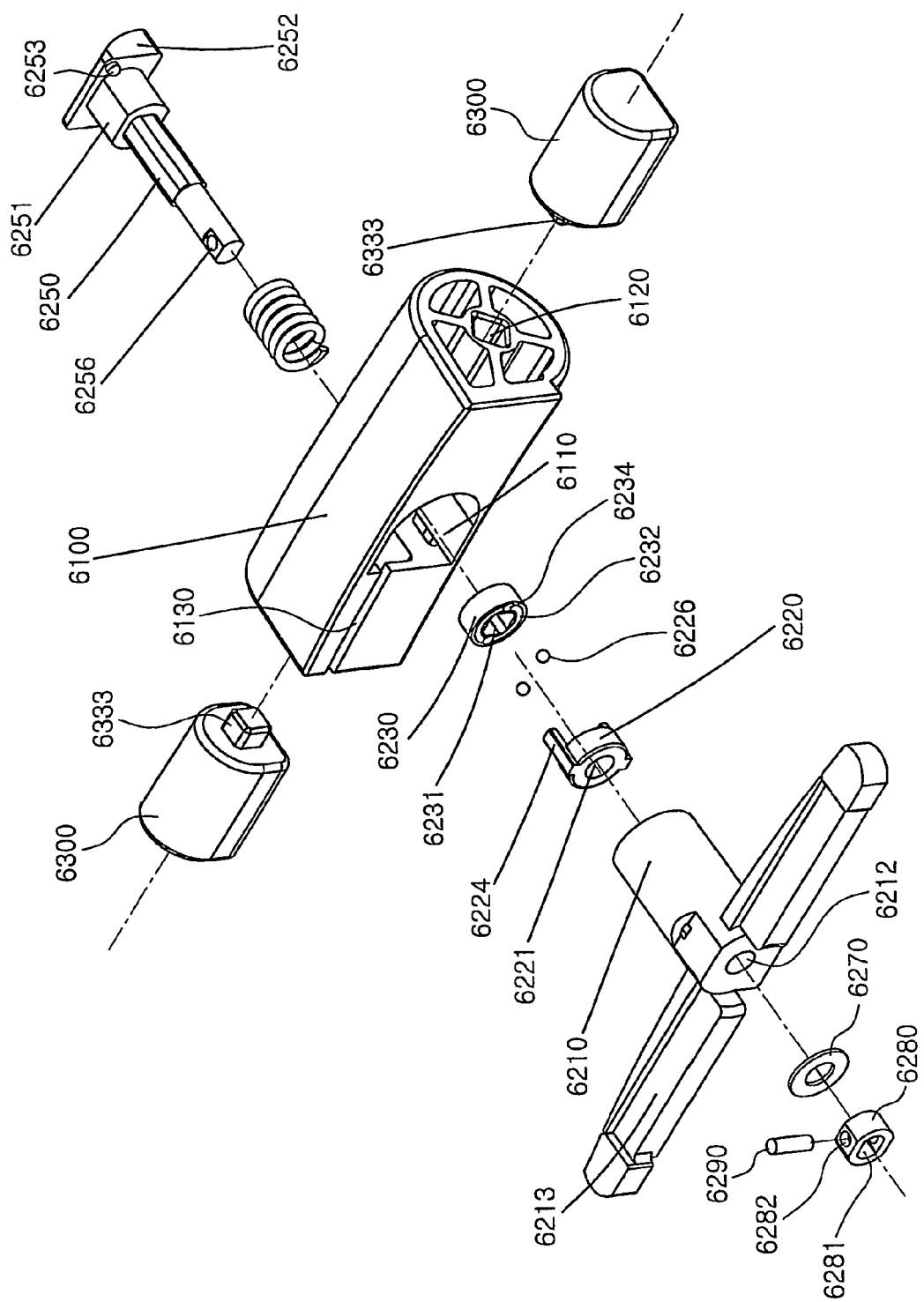
FIG. 38 is an exploded perspective view of an example of a sixth center shaft in the hinge mechanism of the portable phone according to the sixth embodiment of the present invention as shown in FIG. 32.

Meanwhile, as shown in FIG. 38, the sixth pin hole 6256 is formed on the outer periphery of the upper region of the sixth central shaft 6250, and the sixth pin 6290 is connected to the sixth pin hole 6256. Thereby, the sixth cylinder 6210 can be fixed to the sixth central shaft 6250.

The operation according to the present embodiment is the substantially same as that of the fourth embodiment, therefore no further specific ones will be explained.

The Seventh Embodiment

Hereinafter, the cover hinge device according to the seventh preferred embodiment of the present invention will be explained.

Figure 40:
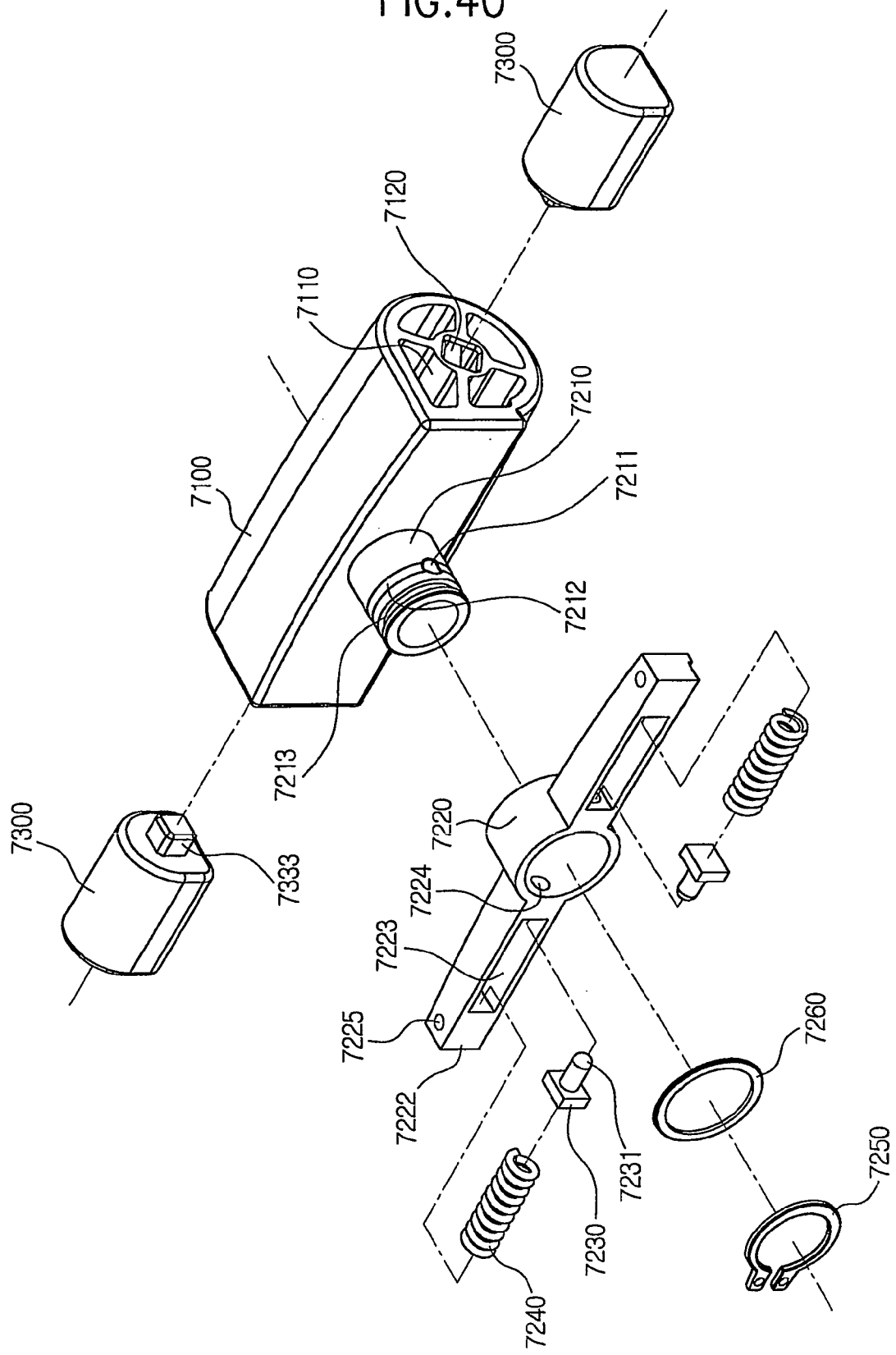
FIG. 40 is an exploded perspective view of a hinge mechanism of a portable phone according to a seventh embodiment of the present invention.
Figure 41:
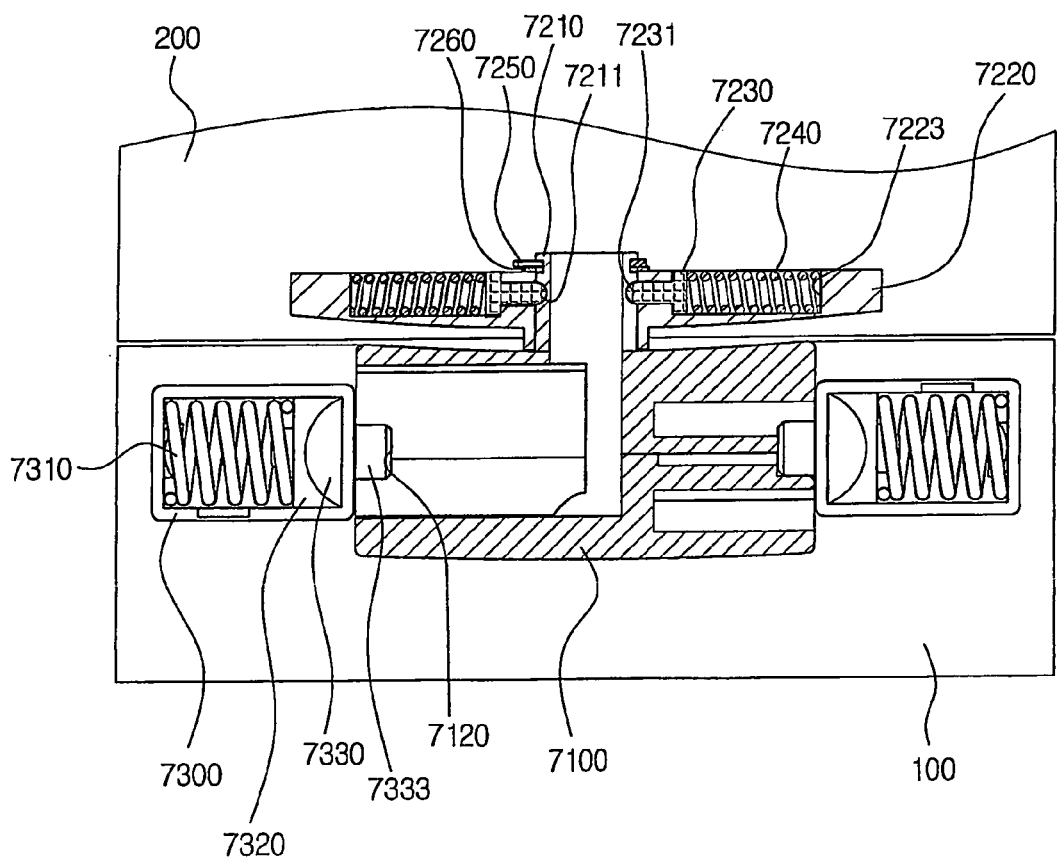
FIG. 41 is a sectional view of the hinge mechanism of the portable phone according to the seventh embodiment of the present invention as shown in FIG. 40, which shows the combination of the hinge mechanism.

FIG. 40 is a broken perspective view of the cover hinge device according to the seventh preferred embodiment of the present invention, and FIG. 41 is a sectional view showing the assembling state of the cover hinge device shown in FIG. 40.

As shown in FIG. 40, the hinge device according to the present invention includes the seventh housing 7100 in which the seventh hinge fixed recess 7120 being fixed to the seventh hinge portion 7300 for opening and closing the cover 200 is formed on the side surface thereof and which mechanically connects the cover 200 to the main body 100, the seventh hinge portion 7300 which is connected to the seventh hinge fixed recess 7120 and which opens and closes the cover 200, and the seventh rotating portion 7200 which is protrudently formed on the upper surface of the seventh housing 7100 and rotates the cover 200.

The seventh rotating portion 7200 includes the seventh fixed cylinder portion 7210, the seventh rotating cylinder portion 7220, the seventh moving member 7230, the seventh compressed spring 7240 and the seventh C-ring 7250.

The seventh fixed cylinder portion 7210 is hollowed cylindrical type, and it is protrudently formed on the upper surface of the seventh housing 7100. A pair of the seventh recesses 7211 are formed in symmetry on the outer periphery surface of the seventh fixed cylinder portion 7210, and also the seventh guiding recess 7212 connecting each the seventh recess 7211 each other is formed. The seventh recess 7211 is hemisphere type, and can be differently designed according to the condition.

The seventh annular recess 7213 is formed on the outer periphery surface of the upper portion of the seventh fixed cylinder portion 7210. The seventh C-ring 7250 is connected to the seventh annular recess 7213. Thereby, the seventh rotating cylinder portion 7220 is fixed to the seventh fixed cylinder portion 7210.

The seventh rotating cylinder portion 7220 is rotatably inserted into the seventh fixed cylinder portion 7210. The seventh rotating cylinder portion 7220 has the seventh intermediate hole 7221 that the seventh fixed cylinder portion 7210 is inserted into. And a pair of symmetry the seventh arm 7222 is formed the outer periphery surface of the seventh rotating cylinder portion 7220. The seventh spring chamber 7223 is longitudinally formed on the seventh arm 7222. The seventh connecting hole 7224 connecting to intermediate hole 7221 is formed on the spring chamber 7223.

The seventh protrusion 7231, which passes through the seventh connecting hole 7224 and which is inserted into the seventh recess 7211, is formed on the seventh moving member 7230. And, the seventh moving member 7230 is movably inserted and installed into the seventh spring chamber 7223. The seventh protrusion 7231 has a shape corresponding to the seventh recess 7211.

The seventh compressed spring 7240 is inserted into the seventh spring chamber 7223 and elastically supports the seventh moving member 7230 toward the seventh intermediate hole 7221.

The C-ring 7250 is connected to the seventh annular recess 7213 formed on the outer periphery surface of the seventh fixed cylinder portion 7210 from outside of the seventh rotating cylinder portion 7220. Meanwhile, the seventh washer 7260 can be installed between the seventh rotating cylinder portion 7220 and the seventh C-ring 7250.

The seventh line path 7110 connecting to the intermediate of the seventh fixed cylinder portion 7210 is formed on the seventh housing 7100. Each line, which passes the seventh line path 7210, is connected to the main body 100 and the cover 200 through the seventh line path 7110.

The seventh connecting hole 7225 is formed on the seventh arm 7222, and it connects the seventh arm 7222 to the cover 200 using a connecting means such as a screw.

Meanwhile, the seventh hinge portion 7300 is the substantially same as that of the fourth embodiment disclosed in FIG. 24, therefore more explanation will be omitted. Further, the names of the essential parts of the seventh hinge portion 7300 is changed the fourth to the seventh, and the numerals is changed 4000 to 7000.

Hereinafter, the operation of the hinge device having the above-described structure will be explained.

The seventh hinge shaft 7340 is rotatably connected to the seventh rotating hinge hole 7321 in a state in which the cover hinge device is assembled between the main body 100 and the cover 200. The seventh rotating hinge surface 7322 is closely contacted to the seventh fixed hinge surface 7332 by the seventh hinge spring 7310. At this time, the seventh fixed hinge protrusion 7333 of the seventh fixed hinge portion 7330 is connected to the seventh hinge fixed recess 7120 of the seventh housing 7100 through the seventh hinge housing hole 7362.

In a state in which the cover 200 is closed to the main body 100, the mountain portion and the valley portion of the seventh rotating hinge surface 7322 are connected to the mountain portion and the valley portion of the seventh fixed hinge surface 7332, respectively.

In the meantime, the seventh fixing cylinder part 7210 formed at the seventh housing 7100 is inserted into the seventh rotating cylinder part 7220 fixed to the cover 200. The seventh protrusion 7231 of the seventh moving member 7230 elastically supported by the seventh coiled spring 7240 passes through the seventh connecting hole 7224 and then it is engaged in the seventh groove 7211 of the seventh fixing cylinder part 7210. Accordingly, the seventh rotating cylinder part 7220 and the cover 200 stop in a condition that a predetermined rotational driving force is applied thereto.

Since the seventh sealing 7250 is engaged in the seventh annular groove 7213 of the seventh fixing cylinder part 7210 at the outside of the seventh rotating cylinder part 7220, it is possible to prevent the seventh rotating cylinder part 7220 from being released.

The seventh washer 7260 reduces a friction generated between the seventh sealing 7250 and the seventh rotating cylinder part 7220.

In the meantime, a large-sized LCD monitor 210 is installed at an interior surface of the cover 200. If the cover 200 is closed against the main body 100, the user cannot see the LCD monitor 210 of the cover 200.

Accordingly, if the user wants to see the LCD monitor 210 in a state that he or she turns off the portable phone, at first, he or she must open the cover 200 by rotating it about the seventh housing 7100 from the main body 100.

Hereinafter, the process for reverse turning the cover 200 so as to see the large-sized LCD monitor 210 in a state that the user closes the cover 200 of the portable phone will be described in detail.

At first, the user opens the cover 200 by rotating it about the fourth housing 4100 from the main body 100.

When the cover 200 begins to be opened, the seventh rotating cylindrical part 7220 and the seventh housing 7100 fixed to the cover 200 by means of the seventh arm 7222 are rotated together. At this time, the seventh rotating hinge part 7320 installed at the seventh housing 7360 is also rotated together with the cover 200. Since the seventh fixing hinge part 7330 is fixed to the main body 100, it is not rotated.

Accordingly, a slip phenomenon is occurred between the seventh rotating hinge surface 7322 of the seventh rotating hinge part 7320 and the seventh fixing hinge surface 7332 of the seventh fixing hinge part 7330.

If the cover 200 is rotated at about 90 degrees, the mountain of the seventh rotating hinge surface 7322 is contacted with the mountain of the seventh fixing hinge surface 7332. At this time, the seventh hinge spring 7310 is compressed at its maximum. If the cover 200 is further rotated and then it is fully opened, the valley and the mountain of the seventh fixing hinge surface 7332 are engaged with the mountain and the valley of the fourth rotating hinge surface 4322, respectively. As a result, the seventh hinge spring 7310 returns at its initial state.

Since the seventh hinge shaft 7340 is inserted into the seventh rotating hinge hole 7321, it is possible to prevent the seventh hinge shaft 7340 from being released at the lateral direction during occurrence of the slip phenomenon between the seventh rotating hinge surface 7322 and the seventh fixing hinge surface 7332. Also, since the seventh rotating hinge protrusion 7323 of the seventh rotating hinge part 7320 is inserted into the seventh guide groove 7364 of the seventh hinge housing 7360, the seventh rotating hinge part 7320 cannot be rotated within the seventh hinge housing 7360 and it only performs a straight line motion.

If the user rotates the cover 110 in the clockwise direction or in the counter-clockwise direction in a state that the cover 200 is open, the seventh arm 7222 fixed to the cover 200 and the seventh rotating cylindrical part 7220 are rotated together. At this time, the seventh protrusion 7231 is released from the seventh groove 7211 of the seventh fixing cylindrical part 7210, and then it moves along the seventh guiding groove 7212. The seventh coiled spring 7240 is pushed and in turn is compressed by the seventh moving member 7230.

Continuously, if the cover 200 is rotated at 180 degrees, the seventh protrusion 7231 is fitted into the seventh groove 7211. At this time, the seventh coiled spring 7240 is expanded and in turn it pushes the seventh moving member 7230 toward the seventh fixing cylindrical part 7210 so as to generate a breaking power.

By performing the process for reverse turning the cover 200 as described above, the cover 200 turns reverse and then the large-sized LCD monitor 210 turns toward the outside.

If the user closes the cover 200 in a state that the cover 200 turns reverse, the large-sized LCD monitor 210 of the cover 200 turns toward the outside and thereby the user can see the large-sized LCD monitor 210 under the state that the portable phone is turned off.

Meanwhile, if the user does not want to see the large-sized LCD monitor 210, he or she operates the portable phone on the contrary process in order to set the large-sized LCD monitor of the cover 200 toward the main body 100.

The Eighth Embodiment

Hereinafter, the cover hinge apparatus for the portable phone according to the eighth embodiment of the present invention will be described in detail with reference to the accompanying drawings.

Figure 42:
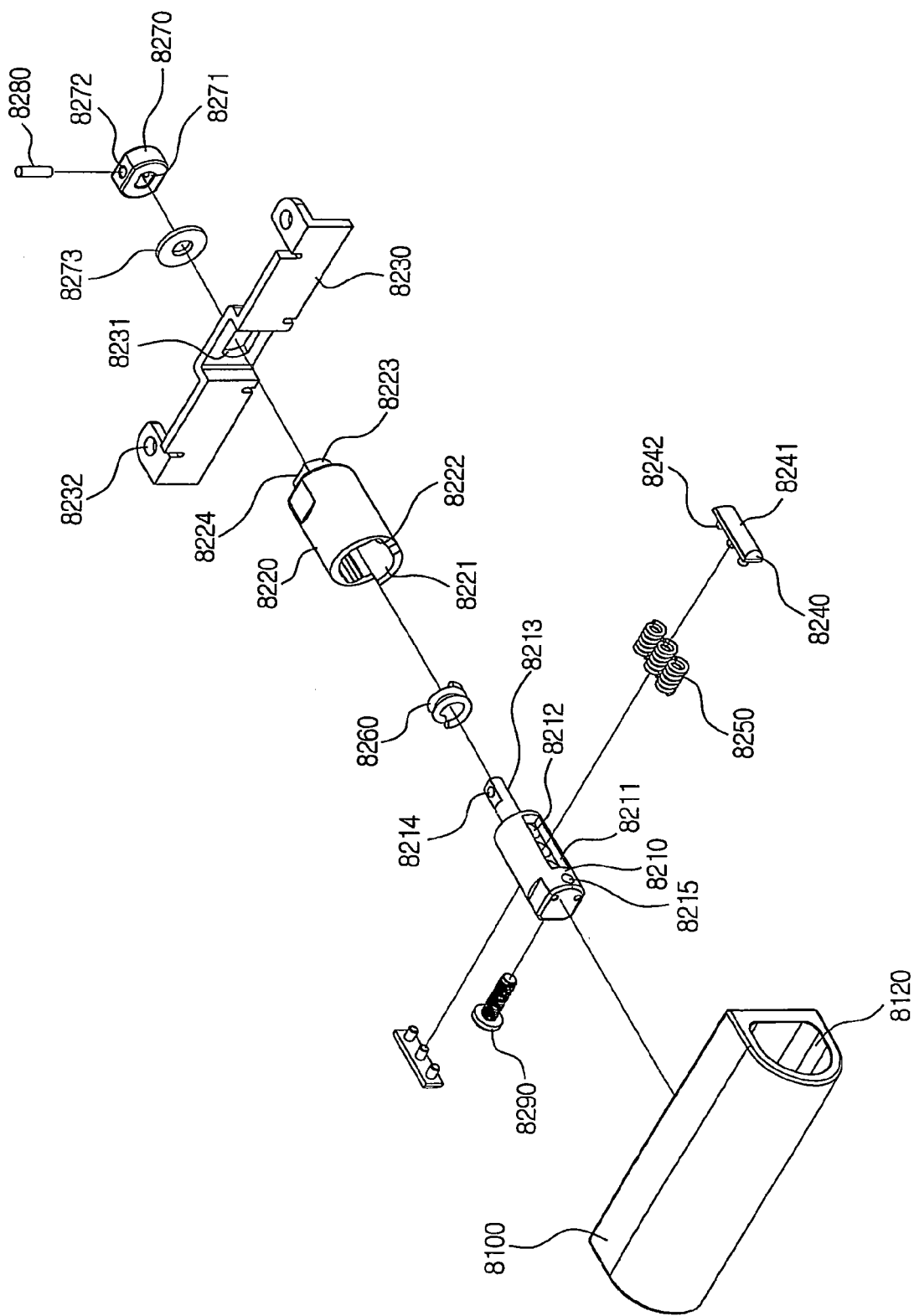
FIG. 42 is an exploded perspective view of a hinge mechanism of a portable phone according to an eighth embodiment of the present invention.
Figure 43:
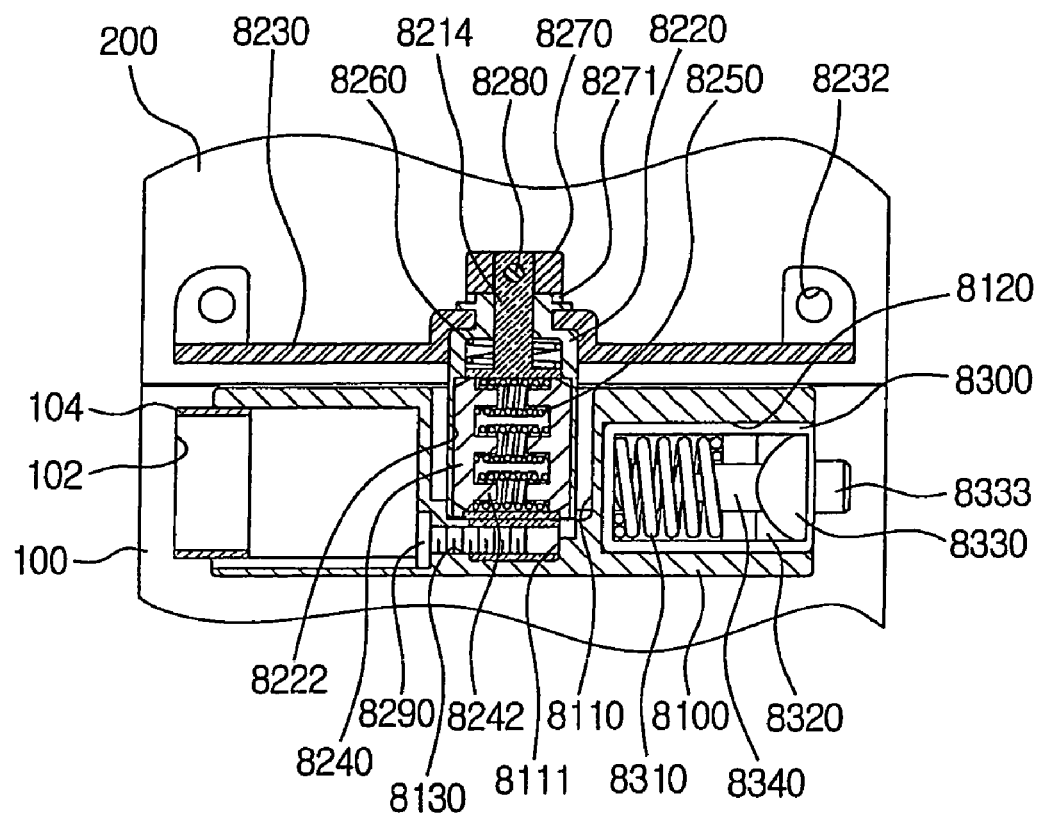
FIG. 43 is a perspective view of assembling of the hinge mechanism of the portable phone according to the eighth embodiment of the present invention as shown in FIG. 42.
Figure 44:
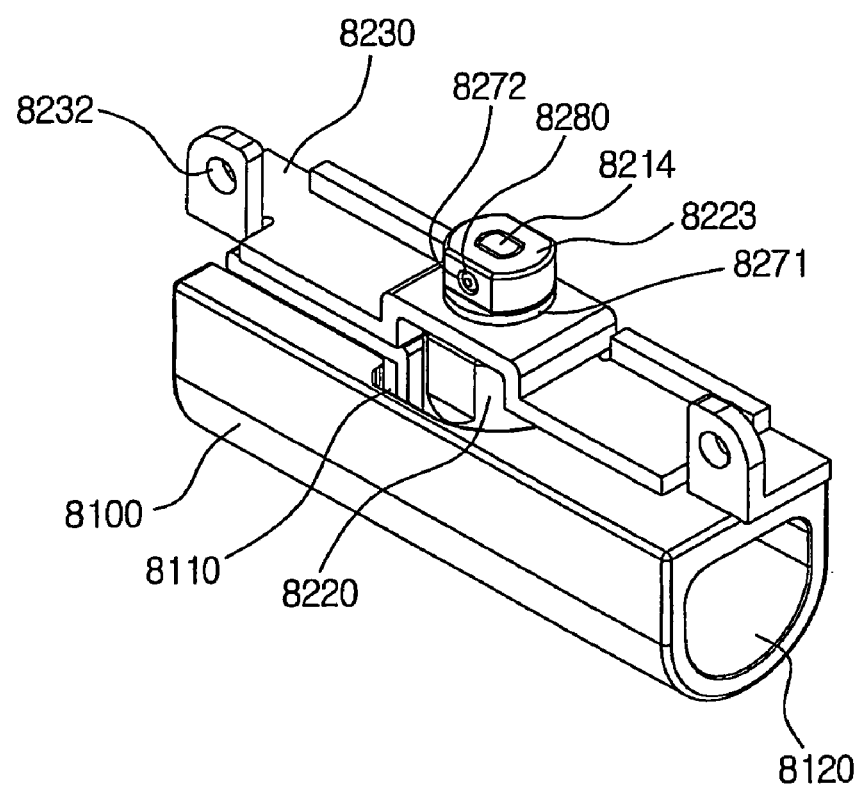
FIG. 44 is a sectional view of the combination of the hinge mechanism of the portable phone according to the eighth embodiment of the present invention.
Figure 45:
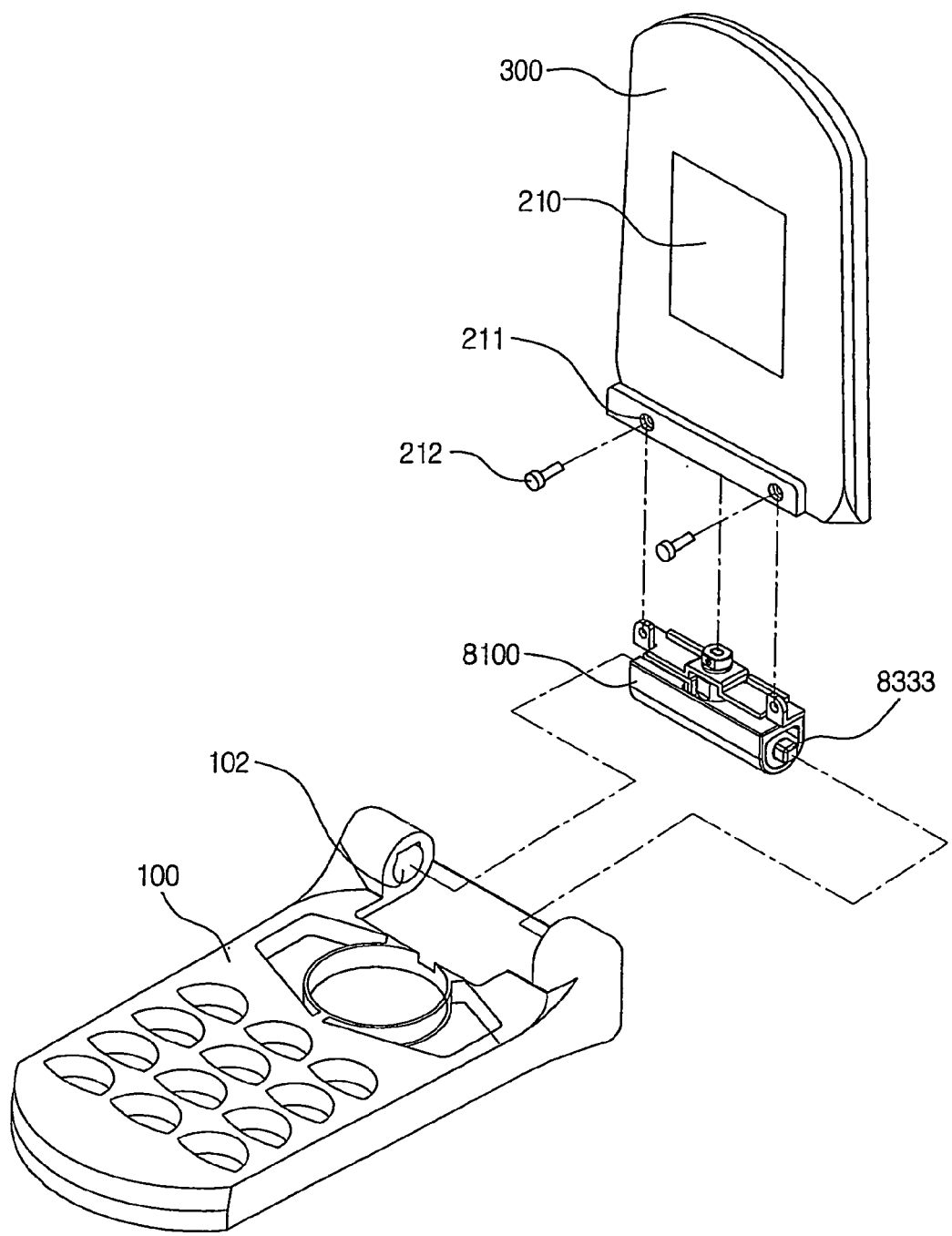
FIG. 45 is an exploded perspective view of a process of assembling the hinge mechanism with a body of the portable phone according to the eighth embodiment of the present invention as shown in FIG. 45.

FIG. 42 is an exploded perspective view of the cover hinge apparatus for the portable phone according to the eighth embodiment of the present invention, FIG. 43 is an exploded perspective view of the cover hinge apparatus as shown in FIG. 42, showing the assembled state thereof. Furthermore, FIG. 44 is a sectional view of the cover hinge apparatus as shown in FIG. 42, and FIG. 45 is an exploded perspective view of the cover hinge apparatus, showing a process of assembling the cover hinge apparatus to the main body.

As shown in FIGS. 42 and 43, the cover hinge apparatus for the portable phone according to the eighth embodiment of the present invention is provided with the eighth rotating chamber 8110 and the eighth hinge chamber 8120 formed at one side surface thereof. Furthermore, the cover hinge apparatus includes the eighth housing 8100 for mechanically connecting the cover 200 with main body 100, the eighth hinge part 8300 for opening or closing the cover 200, which is installed in the hinge chamber 8120, and the eighth rotating part 8200 for rotating the cover 200, which is installed in the eighth rotating part 8200.

The eighth rotating part 8200 is constituted of the eighth housing 8100, the eighth center shaft 8210, the eighth cylinder 8220, the eighth arm 8230, the eighth moving member 8240, the eighth center shaft spring 8250 and the eighth pin 8280.

The eighth center shaft 8210 is fixed on a bottom surface of the eighth rotating chamber 8110. The eighth outer periphery surface groove 8211 is formed at an outer periphery surface of the eighth center shaft 8210. A plurality of eighth spring holes 8212 are formed at the eighth outer periphery surface groove 8211. The eighth post 8231 is formed at an upper end of the eighth center shaft 8210 and the eighth pinhole 8214 is formed through the upper outer periphery surface of the eighth post 8231.

The eighth cylinder 8220 is provided with the eighth cylinder chamber 8221 of which a bottom surface is opened. The eighth cylinder hole 8224 is formed at the upper surface of the eighth cylinder 8220. The eighth cylinder groove 8222 for receiving the eighth moving member 8240 is formed at an inner periphery surface of the eighth cylinder 8220. The eighth cylinder groove 8222 is formed along the longitudinal direction of the eighth cylinder 8220 and then it has a concave shape. The eighth cylinder 8220 is rotatably installed on the eighth center shaft 8210.

The eighth arm 8230 is repeatedly rounded and is fixed to the cover 200 by engaging with the upper end of the eighth cylinder 8220.

The eighth moving member 8240 for rotating the cover 200 is elastically installed the eighth outer periphery surface groove 8211. The eighth rounded part 8241 corresponding to the eighth cylinder groove 8222 is formed at one side surface of the eighth moving member 8240. Furthermore, the eighth spring protrusion 8242 corresponding to the eighth spring hole 8212 is formed at the other side surface of the eighth moving member 8240.

The eighth center shaft spring 8250 is installed in the eighth spring hole 8212 and it is fitted into the eighth spring protrusion 8242 so as to elastically support the eighth moving member 8240.

The eighth coil spring 8260 is installed at the eighth post 8231 of the eighth center shaft 8210 and the eighth cylinder 8220, respectively.

The eighth pin 8280 is inserted into the eighth pinhole 8214 and then it makes the eighth arm 8230 and the eighth cylinder 8220 to be fixed to the eighth center shaft 8210.

Since construction and operation of the eighth hinge part 8300 is the same as those of the hinge part disclosed in the fourth embodiment and the seventh embodiment as described above, detailed explanation thereof will be omitted.

Hereinafter, operation of the present invention will be described in detail with reference to the accompanying drawings.

When the cover 200 is maintained in the main body 100 at a closed condition, the eighth rounded part 8241 of the eighth moving member 8240 is inserted into the eighth cylinder groove 8222 of the eighth cylinder 8220 by receiving an elastic force generated from the eighth center shaft spring 8250. Accordingly, the eighth cylinder 8220 and the eighth arm 8230 stop to rotate by receiving a resisting force. In other words, the cover 200 cannot be rotated.

Under this state, if the user wants to see the LCD monitor 210 in a state that he or she turns off the portable phone, at first, he or she must open the cover 200 by rotating it about the eighth housing 8100 from the main body 100.

If the user rotates the cover 200 in the clockwise direction or in the counter-clockwise direction in a state that the cover 200 is open, the eighth arm 8230 fixed to the cover 200 and the eighth cylinder 8220 fixed to the eighth arm 8230 are rotated together. At this time, the eighth rounded part 8241 of the eighth moving member 8240 engaged with the eighth center shaft 8210 is released toward the eighth cylinder groove 8222 of the eighth cylinder 8220 and then it is rotated along the inner periphery surface of the eighth cylinder chamber 8221. At this time, the eighth moving member 8240 pushes the eighth center shaft spring 8250 and thereby the eighth center shaft spring 8250 is compressed.

Continuously, if the cover 200 is rotated at 180 degrees, the eighth rounded part 8241 of the eighth moving member 8240 is fitted into the eighth groove 8222. At this time, the eighth center shaft spring 8250 is expanded and in turn it pushes the eighth moving member 8240 toward the outside so as to generate a breaking power.

Under this state, when the cover 200 is maintained in the main body 100 at a closed condition, the large-sized LCD monitor 210 of the cover 200 is exposed to the outside and thereby the user can see the large-sized LCD monitor 210. Accordingly, the user takes pleasure in playing a game through the large-sized LCD monitor 210 after connecting a keypad for playing a game to the portable phone.

Meanwhile, if the user does not want to see the large-sized LCD monitor 210 of the cover 200, he or she operates the portable phone on the contrary process in order to set the large-sized LCD monitor of the cover 200 toward the main body 100.

In the meanwhile, a predetermined camera lens (not shown) may be installed at one side of the main body 100 of the cover 200 of the portable phone according to the above embodiments as described above.

Hereinafter, taking into consideration that the large-sized LCD monitor 210 is only installed at the inner surface of the cover 200 and a camera lens is installed at the outer side surface of the main body 100, the process for reverse turning the cover 200 will be described in detail.

The camera is may be installed at a predetermined position except certain positions in which a battery is mounted in the rear side surface of the main body 100 and in which the user grasps the portable phone with his or her hand.

A sensor (not shown) for sensing opening or closing of the cover 200 is installed at the main body 100. A control switch (not shown) for controlling operation of the camera lens and a sensor (not shown) for monitoring reverse turning of the cover 200 are installed at the side surface portion of the main body 100 and the keypad part of the main body 100.

Since the camera lens (not shown) is installed at the outer side surface of the main body 100 prior to opening and reverse turning the cover 200, it can take pictures about some objects or persons in front of the user. At this time, the user can take pictures about some objects through the camera lens by seeing the objects through the large-sized LCD monitor 210 of the cover 200. In other words, if the cover 200 is open, the sensor perceives the opening state of the cover 200 and the control part installed at the main body 100 illuminates the keypad part and the large-sized LCD monitor 21.

Since the camera lens (not shown) is installed at the outer side surface of the main body 100, it can take pictures about some objects or persons in front of the user. Under this state, if the user pushes down the control switch (not shown) installed at the side surface of the main body 100 and the key board, it is possible to take picture about some objects and persons in front of the user by operating the camera lens (not shown) through the control part. The pictures obtained by the camera may be transmitted to a terminal of another user through a base station.

Meanwhile, if the user wants to perform an operation of a displaying phone by using the portable phone as described above, he or she must returns reverse the cover 200 in a state that the cover 200 is open.

When the user wants to take picture about her of him self by using the camera lens (not shown), the user returns reverse the cover 200 from the main body 100 by rotating the cover 200 in a state that the cover 200 is open.

After completing reverse turning of the cover 200, the sensor senses the completion of the reverse turning thereof.

When the cover 200 reverse turns from the main body 200, the large-sized LCD monitor 210 of the cover 200 and the camera lens (not shown) of the main body 100 turn toward the user. Accordingly, the user takes picture about her of him self by pushing down the control switch installed at the side surface of the main body 100. At this time, the user can precisely take picture about her of him self by seeing the LCD monitor 210.

The embodiment of which the large-sized LCD monitor 210 is only installed at the inner surface of the cover 200 and the camera lens (not shown) is installed at the outer side surface of the main body 100 is explained above. If the large-sized LCD monitor 210 is installed at the inter or the outer side surfaces of the cover 200, or the camera lens 400 is mountained to the inner side surface of the main body 100 or the inner side surface or the outer side surface of the cover 200, it is possible to reverse return the cover 200 through the reverse returning part. Consequently, it is possible to obtain operation and effect, which are the same as those of the embodiment according to the present invention.

The construction disclosed at an international publication number WO02/082674 may be employed as the hinge part for opening or closing the cover against the main body in the present invention.

Hereinafter, the effects according to the present invention will be explained.

Since the cover hinge apparatus of the portable phone according to the present invention may be reverse turned by the reverse turning part, it is possible to see the large-sized LCD monitor by reverse returning the LCD monitor to the outside at the time that the portable phone is not used. Accordingly, when the user takes pleasure in playing a game and seeing TV through the portable phone, it is convenient to use.

Further, since the number of the LCD monitor installed at the cover is reduced, the manufacturing cost of the portable phone can be also reduced.

Since the hinge apparatus according to the present invention includes an improved rotating part and an improved hinge part, it is possible to perform an effect rotation.

Finally, in the hinge apparatus according to the present invention, it is possible to prevent the wire for connecting the main body with the cover from being twisted by forming the cut-away groove or the wiring passageway.

While the present invention has been particularly shown and described with reference to particular embodiments thereof, it will be understood by those skilled in the art that various changes in form and details may be effected therein without departing from the spirit and scope of the invention as defined by the appended claims.

The invention claimed is:

1. The hinge mechanism of a portable phone comprising:
a housing having a rotary chamber with an opened top portion and a hinge chamber formed at a side of the rotary chamber, for mechanically connecting a cover to a body;
a hinge part which is installed to the hinge chamber, for opening and closing the cover; and
a rotary part which is installed to the rotary chamber, for rotating the cover,
wherein the rotary part includes a cylinder which opens at a lower portion and has a cylinder chamber, which has a cylinder hole formed in an upper portion thereof and an arm projected from the upper portion thereof to be combined with the cover, and which has a cylinder groove formed lengthwise thereon; a compressed spring which is installed in the cylinder chamber; a rotary slip part which has a rotary slip hole formed at a center portion thereof; a fixed slip part which has a polygonal hole formed at a center portion thereof and which has a fixed slip surface on an upper portion; and a center shaft which has a polygonal projection to be combined with the polygonal hole, and which is installed at a bottom surface of the rotary chamber to sequentially extend the polygonal hole, the rotary slip hole, the compressed spring and the cylinder hole.

2. The hinge mechanism of the portable phone according to claim 1, wherein a pair of balls is installed on the rotary slip surface to be opposite to each other about the rotary slip hole while a pair of hemispheric grooves is formed on the fixed slip surface to face the pair of the balls, and a guide recess is formed to communicate with the hemispheric grooves.

3. The hinge mechanism of the portable phone according to claim 1, wherein a pair of balls is installed on the fixed slip surface to be opposite to each other about the fixed slip hole while a pair of hemispheric grooves is formed on the rotary slip surface to face the pair of the balls, and a guide recess is formed to communicate with the hemispheric grooves.

4. The hinge mechanism of the portable phone according to claim 1, wherein a pair of projections is installed on the rotary slip surface to be opposite to each other about the rotary slip hole while a pair of hemispheric grooves is formed on the fixed slip surface to face the pair of the projections, and guide recess is formed to communicate with the hemispheric grooves.

5. The hinge mechanism of the portable phone according to claim 1, wherein a cylinder projection is formed on an outer peripheral surface of the cylinder, and a pair of stoppers is formed on opposite inner surfaces of the rotary chamber, to which the cylinder projection is latched.

6. The hinge mechanism of the portable phone according to claim 1, wherein the housing has a cutoff portion through which a wire enters the rotary chamber to electrically connect the cover to the body.

7. The hinge mechanism of the portable phone according to claim 1, wherein an annular groove is formed at an end of the center shaft, to which a sealing is combined to fix the cylinder to the center shaft.

8. The hinge mechanism of the portable phone according to claim 1, wherein the hinge chamber opens at a side thereof, which includes a guide recess formed from the opened end to an interior thereof, and the hinge part includes: a hinge spring which is installed in the hinge chamber; a rotary hinge part which is inserted in the hinge chamber to enclose the hinge spring, which has a rotary hinge hole formed at a center portion thereof, which has a rotary hinge projection formed on an outer surface thereof to be combined with the guide recess, and which has a rotary hinge surface continuously and horizontally extending to the rotary hinge hole while having two-wave type of bending when rotating each time; a fixed hinge part which encloses the hinge spring, which has a fixed hinge hole corresponding to the rotary hinge hole, and which has a fixed hinge surface formed on a side thereof to be corresponding to the rotary hinge surface and a fixed hinge projection formed on the other side thereof to be fixed to the body; and a hinge shaft extending through the fixed hinge hole, the rotary hinge hole and the hinge spring to be fixed to the hinge chamber.

9. The hinge mechanism of the portable phone according to claim 1, wherein the hinge chamber opens at a side thereof, which includes a guide recess formed from an opened end to an interior thereof, and the hinge part includes: a hinge spring which is installed to the hinge chamber; a rotary hinge part which is inserted in the hinge chamber to enclose the hinge spring, which has a rotary hinge hole formed at a center portion thereof, and which has a rotary hinge projection formed on an outer surface to be combined to the guide recess and a plain rotary hinge surface; a fixed hinge part which encloses the fixed hinge part, which has a fixed hinge hole corresponding to the rotary hinge hole, and which has a fixed hinge surface formed on a side thereof to be corresponding to the rotary hinge surface and a fixed hinge projection formed on the other side to be fixed to the body; and a hinge shaft extending through the fixed hinge hole, the rotary hinge hole and the hinge spring to be fixed to the hinge chamber.

10. The hinge mechanism of the portable phone according to claim 1, wherein the hinge chamber opens at a top portion thereof, which has a hinge chamber hole formed at a side thereof and a guide recess formed lengthwise on an inner surface, and the hinge part includes: a hinge spring which is installed in the hinge chamber; a rotary hinge part which is inserted in the hinge chamber to enclose the hinge spring, which has a hinge spring hole formed at a center portion thereof, and which a rotary hinge projection formed on an outer surface thereof to be combined with the guide recess and a rotary hinge surface formed at a side thereof; a fixed hinge part which encloses the fixed hinge part, which has a fixed hinge hole corresponding to the rotary hinge hole, and which has a fixed hinge surface formed at a side thereof to be corresponding to the rotary hinge surface and a fixed hinge projection formed on the other side thereof to be fixed to the body; and a hinge shaft extending through the fixed hinge hole, the rotary hinge hole and the hinge spring to be fixed to the hinge chamber.

11. The hinge mechanism of the portable phone according to claim 1, wherein the hinge chamber opens at a top portion thereof, which has a hinge chamber hole formed at a side thereof and which has a guide recess including a horizontal groove formed lengthwise on an inner surface thereof and a vertical groove being normal to the horizontal groove to be connected to the opening, and the hinge part includes: a hinge spring which is installed to the hinge chamber; a hinge part which is inserted in the hinge chamber to enclose the hinge spring, which has a rotary hinge hole formed at a center portion thereof, and which has a rotary hinge projection formed on an outer surface thereof to be combined to the guide groove and which has a rotary hinge surface formed at a surface; a fixed hinge part which encloses the fixed hinge part, which has a fixed hinge hole corresponding to the rotary hinge hole, and which has a fixed hinge surface formed on a side thereof to be corresponding to the rotary hinge surface and a fixed projection formed on the other side to be fixed to the body; and a hinge shaft extending through the fixed hinge hole, the rotary hinge hole and the hinge spring to be fixed to the hinge chamber.

12. The hinge mechanism of the portable phone according to claim 1, wherein the hinge part includes: a hinge housing which has a hinge housing chamber with an opened top portion, which has a guide groove formed lengthwise on a side wall thereof, and a hinge spring projection formed at the other side thereof; a rotary hinge part which is installed to the hinge housing, which has a rotary hinge projection formed on an outer surface to be inserted in guide recess and a hinge hole formed at a center portion thereof, and which has a rotary hinge surface continuously and horizontally extending to the hinge hole while having two-wave type of bending when rotating each time; a fixed hinge part which is rotatably installed to the hinge housing, which has a fixed hinge surface formed at a side thereof to be corresponding to the rotary hinge surface, which has a hinge shaft formed on the fixed hinge surface to be inserted in the rotary hinge hole, and which has a fixed hinge projection formed at the other side thereof to be inserted in the hinge housing hole; and a hinge spring which is installed to the hinge housing so that an end of the hinge spring is combined to the hinge spring projection and the other end elastically supports the second rotary hinge part.

13. The hinge mechanism of the portable phone according to claim 1, wherein a camera lens is attached to an inner surface or outer surface of the cover to take a picture, and wherein a control switch is installed to a side of the body to control an operation of the camera lens.

14. The hinge mechanism of portable phone according claim 1, wherein a camera lens is attached to an inner surface or outer surface of the body to take a picture, and wherein a control switch is installed to a side of the body to control an operation of the camera lens.

15. The hinge mechanism of a portable phone comprising:
a housing having a rotary chamber with an opened top portion and a hinge chamber formed at a side of the rotary chamber, for mechanically connecting a cover to a body;
a hinge part which is installed to the hinge chamber, for opening and closing the cover; and
a rotary part which is installed to the rotary chamber, for rotating the cover,
wherein the rotary part includes a cylinder which opens at a lower portion and has a cylinder chamber, which has a cylinder hole formed in an upper portion thereof and an arm projected from the upper portion thereof to be combined with the cover, and which has a cylinder groove formed lengthwise thereon; a compressed spring which is installed in the cylinder chamber; a rotary slip part which has a rotary slip hole formed at a center portion thereof; a fixed slip part which has a polygonal hole formed at a center portion thereof and which has a fixed slip surface on an upper portion; and a center shaft which has a polygonal projection to be combined with the polygonal hole, and which is installed at a bottom surface of the rotary chamber to sequentially extend the polygonal hole, the rotary slip hole, the compressed spring and the cylinder hole, wherein a pair of projections is installed on the rotary slip surface symmetrically about the center thereof, while a pair of hemispheric grooves is formed on the fixed slip surface to face the projections or vice versa, and a guide recess is formed to communicate with the hemispheric grooves.

* * * * *